(12) United States Patent
Ishigami et al.

(10) Patent No.: US 6,873,109 B2
(45) Date of Patent: Mar. 29, 2005

(54) METAL HALIDE DISCHARGE LAMP, LIGHTING DEVICE FOR METAL HALIDE DISCHARGE LAMP, AND ILLUMINATING APPARATUS USING METAL HALIDE DISCHARGE LAMP

(75) Inventors: Toshihiko Ishigami, Kawasaki (JP); Kiyoshi Saita, Yokosuka (JP); Mikio Matsuda, Tokyo (JP); Toshio Hiruta, Hiratsuka (JP)

(73) Assignee: Harison Toshiba Lighting Corporation, Ehime-ken (JP)

( * ) Notice: Subject to any disclaimer, the term of this patent is extended or adjusted under 35 U.S.C. 154(b) by 0 days.

(21) Appl. No.: 10/325,788

(22) Filed: Dec. 19, 2002

(65) Prior Publication Data

US 2003/0209986 A1 Nov. 13, 2003

Related U.S. Application Data

(63) Continuation of application No. 09/978,448, filed on Oct. 16, 2001, now Pat. No. 6,528,946, which is a continuation of application No. 09/087,311, filed on May 29, 1998, now Pat. No. 6,353,289.

(30) Foreign Application Priority Data

| Jun. 6, 1997 | (JP) | ................................................ 9-148994 |
| Nov. 13, 1997 | (JP) | ................................................ 9-311833 |
| Dec. 16, 1997 | (JP) | ................................................ 9-346033 |
| Dec. 16, 1997 | (JP) | ................................................ 9-346035 |
| Feb. 10, 1998 | (JP) | ................................................ 10-028134 |

(51) Int. Cl.[7] ............................ H01J 17/20; H01J 61/20
(52) U.S. Cl. ........................ 313/640; 313/637; 313/638; 313/641; 313/572
(58) Field of Search ........................ 313/25, 637, 638, 313/642, 640, 567, 568

(56) References Cited

U.S. PATENT DOCUMENTS

| 3,484,640 A | 12/1969 | Johnson |
| 3,662,203 A | * 5/1972 | Kuhl et al. .................... 313/25 |

(Continued)

FOREIGN PATENT DOCUMENTS

| EP | 0 386 602 A A2 | 9/1990 |
| EP | 0 605 248 A2 | 7/1994 |
| EP | 0 720 209 A2 | 7/1996 |
| GB | 1316803 | 5/1973 |
| JP | 49-17471 A | 5/1974 |
| JP | 55-062653 | 5/1980 |
| JP | 61-142654 | 6/1986 |
| JP | 63-195944 | 8/1988 |
| JP | 2-7347 A | 1/1990 |
| JP | 03141501 | 6/1991 |
| JP | 4-51497 | 2/1992 |
| JP | 5-198283 | 8/1993 |

(Continued)

OTHER PUBLICATIONS

European Patent Office Search Report; 98109817.1–2208; Toshiba Lighting & Technology Corporation; Sep. 25, 1998.

*Primary Examiner*—Mariceli Santiago
(74) *Attorney, Agent, or Firm*—Christensen O'Connor Johnson Kindness PLLC

(57) ABSTRACT

Disclosed is a metal halide discharge lamp which essentially permits disusing mercury. The metal halide discharge lamp comprises a refractory and transparent hermetic vessel, a pair of electrodes fixed to the hermetic vessel, and a discharge medium sealed in the hermetic vessel and containing a first halide, a second halide and a rare gas, the first halide being a halide of a metal which achieves a desired light emission, the second halide having a relatively high vapor pressure, being at least one halide of a metal which is unlikely to emit a visible light compared with the metal of the first halide, and acting as a buffer gas.

6 Claims, 14 Drawing Sheets

U.S. PATENT DOCUMENTS

| | | |
|---|---|---|
| 3,761,758 A | 9/1973 | Bamberg et al. |
| 3,840,767 A | 10/1974 | Lake |
| 3,876,895 A | 4/1975 | Lake et al. |
| 3,949,211 A | 4/1976 | Elms |
| 4,387,319 A | 6/1983 | White et al. |
| 4,550,272 A | 10/1985 | Kimura et al. |
| 4,594,529 A | 6/1986 | de Vrijer |
| 4,810,938 A | 3/1989 | Johnson et al. |
| 4,935,668 A | 6/1990 | Hansler et al. |
| 4,987,444 A | 1/1991 | Nanri |
| 4,992,700 A | 2/1991 | Lake |
| 5,140,229 A | 8/1992 | Yagi et al. |
| 5,198,727 A | 3/1993 | Allen et al. |
| 5,256,940 A | 10/1993 | Wada et al. |
| 5,333,034 A | 7/1994 | Gu et al. |
| 5,463,287 A | 10/1995 | Kurihara et al. |
| 5,572,091 A | 11/1996 | Langer et al. |
| 5,742,126 A | 4/1998 | Fujii et al. |
| 5,798,612 A | 8/1998 | Dirks |
| 5,866,984 A | 2/1999 | Doughty et al. |
| 5,886,470 A | 3/1999 | Smolka |
| 5,942,850 A | 8/1999 | Rutan et al. |
| 5,965,984 A | 10/1999 | Horiuchi et al. |
| 6,005,346 A | 12/1999 | Shaffner |
| 6,020,676 A | 2/2000 | Ury et al. |
| 6,353,289 B1 | 3/2002 | Ishigami et al. |

FOREIGN PATENT DOCUMENTS

| | | |
|---|---|---|
| JP | 06-084496 A | 3/1994 |
| JP | 6-111772 A | 4/1994 |
| JP | 11-86795 A | 3/1999 |
| JP | 2002-093369 A | 3/2002 |
| WO | WO 95/05674 | 2/1995 |
| WO | WO 95/28733 A1 | 10/1995 |
| WO | WO 97/42651 A2 | 11/1997 |
| WO | WO 98/25294 A1 | 6/1998 |

\* cited by examiner

METAL HALIDE DISCHARGE LAMP, LIGHTING DEVICE FOR METAL HALIDE DISCHARGE LAMP, AND ILLUMINATING APPARATUS USING METAL HALIDE DISCHARGE LAMP

This is a continuation of U.S. patent application Ser. No. 09/978,448, filed on Oct. 16, 2001, now U.S. Pat. No. 6,528,946, which is a continuation of U.S. patent application Ser. No. 09/087,311, now U.S. Pat. No. 6,353,289 B1, filed on May 29, 1998, the benefit of the filing dates of which is hereby claimed under 35 U.S.C. § 120.

BACKGROUND OF THE INVENTION

The present invention relates to a metal halide discharge lamp, a lighting device for a metal halide discharge lamp, and an illuminating apparatus using a metal halide discharge lamp.

A metal halide discharge lamp comprises a light-emitting tube provided with a pair of electrodes arranged to face each other. A rare gas, a halide of a light-emitting metal, and mercury are sealed in the light-emitting tube to form the metal halide discharge lamp. The discharge lamp of the particular construction exhibits a relatively high efficiency, and high color rendering properties and, thus, is used widely.

The metal halide discharge lamp is classified into a short arc type and a long arc type. The short arc type metal halide discharge lamp is used in projectors such as a liquid crystal projector in which light rays emitted from a lamp are collected so as to be projected onto a screen, and an overhead projector, and is also used for illumination of shops in the form of down light and spot light. Also, a small short arc type metal halide discharge lamp has come to be used in recent years as a headlamp of a vehicle in place of a halogen lamp.

As described in, for example, Japanese Patent Disclosure (Kokai) No. 2-7347, it is absolutely necessary to seal about 2 to 15 mg of mercury in a metal halide discharge lamp used as a headlamp of a vehicle.

On the other hand, Japanese Patent Disclosure No. 3-112045 discloses a metal halide discharge lamp which does not necessitate the sealing of mercury. In this prior art, a rare gas such as helium or neon is sealed in the lamp at a pressure of 100 to 300 Torr in place of mercury so as to obtain a desired lamp voltage. Since the atom of each of these rare gases has a small radius, the rare gas permeates through a quartz glass and, thus, the hermetic vessel of the lamp is formed of a transparent ceramic material.

On the other hand, the long arc type metal halide discharge lamp is used mainly for the general illumination purposes. For example, the discharge lamp of this type is used as an illumination equipment for a high ceiling, a light projector, a street lamp and as an illumination equipment for roads. Further, a metal halide discharge lamp which generates ultraviolet rays is used for the manufacture of a photo-setting synthetic resin or ink. The metal halide discharge lamp used for this purpose is also of a long arc type.

In any of the short arc type and long arc type metal halide discharge lamps which have been put to practical use nowadays, it is absolutely necessary to use mercury, because, in the metal halide discharge lamp, mercury serves to obtain a desired lamp voltage so as to maintain satisfactory electric properties.

To be more specific, where, for example, the lamp voltage is unduly low, the lamp current must be increased in order to obtain a desired lamp input. In this case, problems are brought about that the current capacities are increased in the related facilities such as the lighting device, illuminating device and wiring. Also increased is the heat generation.

On the other hand, where the lamp current is unduly high, the electrode loss is increased, leading to a low lamp efficiency. To be more specific, the electrode drop of the metal halide discharge lamp is constant for each lamp. As a result, if the lamp voltage is unduly low, the lamp current must be increased for making up for the low-lamp voltage, with the result that the electrode loss is increased in proportion to the lamp current so as to lower the lamp efficiency.

As pointed out above, it is generally advantageous in a discharge lamp to set the lamp voltage at a value as close to the input voltage of the lamp as possible, i.e., as high as possible, as far as the arc does not disappear.

Let us describe the reason why the mercury sealing was required in the conventional metal halide discharge lamp while giving consideration to the lamp voltage with reference to FIG. 1. As shown in the drawing, the lamp comprises a hermetic vessel 1, a pair of electrodes 2, 2, and lead wires 3, 3. The lamp voltage V1, which denotes the voltage between the lead wires 3, 3 when the metal halide discharge lamp is lit, can be represented by formula (1) given below:

$$V1 = E \times L + Vd \qquad (1)$$

where E is a degree of potential inclination of the plasma between the electrodes, L is a distance between the electrodes, and Vd is an electrode drop.

The potential inclination degree E of the plasma can be represented by formula (2) given below:

$$E = I / 2\pi \int \sigma r \, dr \qquad (2)$$

where I is a lamp current, σ is an electrical conductivity of the plasma, which is a function of temperature T, and r is a distance of an optional point from the center in the radial direction.

If a substance A is supposed to be present within the discharge space during the lighting of the metal halide discharge lamp, the electrical conductivity σ of the substance A at temperature T is given by formula (3) below:

$$\sigma = C \cdot N_E / (T^{1/2} \cdot (N_A \cdot Q)) \qquad (3)$$

where C is a constant, $N_E$ is an electron density, $N_A$ is a density of the substance A, and Q is a cross section of impingement of the electron against the substance A.

As apparent from formula (1), the lamp voltage V1 is increased with increase in the potential inclination degree E and with increase in the distance L between the electrodes. On the other hand, formula (2) indicates that the potential inclination degree E is increased with decrease in the electrical conductivity σ and with increase in the lamp current I. Further, formula (3) indicates that the electrical conductivity σ is decreased with decrease in the electron density $N_E$ and with increase in the density $N_A$ of the substance A and in the impinging cross section Q. It follows that, where the distance L between the electrodes and the lamp current I are set constant, the conditions of the substance A, under which the lamp voltage V1 is increased, are that the substance A is unlikely to be ionized to diminish the value $N_E$, that the substance A has a high density within the lamp to increase the value $N_A$, and that substance A has a large cross section Q of the electron impingement.

It should be noted that mercury has a very high vapor pressure, i.e., 1 atmosphere at 361° C., is unlikely to be ionized, and has a large cross section of the electron impingement. It follows that a desired lamp voltage can be easily obtained by controlling the sealing amount of mercury in accordance with the size of the lamp. In other words, mercury is sealed in the conventional metal halide discharge lamp because a desired lamp voltage can be obtained easily.

It should be noted in this connection that, in the case of a metal halide discharge lamp, it is necessary to set the mercury vapor pressure higher with miniaturization of the lamp in which the distance L between the electrodes is shortened in order to ensure a desired lamp voltage. For example, in a small short arc type metal halide discharge lamp whose light-emitting tube has an inner volume of 1 cc or less, the mercury vapor pressure during lighting of the lamp is as high as at least 20 atmospheres.

Let us describe the problems which are brought about where mercury is sealed in a metal halide discharge lamp and the problems which are brought about where mercury is not sealed in the conventional metal halide discharge lamp.

Problems Brought About by Mercury Sealing

Air pollution and water contamination problems attract worldwide attentions nowadays. Since mercury is harmful to the health of the human being, it is naturally desirable to decrease the amount of mercury used or not to use mercury at all in the field of illumination. In other words, the greatest problem inherent in the conventional metal halide discharge lamp is that mercury is sealed in the lamp.

In addition, many problems remain unsolved when it comes to the metal halide discharge lamp in which mercury is sealed for obtaining a desired lamp voltage, as pointed out below;

1. Poor in Rising of Spectral Characteristics in the Start-up Time:

Where a metal halide discharge lamp is used in the headlamp of a vehicle, required is the instant rising of the light flux. To meet this requirement, employed is a lighting system in which xenon is sealed as a starting gas at a high pressure, and a large current is allowed to flow in the initial period of the lighting, followed by gradually decreasing the current with time. It is certainly possible to achieve the instant rising of light flux in this fashion. However, since mercury is rapidly evaporated in the switch-on time, mercury takes much energy so as to cause delay in the rising of the vapor pressure of a light-emitting metal. It follows that mercury continues to emit light of high intensity for 10 to 20 seconds. It should be noted that the light emitted from mercury is poor in color characteristics and in color rendering properties. Also, the chromaticity of the light emitted from mercury fails to fall within a range of whiteness. Since the rising of the spectral characteristics is very poor as described above, it takes a long time to obtain emission of light having desired spectral characteristics.

2. Unsuitable for Light Control (Dimming):

A change in temperature of the light emitting tube brings about a great change in the color temperature of the emitted light and, thus, in the color rendering properties, as apparent from FIG. 2. Specifically, FIG. 2 is a graph showing the distribution of an emission spectral of a conventional short arc type metal halide discharge lamp for projection. The wavelength (nm) is plotted on the abscissa of the graph, with the relative emission power (%) being plotted on the ordinate.

Sealed in the conventional short arc type metal halide discharge lamp are $6.65 \times 10^4$ Pa of argon as a rare gas, 1 mg of dysprosium iodide ($DyI_3$) as a halide, 1 mg of neodymium iodide ($NdI_3$) as a halide, and 13 mg of mercury. The emission spectral consists of a continuous light emission caused by dysprosium and neodymium and main bright-line spectra caused by the elements given above the arrows in the drawing. As seen from the graph, the bright-line spectrum caused by mercury has a large power.

It should be noted that the amount of light emission from each of the light-emitting metals is changed proportionally to the vapor pressure within the lamp. Since the vapor pressure of a halide of a light-emitting metal is markedly lower than that of mercury, a change in temperature of the light emitting tube causes a change in the evaporation amount of the halide, leading to a change in the vapor pressure within the lamp. As a result, the amount of light emitted from the light-emitting metal is also changed.

On the other hand, the vapor pressure of mercury is so high that a change in temperature of the light emitting tube does-not bring about an appreciable change in the mercury vapor pressure, leading to a small change in the amount of light caused by the strong bright-line spectrum of mercury. It follows that, if the input power supplied to the light-emitting tube is decreased, the light emission caused by mercury is rendered relatively predominant. As a result, the color temperature of the emitted light is lowered, leading to poor color rendering properties. This indicates that the conventional metal halide discharge lamp, which requires mercury sealing, is unsuitable for the light control (dimming).

In the case of a headlamp for a vehicle, dimming is required for the lighting in the day time (day light) employed in the U.S.A. and Europe. However, the color characteristics are markedly impaired in the conventional metal halide discharge lamp requiring the mercury sealing.

3. Large Unevenness in Properties:

The metal halide discharge lamps having mercury sealed therein are uneven in temperature of the light emitting tubes, which are caused by unevenness in the size of the individual lamps. As a result, unevenness in the characteristics tends to be brought about even under the same input power. Also, the characteristics are likely to be changed by the temperature elevation in the coolest region caused by the blackening of the light-emitting tube used over a long period of time. These difficulties tend to bring about a problem particularly where a plurality of metal halide discharge lamps are used in combination for illumination as in, for example, shops.

4. Difficult to Re-start Up Instantly:

As described previously, the distance between the paired electrodes is small in a short arc type small metal halide discharge lamp, making it necessary to set the mercury vapor pressure at a high value. Specifically, the mercury vapor pressure is set at such a high value as, for example, at least 20 atmospheres.

Further, when used in a headlamp for a vehicle, xenon is also sealed in the lamp at a high pressure. For example, the xenon pressure is as high as about 35 atmospheres during the lighting. Since the mercury vapor pressure and the xenon vapor pressure are very high during the lighting, it is necessary to apply a pulse voltage of a very large power in the re-start up time. It follows that the lighting circuit is rendered costly. In addition, it is necessary to insulate the circuit, the lamp and the equipment housing them against a high voltage.

5. Rupture of Light-emitting Tube:

Since the mercury vapor pressure is very high during the lighting as described previously, strain of the lamp is increased during lighting of the lamp over a long period of time, with the result that the lamp tends to be ruptured. The problem of rupture markedly lowers the reliability of the lamp.

6. Low Screen Brightness when Used in Projector:

Where a short arc type metal halide discharge lamp is used in a projector in which the light emitted from the lamp used as a light source is collected through an optical system such as a liquid crystal projector so as to illuminate, for example, a screen arranged apart from the projector, it is of high importance to suppress the loss of the light emitted from the discharge lamp when the emitted light passes through the optical system so as to permit the emitted light to arrive at the screen as much as possible. In order to improve the brightness of the screen by suppressing the light loss, it is necessary for the arc of the discharge lamp to be narrowed thin. The expression "narrow arc" denotes that the arc temperature distribution is sharp.

It should be noted in this connection that the light emitted from mercury is absorbed and, thus, is optically thick. Since energy is absorbed by the absorption of the light emitted in the intermediate and low temperature regions, the temperature is elevated. As a result, the arc temperature is distributed to depict a parabola, making it difficult to narrow the arc. On the other hand, it is known to the art that, if the light emission is very much increased by using scandium or a rare earth metal as a light-emitting metal, the arc can be narrowed even in the presence of mercury. In this case, however, convection occurs vigorously if the lighting pressure of mercury is high, with the result that the arc is rendered unstable. It follows that it is impossible to put this technique to practical use.

Problems Inherent in the Conventional Lamp which does not necessitate Mercury Sealing In the metal halide discharge lamp which does not necessitate mercury sealing, the partial pressure of helium or neon within the light-emitting tube is markedly increased during the lighting. If the light-emitting tube is constructed to withstand the high pressure, it is certainly possible to obtain a metal halide discharge lamp in which mercury is not-sealed. The possibility itself of obtaining a metal halide discharge lamp not requiring mercury sealing is worthy of a favorable evaluation. However, it is practically difficult to permit a metal halide discharge lamp of the construction similar to that of the conventional lamp to withstand the high pressure within the lamp during the lighting of the lamp. Where, for example, a lamp voltage of 50 to 60V is required in s small metal halide discharge lamp, the pressure of helium or neon within the lamp is expected to exceed 150 atmospheres during the lighting of the lamp. It follows that the hermetic vessel widely used in the conventional lamp fails to obtain a high reliability in respect of the measure against rupture of the hermetic vessel.

BRIEF SUMMARY OF THE INVENTION

A main object of the present invention is to provide a metal halide discharge lamp which essentially permits disusing mercury, which is harmful to the living environment of the human being, and which also permits obtaining electrical characteristics and light-emitting characteristics substantially equal to those produced by a metal halide discharge lamp in which is sealed mercury, to provide a lighting device for the particular metal halide discharge lamp, and to provide an illumination apparatus using the particular metal halide discharge lamp.

An auxiliary object of the present invention is to provide a metal halide discharge lamp which permits a good rising of chromaticity at the start-up time, which permits light control for the dimming purpose, which is small in unevenness of the characteristics, which permits an instant re-start up easily, and which is effective for preventing the hermetic vessel from being ruptured, to provide a lighting device for the particular metal halide discharge lamp, and to provide an illumination apparatus using the particular metal halide discharge lamp.

Another auxiliary object of the present invention is to provide a metal halide discharge lamp in which mercury is not sealed, which is small in heat loss, and which is effective for preventing the light emitting efficiency from being lowered, to provide a lighting device for the particular metal halide discharge lamp, and to provide an illumination apparatus using the particular metal halide discharge lamp.

Another auxiliary object of the present invention is to provide a metal halide discharge lamp which is lit by a DC current to emit light free from color difference and color separation, and which permits the lighting circuit to be manufactured as a low cost, to provide a lighting device for the particular metal halide discharge lamp, and to provide an illumination apparatus using the particular metal halide discharge lamp.

Another auxiliary object of the present invention is to provide a metal halide discharge lamp which is adapted for use as a headlamp for a vehicle such as an automobile, to provide a lighting device for the particular metal halide discharge lamp, and to provide an illumination apparatus using the particular metal halide discharge lamp.

Still another auxiliary object of the present invention is to provide a practical metal halide discharge lamp which is effective for preventing a hermetic vessel from being ruptured during the lighting of the lamp even if the mechanical strength of the hermetic vessel is substantially equal to that of the conventional hermetic vessel in which is sealed mercury, to provide a lighting device for the particular metal halide discharge lamp, and to provide an illumination apparatus using the particular metal halide discharge lamp.

According to a first aspect of the present invention, there is provided a metal halide discharge lamp which essentially permits disusing mercury, comprising:

a refractory and transparent hermetic vessel;

a pair of electrodes fixed to the hermetic vessel; and a discharge medium sealed in the hermetic vessel and containing a first halide, a second halide and a rare gas, the first halide being a halide of a metal which achieves a desired light emission, the second halide having a relatively high vapor pressure, being at least one halide of a metal which is unlikely to emit a visible light compared with the metal of the first halide, and acting as a buffer gas.

The terms used in the present specification are defined to denote the technical meanings described below unless otherwise specified particularly:

Hermetic Vessel . . . The refractory and transparent hermetic vessel used in the present invention is formed of a material capable of fully withstanding the ordinary operating temperature of a discharge lamp and also capable of leading the visible light of a desired wavelength region emitted by the discharge to the outside. Any material can be used for forming the hermetic vessel as far as the requirements given above are met. For example, it is possible to use quartz glass, or ceramic material such as transparent alumina or YAG as well as single crystals thereof.

Incidentally, it is acceptable in the present invention to form on the inner surface of the hermetic vessel a transparent film resistant to halogen and to metals, as required. It is also acceptable to modify the inner surface of the hermetic vessel, as required.

Electrode . . . The metal halide discharge lamp of the present invention can be constructed so as to be lit by either an AC current or a DC current. Therefore, where the lamp is operated by an AC current, the paired electrodes are of the same construction. However, where the lamp is operated by a DC current, the anode whose temperature is elevated severely in general is allowed to have a heat radiating area larger than that of the cathode.

The metal halide discharge lamp of the present invention may be either of a short arc type or of a long arc type. The short arc type discharge lamp is of a so-called electrode stability type, in which the distance between the electrodes arranged within the hermetic vessel is diminished so as to allow the electrodes to stabilize the arc discharge. Therefore, the light emission from the discharge lamp can be made as close to that of a dot light source as possible, making it possible to allow the optical system such as a light reflector or a lens to collect light efficiently. A small short arc type metal halide discharge lamp is used in a projector such as a liquid crystal projector or in a headlamp for a vehicle such as an automobile. In this case, a suitable distance between the electrodes of the metal halide discharge lamp is practically at most 6 mm. If the distance between the electrodes exceeds 6 mm, the light emission from the discharge lamp is rendered widely different from that from a dot light source, leading to poor focusing characteristics of the optical system. Where, for example, the discharge lamp, in which the distance between the electrodes exceeds 6 mm, is used as a light source of a liquid crystal projector, the screen brightness is lowered.

Under the circumstances, the small short arc type metal halide discharge lamp of the present invention is defined to denote a discharge lamp in which the distance between the electrodes is at most 6 mm. Preferably, the distance between the electrodes should be at most 5 mm. Further, where the discharge lamp is used in a projector such as a liquid crystal projector, the distance between the electrodes should be 1 to 3 mm. Incidentally, the distance in question represents the distance between the tips of the electrodes.

On the other hand, the long arc type metal halide discharge lamp of the present invention is of a so-called tube wall stability type, in which the distance between the electrodes arranged within the hermetic vessel is set longer than the inner diameter of the hermetic vessel so as to allow-the arc discharge to be stabilized by the inner surface of the hermetic vessel. In general, the long arc type metal halide discharge lamp is widely used for the illumination purpose.

Discharge Medium . . . As described previously, the discharge medium used in the present invention consists essentially of a first halide, a second halide and a rare gas.

The first halide is a halide of a metal which emits a desired light such as a visible light or an ultraviolet light. Where a halide of a metal which efficiently emits a visible light is used as the first halide in order to utilize the visible light, the vapor pressure of the first halide is not necessarily high in general during the lighting of the lamp.

The second halide, which is also a halide of a metal, should have a relatively high vapor pressure during the lighting of the lamp. The metal contained in the second halide is not particularly limited as far as the metal is unlikely to emit a visible light compared with the metal contained in the first halide. The expression "relatively high vapor pressure" denotes that the vapor pressure need not be as high as the vapor pressure of mercury. Preferably, the pressure within the hermetic vessel during the lighting of the lamp should be about 5 atmospheres or less. During operation of the lamp, it is desirable for the vapor pressure of the second halide to be at least about 10 times as high as that of the first halide in the lowest temperature region of the lamp. Further, the metal contained in the second halide should be less likely to emit a visible light than the metal contained in the first halide. This implies that, though the metal contained in the second halide may slightly emit a visible light, the visible light emission from the particular metal is relatively small.

It should be noted in this connection that the light emitted from Fe or Ni contains components having wavelengths of an ultraviolet region in an amount larger than that of the components having wavelengths of a visible region. On the other hand, the light emitted from Ti, Al or Zn contains a large amount of components having wavelengths of a visible region. If Ti, Al or Zn is excited singly to emit light, the energy is concentrated on the particular metal so as to emit a large amount of visible light. However, if the metal contained in the second halide has an energy level higher than that of the metal contained in the first halide so as to allow the metal contained in the second halide to be less likely to emit light, the energy is concentrated on the light emission from the first halide under the condition that the first and second halides are present together, with the result that the light emission from the metal contained in the second halide is suppressed.

The vapor of the second halide functions basically as a buffer gas during the lighting of the lamp like mercury used in the conventional metal halide discharge lamp. Table 1 exemplifies various second halides used in the present invention and the temperatures at which the vapor pressures of these second halides reach one atmosphere. Incidentally, slight differences are seen depending on the literature in the temperatures at which the vapor pressures of these second halides reach one atmosphere. However, the values given in Table 1 are considered to be substantially correct.

TABLE 1

| Halide No. | Second Halide | Temperature (° C.) at which vapor pressure of second halide reaches 1 atm. |
|---|---|---|
| 1 | $AlI_3$ | 422 |
| 2 | $FeI_2$ | 827 |
| 3 | $ZnI_2$ | 727 |
| 4 | $SbI_3$ | 427 |
| 5 | $MnI_2$ | 827 |
| 6 | $CrI_2$ | 827 |
| 7 | $GaI_3$ | 349 |
| 8 | $ReI_3$ | 627 |
| 9 | $MgI_2$ | 927 |
| 10 | $CoI_2$ | 827 |
| 11 | $NiI_2$ | 747 |
| 12 | $BeI_2$ | 487 |
| 13 | $TiI_4$ | 377 |
| 14 | $ZrI_4$ | 431 |
| 15 | $HfI_4$ | 427 |

Almost all the halides shown in Table 1 have a vapor pressure lower than that of mercury. Also, the control range of the lamp voltage is narrower than that for mercury. However, the control range of the lamp voltage can be widened by sealing a plurality of the second halides in combination in the hermetic vessel, as required. For example, where $AlI_3$ is under the state of incomplete evaporation and a desired lamp voltage is not obtained, the lamp voltage remains unchanged even if an additional $AlI_3$ is sealed in the hermetic vessel.

On the other hand, if $ZnI_2$ is sealed in the hermetic vessel in place of the additional $AlI_3$, the lamp voltage can be increased because the lamp voltage produced by the function of $ZnI_2$ is added to the lamp voltage produced by the initially sealed $AlI_3$. Further, if another second halide is added, a higher lamp voltage can be obtained.

It should also be noted that it is not absolutely necessary for the second halide not to emit a visible light. It is acceptable for the second halide to emit a visible light, if the ratio of the emitted visible light to all the visible light emitted from the discharge lamp is small enough to make the effect sufficiently small, i.e., the effect given by the visible light emitted from the second halide to all the visible light emitted from the discharge lamp.

Further, a third halide can also be sealed in the hermetic vessel in the present invention in addition to the first and second halides in order to allow the third halide to, for example, correct the arc temperature distribution so as to suppress the heat loss.

Halogen . . . It is most desirable in terms of the reactivity to use iodine as a halogen element contained in each of the first and second halides. It is also possible to use bromine, chlorine and fluorine as a halogen element, which exhibit strong reactivity in the order mentioned. In short, any of iodine, bromine, chlorine and fluorine can be used in the present invention. Further, it is possible to use different halogen compounds in combination. For example, a iodide and a bromide can be used together.

A rare gas, which functions as a starting gas and a buffer gas, is also sealed in the hermetic vessel in the present invention. Any kind of the rare gas can be used in the present invention as far as the rare gas does not permeates through the hermetic vessel. It should be noted in this connection that neon is likely to permeate through a quartz glass. Naturally, where the hermetic vessel is made of a quartz glass, it is desirable to use argon, krypton or xenon as a rare gas sealed in the hermetic vessel.

If the rare gas is sealed at a high pressure, it is possible to improve the rising characteristics of the light flux emitted from the metal halide discharge lamp. Good rising characteristics of the light flux are desirable for what purpose the discharge lamp may be used, and are particularly important where the discharge lamp is used in, for example, a headlamp of a vehicle such as an automobile and in a liquid crystal projector.

Mercury . . . The metal halide discharge lamp of the present invention permits "essentially" disusing mercury. In other words, mercury is not sealed at all in the hermetic vessel. However, it is acceptable for mercury to be present inside the hermetic vessel in an amount of less than 0.3 mg/cc, preferably, not more than 0.2 mg/cc, of the inner volume of the hermetic vessel. Naturally, in terms of the living environment of the human being, it is desirable for mercury not to be sealed at all in the hermetic vessel of the discharge lamp. Where the electric characteristics of the discharge lamp are maintained by the mercury vapor as in the prior art, mercury is sealed in an amount of at least 20 mg/cc of the inner volume of the hermetic vessel in the case of a short arc type metal halide discharge lamp, and in an amount of at least 5 mg/cc of the inner volume of the hermetic vessel in the case of a long arc type metal halide discharge lamp. Compared with the mercury amount required in the prior art, it is considered reasonable to state that the metal halide discharge lamp of the present invention permits "essentially" disusing mercury.

Function . . . As described above, the discharge medium used in the present invention comprises as a first halide a halide of a metal which mainly contributes to the emission of a desired light, and as a second halide a halide of a metal which is unlikely to emit a visible light compared with the metal contained in the first halide. In the present invention, the second halide is essentially substituted for mercury used in the conventional metal halide discharge lamp. As a result, the lamp voltage is determined by mainly the amount of evaporation of the second halide in the present invention. Also, the vapor pressure of the halide is determined by the temperature in the coolest region of the hermetic vessel.

The vapor pressure of the second halide during the lighting, which is lower than that of mercury but is clearly higher than that of the first halide, should be at most about 5 atmospheres.

Under the circumstances, the metal halide discharge lamp of the present invention performs a desired function without requiring a substantial mercury sealing, and permits obtaining a lamp voltage sufficient for obtaining the electric characteristics and light-emitting characteristics substantially equal to those of the conventional lamp requiring a mercury sealing. Incidentally, the term "substantially" given above denotes that, in the present invention, it is acceptable for the obtained electrical and light-emitting characteristics to be somewhat inferior to those obtained in the prior art within a practically workable range. The slight difference in question gives rise to no practical problem in view of the fact that it is possible for the metal halide discharge lamp of this type to be lit by an electronic lighting device. However, the lamp voltage can be further increased in the present invention by applying a heat insulating means to the hermetic vessel, as required.

In the present invention, the hermetic vessel is substantially free from the mercury sealing, and the visible light emission is achieved substantially solely by the metal contained in the first halide. As a result, the metal halide discharge lamp of the present invention permits a good rising of chromaticity in the start-up time. Even where the input to the lamp is changed, the changes in the color temperature and the color rendering properties of the emitted light can be suppressed, making it possible to achieve light control (dimming).

It should also be noted that, in the metal halide discharge lamp of the present invention, the lamp characteristics are less affected by the unevenness in the size and shape of the lamps, making it possible to suppress the unevenness in the color of the emitted light.

Further, an instant re-start up can be achieved easily in the present invention because the vapor pressure of the second halide is clearly lower than that of mercury in almost all the cases. It follows that the height of the starting pulse voltage applied for the re-start up can be lowered. As a result, it is possible to lower the dielectric strength of the lighting device, start-up device, wiring and illumination apparatus, leading to a low manufacturing cost.

Further, the vapor pressure during the lighting is not extremely high in the present invention. To be more specific, it is of no difficulty to lower the vapor pressure in question to about 60% of the value required in the step of sealing mercury, making it possible to prevent substantially completely the hermetic vessel from being ruptured during the lighting of the lamp.

Still further, the metal halide discharge lamp of the present invention permits somewhat improving the color rendering properties on the basis that the light emitting efficiency is substantially the same.

As described above, each of the short arc type and long arc type metal halide discharge lamp of the present invention exhibits the steady state characteristics substantially equal to those exhibited by the prior art.

In addition, the technical idea of the present invention can be applied over a wide range of the lamp power ranging between scores of W and several kW.

The metal halide discharge lamp of the present invention may be either of a single tube type, in which the hermetic vessel is exposed directly to the outer atmosphere, or a double wall type, in which the hermetic vessel is inserted into an outer tube. Each of these single tube type and double wall type lamps of the present invention produces a desired function and effect. Further, if the inner space of the outer tube is held at a vacuum condition in the double wall type metal halide discharge lamp, the heat loss can be suppressed so as to further improve the light emitting efficiency.

What should also be noted is that, where the technical idea of the present invention is applied to a short arc type metal halide discharge lamp, it is desirable to construct the lamp to narrow the arc, as described previously. If the arc is narrowed, the light collecting efficiency can be improved. It follows that a marked improvement in brightness can be obtained, if the short arc type lamp of the particular construction is used, for example, a headlamp of a vehicle such as an automobile in combination with a reflector, or in an optical system of the reflector as in an illumination apparatus for shops or optical fiber illumination apparatus.

According to a second aspect of the present invention, there is provided a metal halide discharge lamp, comprising:

a refractory and transparent hermetic vessel;

a pair of electrodes mounted within the hermetic vessel; and a discharge medium sealed in the hermetic vessel and containing a first halide, a second halide and a rare gas, the first halide being a halide of at least one metal selected from the group consisting of sodium, scandium and a rare earth metal, and the second halide being having a relatively high vapor pressure, and being at least one halide of a metal which is unlikely to emit a visible light compared with the metal of the first halide.

In the second aspect of the present invention, a visible light is emitted from the first halide. In addition, the metal halides suitable for the various general uses are specified in the second aspect in view of the light emitting efficiency and the color rendering properties. It is possible to use a single compound or a plurality of compounds in combination as the first halide.

The hermetic vessel included in the metal halide discharge lamp of the second aspect is essentially free from mercury to enable the present invention of the second aspect to produce the function and effect similar to those produced by the invention of the first aspect.

According to a third aspect of the present invention, the discharge medium used in the metal halide discharge lamp of the first or second aspect of the present invention contain a halide of cesium. Where a halide of cesium is sealed in the hermetic vessel, the temperature distribution of the arc is rendered flat so as to diminish the temperature gradient, as in the case of sealing mercury, with the result that the heat loss in the light emitting tube is decreased. It follows that the light emitting efficiency is increased to reach a level close to the case of sealing mercury, compared with the case where a halide of cesium is not sealed.

To be more specific, cesium generated by decomposition of the cesium halide in the arc has a low ionization voltage and, thus, tends to be ionized to release an electron even in the intermediate temperature region of the arc, which is a relatively low temperature region of the arc. It follows that the presence of cesium in the arc causes the electron concentration to be increased in the intermediate temperature region of the arc.

It should be noted that the electrical conductivity a is proportional to the electron density. Since the energy input in a certain temperature region is represented by $\sigma E^2$, where E denotes the intensity of the electric field, the input energy is increased with increase in the electrical conductivity $\sigma$, that is increase in the electron density. In conclusion, where a halide of cesium is sealed in the hermetic vessel, the energy input is increased in the intermediate temperature region, with the result that the temperature in the intermediate temperature region of the arc is elevated.

On the other hand, since the total input to the metal halide discharge lamp is constant, the temperature in the high temperature region of the arc is relatively lowered, as apparent from the energy balance. It follows that the temperature distribution of the arc is rendered flat so as to diminish the temperature gradient in the case of sealing a halide of cesium, as in the case of sealing mercury.

On the other hand, in the conventional metal halide discharge lamp in which is sealed mercury, mercury also emits light. However, the light emitting efficiency of mercury itself is not sufficiently high, as pointed out previously. In the present invention, however, the hermetic vessel is essentially free from mercury. Therefore, a metal exhibiting a light emitting efficiency higher than that of mercury, e.g., scandium or sodium, is sealed in the hermetic vessel so as to provide a metal halide discharge lamp exhibiting a high light emitting efficiency.

Further, disuse of mercury permits producing a function and effect similar to those produced by the metal halide discharge lamp according to the first aspect of the present invention.

A metal halide discharge lamp according to a fourth aspect of the present invention comprises an outer tube housing the light emitting tube and a heat insulating means for suppressing the loss of heat generated from the light emitting tube in addition to the metal halide discharge lamp according to the first aspect of the present invention. Since the loss of heat generated from the light emitting tube is suppressed by the heat insulating means, the light emitting efficiency of the metal halide discharge lamp is improved. The heat insulating means may be of any construction as far as it is possible to suppress the loss of heat generated from the light emitting tube. For example, the heat insulating means can be constructed as follows.

Specifically, the inner space of the outer tube is held at a vacuum condition so as to suppress convection and conduction of the heat generated from the light emitting tube. It follows that the heat loss is suppressed so as to keep the discharge medium warm. In this case, the heat insulating means may be of any desired specific construction and shape. Also, any desired material can be used for forming the heat insulating means. In the present invention, the inner space of the outer tube is defined to be held at a vacuum condition. To be more specific, the inner pressure of the outer tube is at most $1.33 \times 10^3$ Pa.

It is desirable in the metal halide discharge lamp of the present invention to use a heat ray reflecting-visible light transmitting film which reflects the heat ray radiated from the light emitting tube to the outside back into the light emitting tube and which transmits a visible light. Use of the particular film permits decreasing the heat loss accompanying the radiation so as to keep the discharge medium warm. The heat reflecting-visible light transmitting film can be formed on the inner and/or outer surfaces of a cylindrical body made of quartz glass and interposed between the light emitting tube and the outer tube, on the inner and/or outer surfaces of the outer tube, and on the outer surface of the light emitting tube.

Needless to say, the particular means described above can be used in combination appropriately.

Since the discharge lamp of the present invention comprises a heat insulating means for suppressing the loss of heat generated from the light emitting tube, the loss of heat generated by the discharge within the light emitting tube can be suppressed so as to lower the heat loss of the light emitting tube. It follows that the light emitting efficiency is improved.

Further, the hermetic vessel included in the metal halide discharge lamp according to the fourth aspect of the present invention is substantially free from mercury, making it possible to obtain a function and effect similar to those produced by the invention of the first aspect.

According to a fifth aspect of the present invention, there is provided a metal halide discharge lamp which essentially permits disusing mercury and which is lit by a DC current, comprising:

a refractory and transparent hermetic vessel;

an anode and a cathode fixed to the hermetic vessel; and a discharge medium sealed in the hermetic vessel and containing a first halide, a second halide and a rare gas, the first halide being a halide of at least one metal selected from the group consisting of sodium, scandium, and a rare earth metal, and the second halide having a relatively high vapor pressure and being a halide of at least one metal which is unlikely to emit a visible light compared with the metal of the first halide.

If the conventional metal halide discharge lamp having mercury sealed therein is lit by a DC current, the light emitting metal, e.g., sodium or scandium, is positively ionized and, thus, sucked toward the cathode, with the result that the concentration of the light emitting metal on the anode side is rendered lower than that on the cathode side. Also, mercury is somewhat sucked toward the cathode. However, since mercury is originally sealed in a predominantly large amount, a sufficiently large amount of mercury is present on the anode side, too. As a result, the light emission from the light emitting metal is rendered markedly weak on the anode side to cause light to be emitted from mainly mercury on the anode side, though a sufficiently large amount of light emission from the light emitting metal can be obtained on the cathode side. It follows that a marked color separation is brought about between the two electrodes to make the discharge lamp unsuitable for the practical use. Under the circumstances, where the color separation should be avoided, a metal halide discharge lamp requiring the mercury sealing is used exclusively for the case where the discharge lamp is lit by an AC current.

In the present invention, however, the difference in color temperature between the electrodes is small so as to permit the discharge lamp to be put to practical use in spite of the fact that the second halide is substantially substituted for mercury, and the discharge lamp is lit by a DC current. It should be noted in this connection that, since the second halide is unlikely emit a visible light, the metal contained in the first halide emits light of high intensity even on the anode side in the present invention, leading to the small difference in color temperature between the two electrodes.

It should also be noted that, in a headlamp for a vehicle such as an automobile or in a lamp for a liquid crystal projector, used is an electronic lighting device including a metal halide discharge lamp. Where an AC current is used for lighting the discharge lamp, a DC current generated from a battery power source or a DC current obtained by rectifying an AC current of a commercial frequency is converted in general into a high frequency AC current and, then, supplied to the metal halide discharge lamp.

In the present invention, however, the metal halide discharge lamp is constructed to be adapted for the lighting with a DC current, making it unnecessary to convert the DC current into a high frequency AC current. This makes it possible to simplify the construction of the electronic circuit for lighting the discharge lamp so as to make the lighting device small in size, light in weight and low in manufacturing cost.

Further, since mercury is not used, the metal halide discharge lamp according to the fifth aspect of the present invention produces the function and effect similar to those obtained in the invention of the first aspect.

According to a sixth aspect of the present invention, there is provided a metal halide discharge lamp which permits essentially disusing mercury and which is used in a headlamp having a rated power of at most 100 W, comprising:

a refractory and transparent hermetic vessel;

a pair of electrodes-fixed to the hermetic vessel; and a discharge medium sealed in the hermetic vessel and containing a first halide, a second halide and a rare gas, the first halide being a halide of at least one metal selected from the group consisting of sodium, scandium, and a rare earth metal, and the second halide having a relatively high vapor pressure and being a halide of at least one metal which is unlikely to emit a visible light compared with the metal of the first halide.

A metal halide discharge lamp which is used in a headlamp having a rated power of at most 100 W is featured in that the distance between the two electrodes is small and the tube wall load of the discharge lamp is heavy. Therefore, when it comes to the conventional metal halide discharge lamp requiring the mercury sealing, a such a high mercury vapor pressure as at least 20 atmospheres is required in order to obtain a desired lamp voltage, as described previously. As a result, the hermetic vessel tends to be broken relatively easily.

It is also necessary to seal xenon at a high pressure in order to improve the rising characteristics of the light flux. Specifically, the xenon pressure during the lighting is as high as about 35 atmospheres. It follows that, in order to perform starting by breaking down the starting gas, it is necessary to apply a starting pulse voltage of a high voltage and a large power. Since a higher starting pulse voltage is required for the instant start up, it is necessary to increase the grade of the dielectric strength of the lighting circuit, illumination apparatus and wiring to conform with the high starting pulse voltage, leading to a high manufacturing cost.

As described above, it is certainly possible to solve the problem in respect of the rising characteristics of the light flux by sealing xenon at a high pressure, by applying a high starting pulse voltage, and by supplying a large current immediately after the light, followed by gradually decreasing the current supply. However, the conventional metal halide discharge lamp remains to be unsatisfactory in the rising characteristics of chromaticity. To be more specific, xenon emits light first and, then, mercury emits light. The light emission from mercury is continued for 10 to 20 seconds. What should be noted is that the light emitted from mercury is poor in color rendering properties, failing to fall even within a range of white color.

In the present invention, however, mercury is not sealed in the hermetic vessel, making it possible to reduce the inner pressure of the hermetic vessel to about 60% of the conventional level. It follows that it is possible to alleviate markedly the problems inherent in the prior art in respect of the breakage of the hermetic vessel and the starting pulse voltage.

In the sixth aspect of the present invention, the first halide is limited to a halide of at least one metal selected from the group consisting of sodium and scandium. The particular limitation is effective for obtaining emission of white light required in a headlamp at a very high light emitting efficiency.

Further, since mercury is not sealed in the hermetic vessel, a function and effect similar to those obtained in the first aspect of the present invention can also be obtained in the sixth aspect. It follows that the metal halide discharge lamp according to the sixth aspect of the present invention is quite suitable for use in a headlamp for a vehicle.

According to a seventh aspect of the present invention, the second halide used in the metal halide discharge lamp according to the fifth or sixth aspect of the present invention is limited to a halide of at least one metal selected from the group consisting of magnesium, iron, cobalt, chromium, zinc, nickel, manganese, aluminum, antimony, beryllium, rhenium, gallium, titanium, zirconium and hafnium other words, metals suitable for forming the second halide are specified in the seventh aspect of the present invention.

According to an eighth aspect of the present invention, the second halide used in the metal halide discharge lamp according to any of the first to third aspects or any of the fifth to seventh aspects of the present invention is limited to a halide of at least one metal selected from the group consisting of iron, zinc, manganese, aluminum, and gallium.

In other words, metals most suitable for forming the second halide are specified in the eighth aspect of the present invention. It should be noted in this connection that the metal halides specified in the eighth aspect are most suitable for use as the main component of the second halide. What should be noted is that a further improved lamp voltage can be obtained, if a halide of at least one metal selected from the group consisting of magnesium, cobalt, chromium, nickel, antimony, beryllium, rhenium, titanium, zirconium and hafnium is used as an auxiliary component of the second halide together with the main component specified in the eighth aspect.

According to a ninth aspect of the present invention, the second halide used in the metal halide discharge lamp according to any of the first to third aspects or any of the fifth to eighth aspects of the present invention is sealed in the hermetic vessel in an amount of 0.05 to 200 mg/cc of the inner volume of the hermetic vessel.

In the ninth aspect of the present invention, specified is a general range of the sealing amount of the second halide. Depending on the specific halide selected as the second halide, a suitable range of the sealing amount is narrower than noted above. However, the range of the sealing amount noted above should be taken as a generally satisfactory range.

In a tenth aspect of the present invention, the second halide used in the metal halide discharge lamp according to the sixth aspect of the invention is defined to be sealed in the hermetic vessel in an amount of 1 to 200 mg/cc of the inner volume of the hermetic vessel. Defined in the tenth aspect is a suitable sealing amount of the second halide, covering the case where the metal halide discharge lamp is used in a headlamp for a vehicle.

According to an eleventh aspect of the present invention, the rare gas sealed in the hermetic vessel of the metal halide discharge lamp according to the first to tenth aspects of the present invention is defined to be sealed at a pressure of at least one atmosphere. The eleventh aspect is to increase the pressure of the rare gas sealed in the hermetic vessel so as to improve the rising characteristics of the light flux. The good rising characteristics of the light flux, which are desirable for any use of the discharge lamp, are particularly desirable where the discharge lamp is used in a headlamp of a vehicle. It is desirable to use a small short arc type metal halide discharge lamp where the discharge lamp is used in a headlamp for a vehicle.

In a twelfth aspect of the present invention, the rare gas sealed in the hermetic vessel of the metal halide discharge lamp according to the sixth to tenth aspects of the present invention is defined to be sealed at a pressure of 1 to 15 atmospheres. Defined in the twelfth aspect is a rare gas sealing pressure suitable for the case where the metal halide discharge lamp is used in a headlamp of a vehicle.

According to a thirteenth aspect of the present invention, the hermetic vessel included in the metal halide discharge lamp according to the sixth, tenth or twelfth aspects of the present invention is defined to have an inner diameter of 3 to 10 mm and an outer diameter of 5 to 13 mm. Defined in the thirteenth aspect is the size of the hermetic vessel suitable for the case where the metal halide discharge lamp is used in a headlamp of a vehicle.

According to a thirteenth aspect of the present invention, the hermetic vessel included in the metal halide discharge lamp according to the sixth, tenth or twelfth aspects of the present invention is defined to have an inner diameter of 3 to 10 mm and an outer diameter of 5 to 13 mm. Defined in the thirteenth aspect is the size of the hermetic vessel suitable for the case where the metal halide discharge lamp is used in a headlamp of a vehicle.

According to a fourteenth aspect of the present invention, the distance between the two electrodes mounted in the hermetic vessel included in the metal halide discharge lamp according to the sixth, tenth, twelfth and thirteenth aspects of the present invention is defined to be 1 to 6 mm. Defined in the fourteenth aspect is the distance between the two electrodes mounted in the hermetic vessel, the distance being suitable for the case where the metal halide discharge lamp is used in a headlamp of a vehicle. If the distance between the electrodes exceeds 6 mm, the discharge lamp fails to act as a dot light source, leading to a low light collecting effect. More preferably, the distance between the electrodes should fall within a range of between 1 and 5 mm.

According to a fifteenth aspect of the present invention, the metal halide discharge lamp according to the sixth, tenth, and twelfth to fourteenth aspects of the present invention is defined to be constructed so as to be lit by a DC current. Defined in the fifteenth aspect is the discharge lamp is lit by a DC current so as to miniaturize the lighting device when the discharge lamp is used in a headlamp for a vehicle and to lower the manufacturing cost of the discharge lamp. To be more specific, a battery power source is generally mounted to a vehicle such as an automobile. Therefore, use of a lighting device utilizing a DC current permits simplifying the circuit construction, compared with the case where a DC current is converted first into an AC current and, then, supplied to the metal halide discharge lamp so as to light the discharge lamp. The particular effect remains unchanged even in the case where a control means such as a voltage increasing chopper or a voltage decreasing chopper is used for controlling the DC power to have a desired voltage, because the particular control means is used, when required, even in the case of using an AC power for lighting the discharge lamp. In the present invention, mercury is not sealed in the hermetic vessel, with the result that the color separation problem need not be worried about in practice. It follows that it is possible to use a DC current for lighting the discharge lamp of the present invention.

According to a sixteenth aspect of the present invention, the discharge medium used in the metal halide discharge lamp according to the sixth, tenth, and twelfth to fifteenth aspects of the present invention is defined to contain a halide of cesium. In the sixteenth aspect of the present invention, a halide of cesium is sealed in the hermetic vessel included in the metal halide discharge lamp used in a headlamp for a vehicle so as to flatten the arc gradient and, thus, to improve the light emitting efficiency. As a matter of fact, the light emitting efficiency of the discharge lamp according to the sixteenth aspect of the present invention is higher than that of the conventional metal halide discharge lamp having mercury sealed therein.

According to a seventeenth aspect of the present invention, the metal halide discharge lamp according to the sixth, tenth and twelfth to sixteenth aspects of the present invention is defined to further comprise an outer tube having the hermetic vessel housed therein and having the inner space kept at a vacuum condition. In the seventeenth aspect of the present invention, the hermetic vessel included in the metal halide discharge lamp used in a headlamp of a vehicle is housed in the outer tube having the inner space held at a vacuum condition, with the result that the light emitting efficiency of the discharge lamp is rendered higher than that of the conventional discharge lamp having mercury sealed therein.

According to an eighteenth aspect of the present invention, the metal halide discharge lamp according to the sixth, tenth, and twelfth to seventeenth aspects of the present invention further comprises means for removing ultraviolet light which permits "substantially" removing an ultraviolet light from the light led to the outside. The expression "substantial" removal denotes that the ultraviolet light is removed to a practically allowable level. In other words, the substantial removal does not necessarily imply that 100% of the ultraviolet light is removed.

The ultraviolet light removing means may be of any construction as far as the ultraviolet light is substantially removed. For example, the light emitting tube is housed in an outer tube made of a glass material of the composition capable of removing the ultraviolet light. Incidentally, it is possible for the outer tube to communicate with the outer atmosphere. Alternatively, the outer tube may be hermetic and may have the inner space held at a vacuum condition.

It is also possible to impart an ultraviolet light removing function to the inner surface of the light emitting tube or to the light emitting tube itself. To be more specific, the ultraviolet light shielding function can be imparted by converting the material texture of the inner or outer surface of the light emitting tube into an ultraviolet light shielding texture or by forming a transparent film capable of shielding an ultraviolet light on the inner or outer surface of the light emitting tube. Further, a pair of ultraviolet light shielding cylinders may be arranged outside the light emitting tube.

Since the ultraviolet light led to the outside is substantially removed in the present invention, the headlamp is prevented from being deteriorated by the ultraviolet light. Also, the human eyes are prevented from being irradiated with an ultraviolet light. Further, in the case of using an outer tube, the hermetic vessel is mechanically protected by the outer tube.

According to an additional aspect of the present invention, there is provided a lighting device for a metal halide discharge lamp, comprising:

a metal halide discharge lamp defined in any one of the sixth, tenth and twelfth to eighteenth aspects of the present invention; and a lighting circuit constructed to supply current in an amount at least three times as much as a rated lamp current immediately after the lighting of the metal halide discharge lamp, followed by decreasing the current with time.

Defined in this additional aspect of the present invention is a lighting device for a metal halide discharge lamp which meets the rising characteristics of the light flux required for a headlamp for a vehicle. The lighting circuit may be operated by either an AC current or a DC current. Also, the lighting circuit may be of any desired construction as far as the requirements given above are satisfied.

Further, according to still additional aspect of the present invention, there is provided an illumination apparatus, comprising:

an illumination apparatus body; and a metal halide discharge lamp defined in any one of the first to eighteen aspects of the present invention, the metal halide discharge lamp being supported by the illumination apparatus body.

The invention of the still additional aspect noted above is applicable to any of the apparatuses in which the metal halide discharge lamp according to any of the first to eighteenth aspects of the present invention is used for the illumination purpose. When it comes to a short arc type metal halide discharge lamp, the illumination apparatus of the present invention is suitable for use in illumination apparatus using the discharge lamp in combination with an optical system such as a reflector or a lens, e.g., a liquid crystal projector or an overhead projector, in a headlamp for a vehicle such as an automobile, and in illumination apparatus for shops such as an optical fiber illumination apparatus and a spot light.

On the other hand, when it comes to a long arc type metal halide discharge lamp, the discharge lamp of the present invention can be suitably used in various Illumination apparatuses for the general illumination purposes such as a down light, an illuminating lamp mounted directly to the ceiling, an illumination apparatus for roads, an illumination apparatus for tunnels, in light projectors, and in a display apparatus.

To reiterate, the metal halide discharge lamp of the present invention is featured in that a halide of a metal which is unlikely to emit a visible light compared with a light emitting metal is sealed in the hermetic vessel in place of mercury. The particular metal halide is sealed in a high vapor pressure together with a halide of the light emitting metal. The particular construction defined in the present invention makes it possible to provide a metal halide discharge lamp which produces electric characteristics and light emitting characteristics substantially equal to those produced by the conventional metal halide discharge lamp having mercury sealed therein.

The present invention also provides a metal halide discharge lamp which produces at least one of the auxiliary effects a) to e) given below:

a) Good rising characteristics of spectral characteristics at the start-up time.

b) Capability of light control (dimming).

c) Small unevenness in characteristics.

d) Easy instant re-start up.

e) High resistance to rupture of hermetic vessel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Let us describe some embodiments of the present invention with reference to the accompanying drawings.

Embodiment 1

Figure 1:
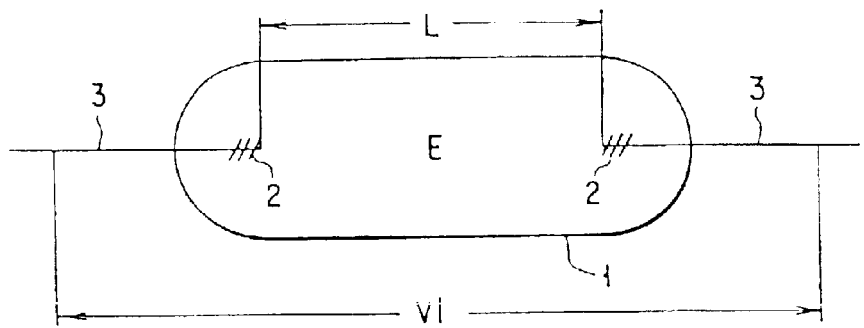
FIG. 1 is a schematical view illustrating the lamp voltage in a metal halide discharge lamp.
Figure 2:
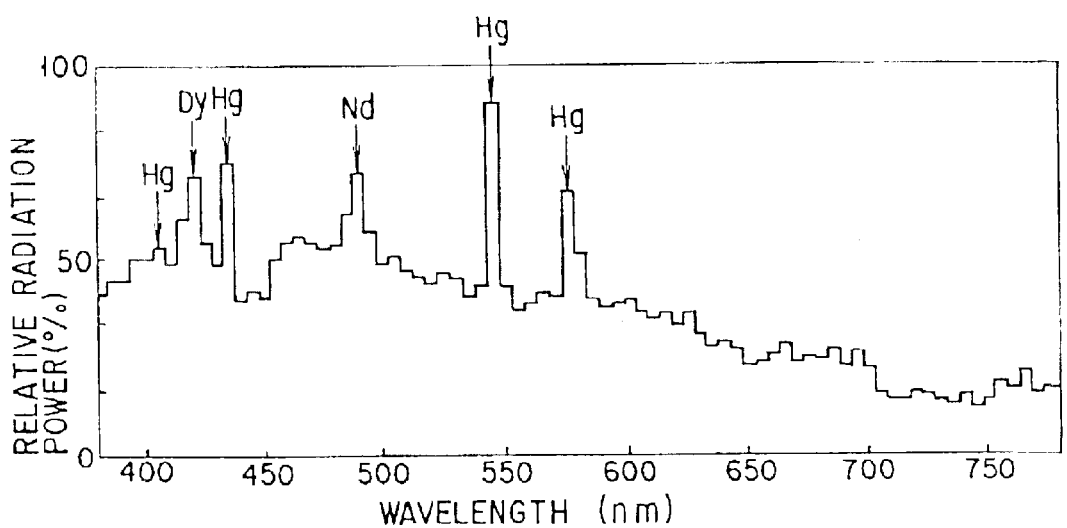
FIG. 2 is a graph showing an emission spectrum distribution of a conventional short arc type metal halide discharge lamp for light projection.
Figure 3:
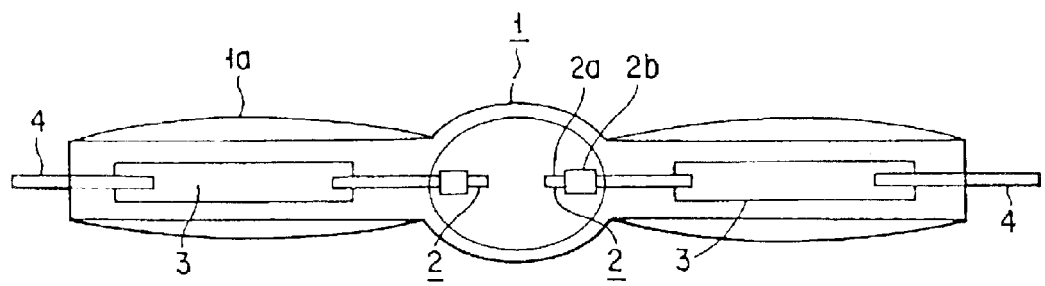
FIG. 3 is a front view showing a metal halide discharge lamp according to a first embodiment of the present invention.

FIG. 3 is a front view showing a metal halide discharge lamp according to the first embodiment of the present invention. As shown in the drawing, the discharge lamp comprises a hermetic vessel 1, a pair of electrodes 2, metal foils 3 for the sealing, and outer lead wires 4. The metal halide discharge lamp of this embodiment is of a short arc type.

The hermetic vessel 1 is prepared by rotating under heat a quartz glass tube having an inner diameter of 14 mm into a bulb having an elliptical cross section. A pair of slender sealing portions 1a, 1a are integrally fixed to the ends in the long axis direction of the elliptical hermetic vessel 1.

The electrode 2 comprises an electrode shaft 2a and an electrode coil 2b. The tip portion of the electrode shaft 2a somewhat projects inward and, the electrode coil 2b is wound about the projecting tip portion of the electrode shaft 2a. The proximal end portion of the electrode shaft 2a is welded to one end of the sealed metal foil 3 within the sealing portion 1a. In this embodiment, the distance between the tips of the electrodes 2 is set at 4 mm. The sealed metal foil 3 consists of a molybdenum foil, which is hermetically sealed within the sealing portion 1a, and the outer lead wire 4 is welded to the other end of the metal (molybdenum) foil 3.

Sealed in the hermetic vessel 1 is a discharge medium consisting of a rare gas, a first halide, and a second halide. To be more specific, an argon gas was sealed as the rare gas at a pressure of $6.65 \times 10^4$ Pa. Dysprosium iodide ($DyI_3$) was sealed as the first-halide in an amount of 1 mg together with 1 mg of neodymium iodide ($NdI_3$). Further, 8 mg of each of the halides shown in Table 2 was sealed as the second halide.

The lamp voltage, light emitting efficiency and color temperature were measured with the input power set constant at 150 W in respect of the resultant short arc type metal halide discharge lamps, with the results as shown in Table 2. The data on the prior art, which was equal to the metal halide discharge lamp of the present invention except that 13 mg of mercury was sealed in place of the second halide, are also shown in Table 2.

TABLE 2

| Lamp No. | Second halide | Lamp voltage | Light emitting efficiency | Color temp. | Screen brightness ratio |
|---|---|---|---|---|---|
| 1* | — | 75 V | 71 lm/W | 8700 K | 1.0 |
| 2 | $AlI_3$ | 62 V | 72 lm/W | 9120 K | 1.4 |
| 3 | $FeI_2$ | 70 V | 70 lm/W | 9210 K | 1.35 |
| 4 | $ZnI_2$ | 73 V | 68 lm/W | 9160 K | 1.42 |
| 5 | $SbI_3$ | 63 V | 73 lm/W | 8930 K | 1.35 |
| 6 | $MnI_2$ | 55 V | 72 lm/W | 9040 K | 1.42 |
| 7 | $CrI_2$ | 58 V | 69 lm/W | 9100 K | 1.45 |
| 8 | $GaI_3$ | 59 V | 68 lm/W | 9030 K | 1.39 |
| 9 | $ReI_3$ | 61 V | 70 lm/W | 9240 K | 1.37 |
| 10 | $TiI_4$ | 72 V | 70 lm/W | 9220 K | 1.38 |

Note:
*Prior Art

As apparent from Table 2, any of the metal halide discharge lamps of the present invention exhibited a lamp voltage higher than 50V, and was found to be substantially equal to the conventional metal halide efficiency and the color temperature.

Figure 4:
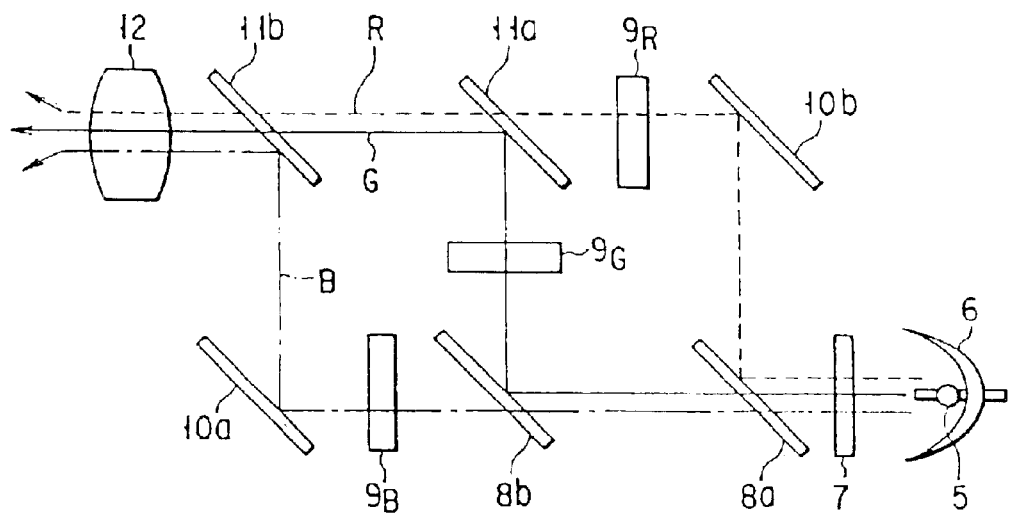
FIG. 4 is a schematical view showing the construction of an optical system of an RGB color separation type liquid crystal light projection.

Then, the screen brightness ratio was measured by using each of the metal halide discharge lamps shown in Table 2 in combination with the optical system of an RGB color separation type liquid crystal projector shown in FIG. 4, with the results as shown in Table 2. As shown in FIG. 4, the optical system comprises a metal halide discharge lamp 5 equal to that shown in FIG. 3, a reflector 6, an ultraviolet light-infrared light cut filter 7, color separation dichroic mirrors 8a, 8b, liquid crystal panels $9_B$, $9_G$, $9_R$, mirrors 10a, 10b, color synthesis mirrors 11a, 11b, and a projecting lens 12. The capital letters B, G, R shown in FIG. 4 represent the blue optical axis, green optical axis and red optical axis, respectively. The liquid crystal panels $9_B$, $9_G$, and $9_R$ are driven by image signals of blue, green and red, respectively. Table 2 shows that the screen brightness for the metal halide discharge lamp of the present invention was about 1.4 times as high as that for the prior art.

Figure 5:
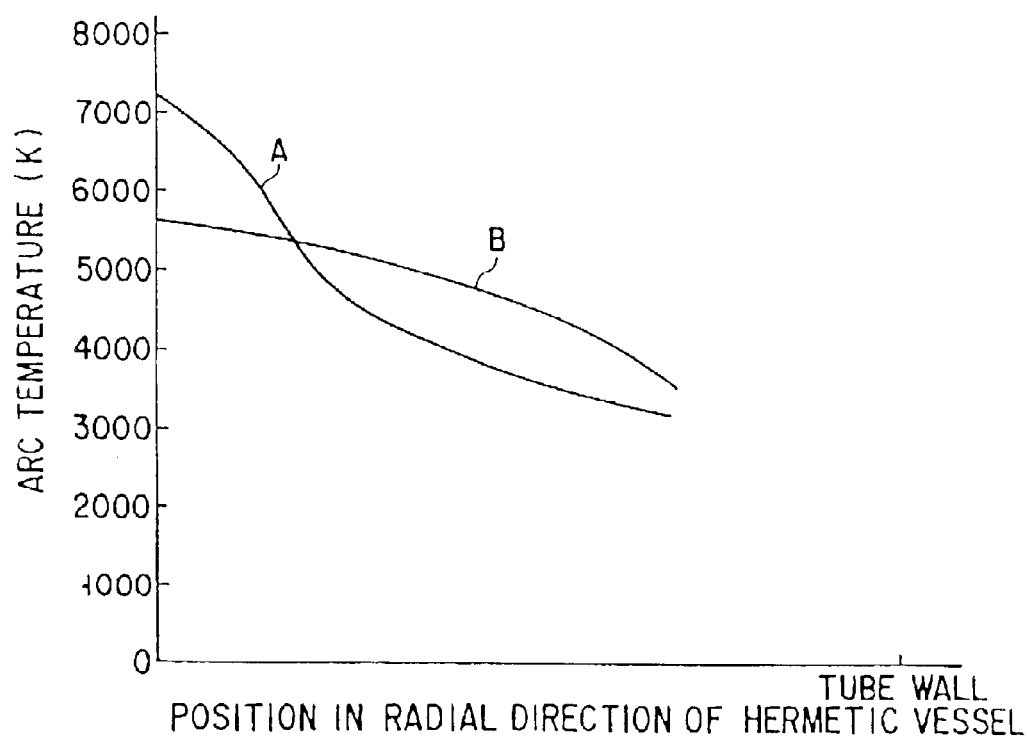
FIG. 5 is a graph showing the arc temperature distribution for lamp 2 (present invention) and lamp 1 (prior art), which are shown in Table 1.

Further, the arc temperature distribution was measured for each of the discharge lamp of the present invention (sample No. 2) and the conventional discharge lamp (sample No. 1), with the results as shown in FIG. 5. To be more specific, FIG. 5 is a graph showing the arc temperature distribution for samples No. 1 (prior art) and No. 2 (present invention). Plotted on the abscissa of the graph is the position in the radial direction of the hermetic vessel in a cross section perpendicular to the axis of the hermetic vessel and passing through the center between the two electrodes. On the other hand, plotted on the ordinate of the graph is the arc temperature (absolute temperature K). Curve A shown in FIG. 5 denotes the discharge lamp of the present invention (sample No. 2), with curve B representing the conventional discharge lamp (sample No. 1). As apparent from the graph, the arc is rendered narrower in the discharge lamp of the present invention (curve A).

Further, the color temperatures of samples Nos. 2 and 3 (present invention) and sample No. 1 (prior art) of the discharge lamps were measured, covering the cases where these discharge lamps were lit under input powers of 70 W, 90 W, 110 W and 130 W, with the results as shown in Table 3:

TABLE 3

| Sample No. | 70 W | 90 W | 110 W | 130 W |
|---|---|---|---|---|
| 1 (prior art) | 6510 K | 6930 K | 7560 K | 8030 K |
| 2 | 8630 K | 8740 K | 8900 K | 9060 K |
| 3 | 8720 K | 8860 K | 9030 K | 9180 K |

As described previously, where the input power is lowered, the light emission from mercury is rendered relatively predominant in the discharge lamp of the prior art (sample No. 1), leading to a marked reduction in the color temperature.

In the discharge lamps of the present invention (samples Nos. 2 and 3), however, the hermetic vessel is substantially free from mercury. Also, the emission of a visible light caused by the second halide is small. It follows that light is emitted mainly from the light emitting metal contained in the first halide even in the case of lowering the input power. It should also be noted that the color temperature is somewhat lowered because the vapor pressure of the light emitting metal is lowered with decrease in the input power.

In the experiments described above, the input power was decreased from 150W (see Table 2) to 70W (see Table 3). In this case, the color temperature was changed by 2190K; whereas, the change in the color temperature was at most 500K in the discharge lamps of the present invention.

Further, re-starting was evaluated, with the results as shown in Table 4:

TABLE 4

| Sample No. | 1* | 2 | 3 | 4 | 5 | 6 | 7 | 8 | 9 | 10 |
|---|---|---|---|---|---|---|---|---|---|---|
| Re-start voltage (kV) | 12 | 4 | 3 | 5 | 3 | 4 | 4 | 5 | 3 | 6 |

Note:
*Prior Art

As apparent from Table 4, the re-starting voltage is low in the discharge lamp of the present invention. This is because the vapor pressure of the second halide during the lighting is lower than that of mercury. To be more specific, the vapor pressure of the second halide in, for example, sample No. 3 of the discharge lamp of the present invention is 0.6 atmosphere, and the vapor pressures of the other second halides are at most 5 atmospheres. In sample No. 1 of the prior art, however, the vapor pressure of mercury is as high as 28 atmospheres, leading to the high re-start up voltage as shown in Table 4.

Figure 6:
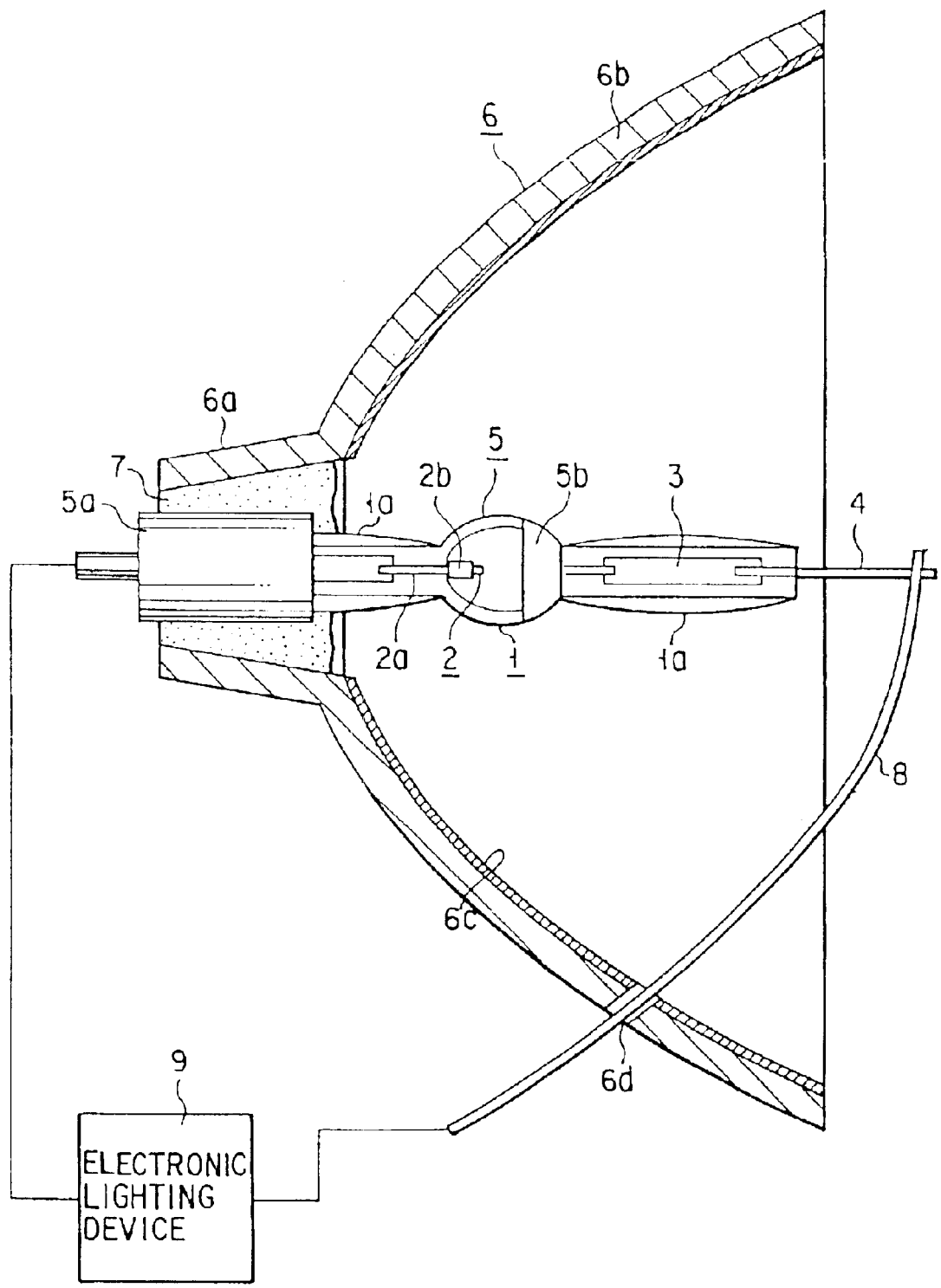
FIG. 6 is a cross sectional view showing a part of a lamp for a liquid crystal projector, said lamp comprising the metal halide discharge lamp according to the first embodiment of the present invention and a reflector formed integral with the discharge lamp.

FIG. 6 is a front view partly including a cross sectional view, showing a discharge lamp for a projector comprising the metal halide discharge lamp according to the first embodiment of the present invention and a reflector formed integral with the discharge lamp. The reference numerals common with FIGS. 3 and 6 denote the same members and, thus, reference thereto is omitted in the following description. In the embodiment shown in FIG. 6, a metal halide discharge lamp 5 equal to the discharge lamp shown in FIG. 3 and a reflector 6 are made integral. A reference numeral 5b shown in FIG. 6 represents a heat insulating film formed to cover the outer surface of the hermetic vessel 1 of the metal halide discharge lamp 5, said hermetic vessel 1 surrounding the electrode on the side of the light-projecting opening of the reflector 6.

The reflector 6, which is formed of a curved glass plate having a parabolic cross section, comprises a reflector main body 6b and a neck portion 6a positioned at the tip of the parabolic configuration. A multi-layered interference reflecting film 6c, which reflects a visible light and transmits an infrared light, is formed on the inner surface of the reflector main body 6b. Further, a through-hole 6d is formed in the reflector main body 6b.

The metal halide discharge lamp 5 includes a base 5a, which is fit within the neck portion 6a of the reflector 6 and fixed by a base cement 7. Further, a power supply wire 8 is led to the back side of the reflector 6 via the through-hole 6d of the reflector 6.

A reference numeral 9 represents an electronic lighting device serving to supply an electric power of a desired voltage and a desired lamp current to the metal halide discharge lamp 5.

Embodiment 2

Figure 7:
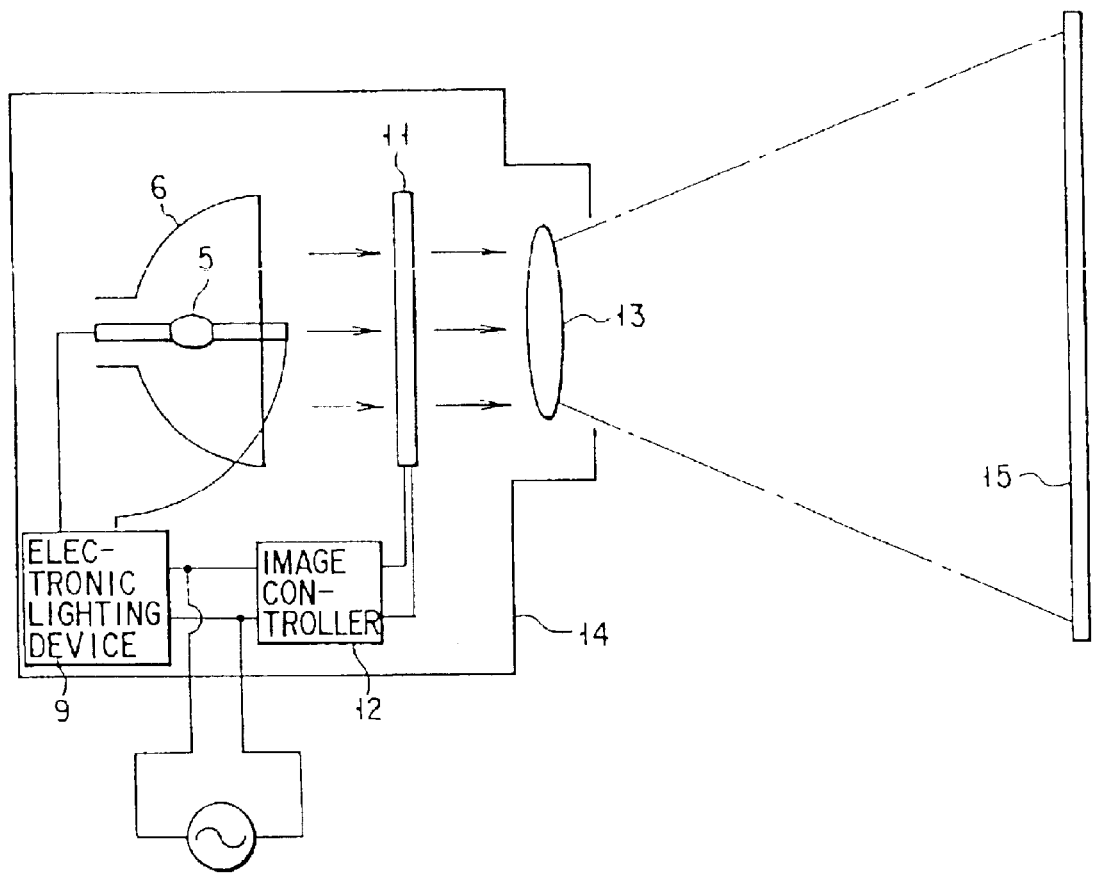
FIG. 7 is a schematical view showing a liquid crystal projector using the lamp for the projector shown in FIG. 6 as an illuminating apparatus according to the first embodiment of the present invention.

FIG. 7 schematically shows a liquid crystal projector as a first embodiment of the illumination apparatus of the present invention. The discharge lamp for the projector shown in FIG. 6 is used in the liquid crystal projector shown in FIG. 7. The reference numerals common with FIGS. 6 and 7 represent the same members of the projector and, thus, reference thereto is omitted in the following description.

As shown in the drawing, the liquid crystal projector comprises a liquid crystal display means 11, an image control means 12, an optical system 13, a body case 14, and a screen 15. The liquid crystal display means 11 serves to display the image to be displayed by utilizing a liquid crystal material. To be more specific, the liquid crystal display means 11 is irradiated with light emitted from behind the display means 11 by the metal halide discharge lamp 5 included in the metal halide discharge lamp apparatus and collected by the reflector 6. The image control means 12 serves to drive and control the liquid crystal display means 11. In short, the image control means 12 also performs the function of a television receiver. The liquid crystal display means 11 and the image control means 12 are housed in the body case 14. Further, the optical system 13 serves to project the light passing through the liquid crystal display means 11 onto the screen 15.

Embodiment 3

Figure 8:
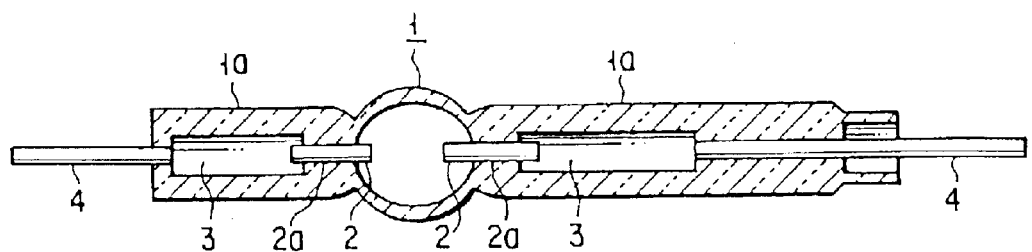
FIG. 8 is a cross sectional view showing a metal halide discharge lam according to a second embodiment of the present invention.

FIG. 8 is a cross sectional view, or front view, showing a metal halide discharge lamp according to a second embodiment of the present invention. The reference numerals common with FIGS. 3 and 8 denote the same members of the discharge lamp and, thus, reference thereto is omitted in the following description.

The metal halide discharge lamp of the second embodiment is also of a short arc type, and differs from the discharge lamp of the first embodiment in that, in the second embodiment, the inner volume of the hermetic vessel 1 is as small as 0.05 cc. It should also be noted that, in the second embodiment, the hermetic vessel 1 has an inner diameter of 4 mm. An electrode coil is not wound about the electrode 2. Further, the distance between the two electrodes is 4.2 mm.

The discharge medium used in the second embodiment consisted of a xenon gas sealed at 1 atmosphere, a first halide including scandium iodide ($ScI_3$) sealed in an amount of 0.14 mg and sodium iodide (NaI) sealed in an amount of 0.86 mg, and a second halide shown in Table 5. The second halide was sealed in the hermetic vessel 1 in an amount of 1 mg.

The metal halide discharge lamps thus prepared were tested for the lamp voltage, light emitting efficiency, general color rendering index, hereinafter referred to as "color rendering properties Ra", and color temperature, with the power input set constant at 35 W. Table 5 shows the results together with the results for sample No. 1 for the conventional metal halide discharge lamp. The conventional discharge lamp (sample No. 1) was equal to the discharge lamps of the present invention, except that 1 mg of mercury was sealed in sample No. 1 in place of the second halide sealed in the discharge lamps of the present invention.

TABLE 5

| Sample No. | Second halide | Lamp voltage | Light emitting efficiency | Color temp. | Screen brightness ratio |
|---|---|---|---|---|---|
| 1 (prior art) | — | 83 V | 80 lm/W | 63 | 4120 K |
| 2 | $AlI_3$ | 62 V | 78 lm/W | 65 | 3860 K |
| 3 | $FeI_2$ | 70 V | 73 lm/W | 71 | 4210 K |
| 4 | $ZnI_2$ | 75 V | 78 lm/W | 65 | 3830 K |
| 5 | $SbI_3$ | 63 V | 75 lm/W | 66 | 3790 K |
| 6 | $MnI_2$ | 55 V | 72 lm/W | 68 | 3950 K |
| 7 | $CrI_2$ | 58 V | 74 lm/W | 65 | 3860 K |
| 8 | $GaI_3$ | 59 V | 76 lm/W | 66 | 3760 K |
| 9 | $ReI_3$ | 61 V | 78 lm/W | 64 | 3840 K |

As apparent from Table 5, the lamp voltage for the metal halide discharge lamp of the present invention was found to be higher than 50V. Also, the discharge lamp of the present invention, which was somewhat lower in the light emitting efficiency than the prior art (sample No. 1), was found to permit improving the color rendering properties. The experimental data given in Table 5 clearly supports that the metal halide discharge lamp of the present invention is substantially equal to the prior art in the characteristics under the stationary condition.

Then, sample No. 3 of the discharge lamp of the present invention and sample No. 1 of the conventional discharge lamp were tested for the color rendering properties and the color temperature under the condition that each of these discharge lamps was lit with an input power of 15 W, 20 W, 25 W and 30 W, with the results as shown in Table 6:

TABLE 6

| Sample No. | 15 W | 20 W | 25 W | 30 W |
|---|---|---|---|---|
| 1 (Prior Art) | | | | |
| Color Rendering Properties (Ra) | 40 | 45 | 58 | 61 |
| Color Temperature (K) | 5640 | 4970 | 4630 | 4350 |
| 3 (Present Invention) | | | | |
| Color Rendering Properties (Ra) | 63 | 64 | 66 | 69 |
| Color Temperature (K) | 4530 | 4440 | 4310 | 4240 |

As shown in Table 6, the changes in the color temperature and color rendering properties were 1520K and 23, respectively, in the conventional discharge lamp (sample No. 1), where the input power was changed from 35 W (see Table 5) to 15 W. These changes are very large, making it practically impossible to apply light control (dimming) to the discharge lamp.

In the discharge lamp of the present invention (sample No. 3), however, the changes in the color temperature and color rendering properties were as small as 320K and 8, respectively, with the result that it is of no difficulty to apply light control to the discharge lamp.

Further, re-starting of the discharge lamps (samples Nos. 1 and 3) was also evaluated. In this experiment, sample No. 10 of a discharge lamp, which was equal to the discharge lamp of sample No. 3 except that a xenon gas was sealed in the hermetic vessel at a pressure of $1.33 \times 10^4$ Pa, was also tested for the re-starting voltage. Table 7 shows the results:

TABLE 7

| Sample No. | 1 (prior art) | 3 | 10 |
|---|---|---|---|
| Re-starting voltage (kV) | 14 | 7 | 3 |

Table 7 clearly shows that the re-starting voltage for the discharge lamp of the present invention is substantially less than half the value for the prior art (sample No. 1). Particularly, a marked improvement was recognized in sample No. 10 in which the rare gas (xenon) was sealed at a low pressure without placing a high importance to the rising of the light flux.

Figure 9:
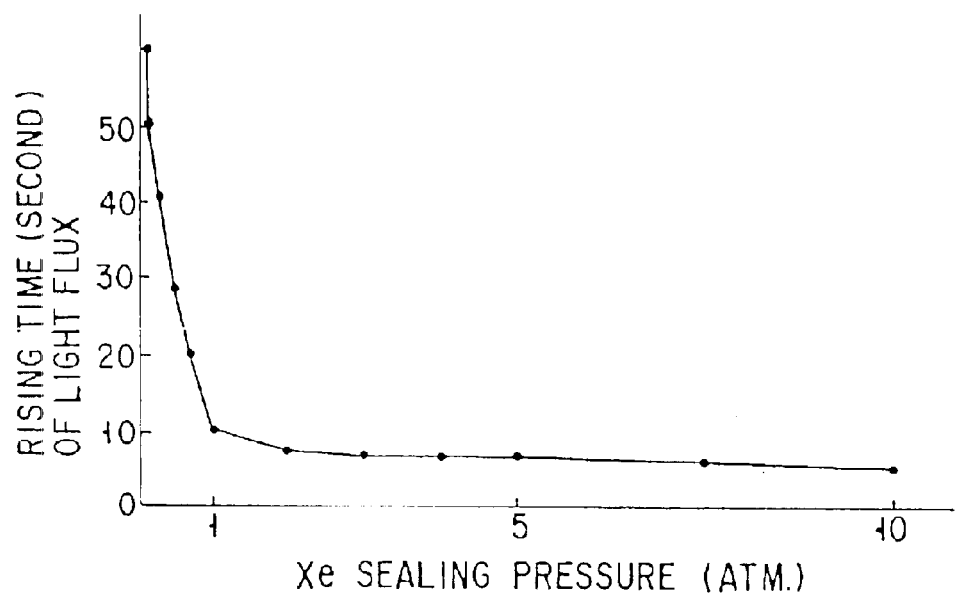
FIG. 9 is a graph showing the relationship between the xenon sealing pressure and the rising time of the light flux in the metal halide discharge lamp according to the second embodiment of the present invention.

FIG. 9 is a graph showing the relationship between the sealing pressure of xenon gas and the rising time of the light flux in the metal halide discharge lamp according to the second embodiment of the present invention. In this graph, the xenon sealing pressure (atmospheres) is plotted on the abscissa, with the rising time (seconds) of the light flux being plotted on the ordinate. As apparent from FIG. 9, the rising time of the light flux is markedly shortened where the xenon sealing pressure is higher than one atmosphere, but is prominently long where the xenon sealing pressure is lower than one atmosphere.

Figure 10:
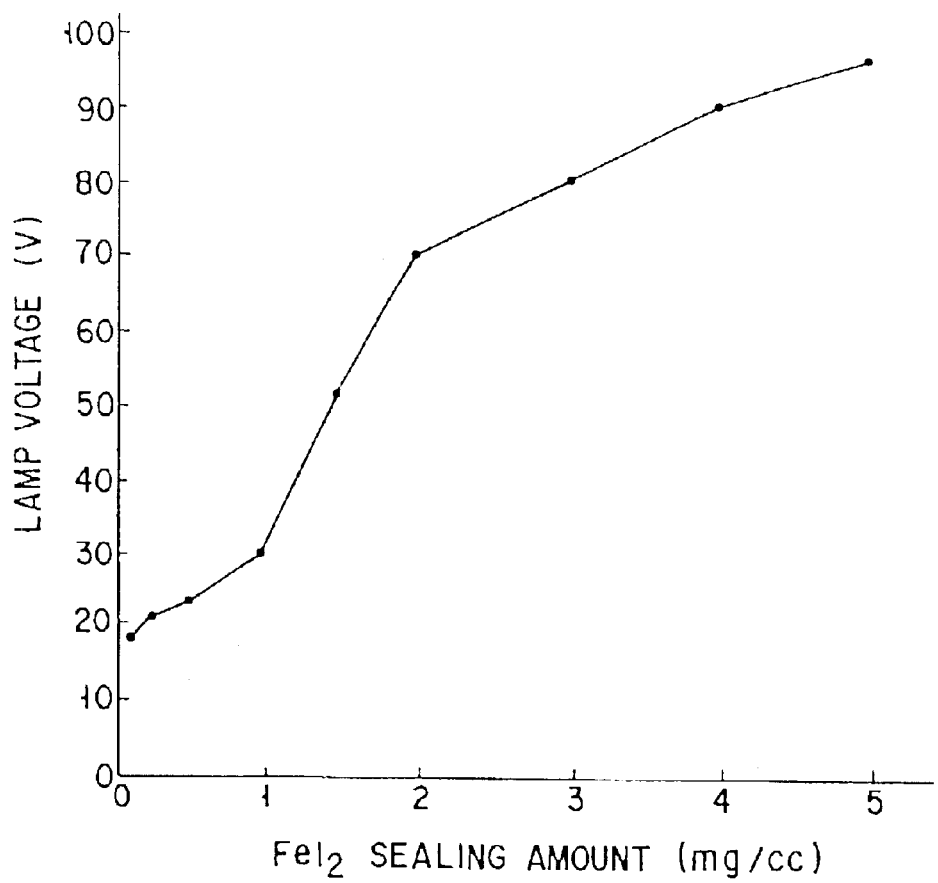
FIG. 10 is a graph showing the relationship between the sealing amount of $FeI_2$ used as a second halide and the lamp voltage in the metal halide discharge lamp according to the second embodiment of the present invention.

FIG. 10 is a graph showing the relationship between the sealing amount of iron iodide ($FeI_2$) as the second halide and the lamp voltage in respect of the metal halide discharge lamp according to the second embodiment of the present invention. In this graph, the sealing amount of iron iodide (mg/cc) is plotted on the abscissa, with the lamp voltage (V) being plotted on the ordinate. FIG. 10 shows that the lamp voltage exceeds 30V where the $FeI_2$ sealing amount exceeds 1 mg/cc of the inner volume of the hermetic vessel. Incidentally, where the $FeI_2$ sealing amount exceeds 200 mg/cc of the inner volume of the hermetic vessel, $FeI_2$ partly fails to be evaporated. The $FeI_2$ failing to be evaporated absorbs light, leading to a low light emitting efficiency of the discharge lamp.

Embodiment 4

Figure 11:
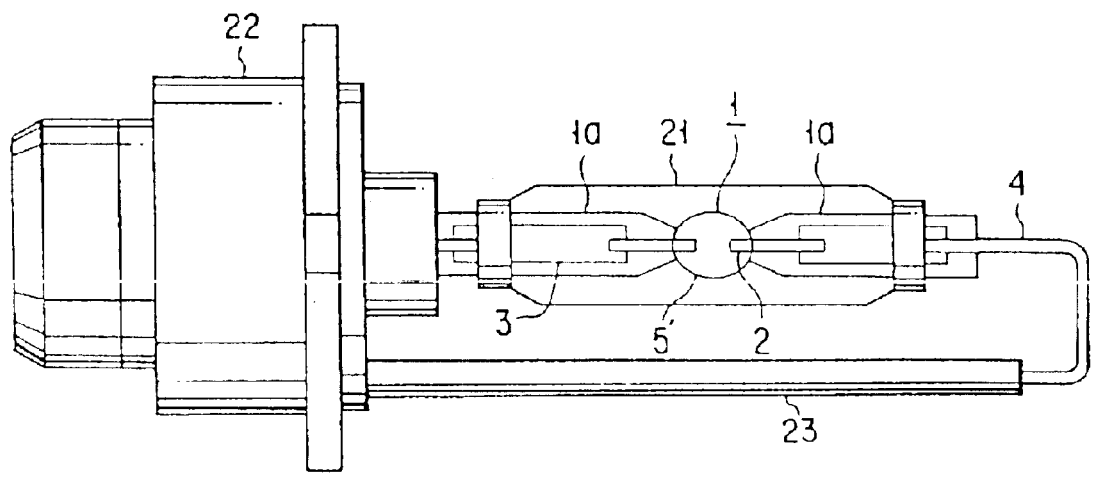
FIG. 11 is a front view showing a metal halide discharge lamp according to a third embodiment of the present invention.

FIG. 11 is a front view showing a metal halide discharge lamp according to a third embodiment of the present invention. In this embodiment, a small short arc type metal halide discharge lamp similar to that shown in FIG. 8 is constructed to be adapted for mounting in a headlamp for a vehicle such as an automobile. As seen from the drawing, the discharge lamp of the third embodiment comprises an outer tube 21, a base 22 and an insulating tube 23.

The outer tube 21 is capable of shielding an ultraviolet light. A metal halide discharge lamp 5' substantially equal in construction to the discharge lamp shown in FIG. 8 is housed in the outer tube 21. Also, the outer tube 21, which is fixed at both ends to the sealing portions 1a, is not hermetic but communicates with the outer atmosphere. One sealing portion 1a is mounted to the base 22. The outer lead wire 4 led out of the other end extends in parallel to the outer tube 21 so as to be introduced into the base 22 and connected to a terminal (not shown) within the base 22. Further, the outer lead wire 4 is covered with the insulating tube 23.

Embodiment 5

Figure 12:
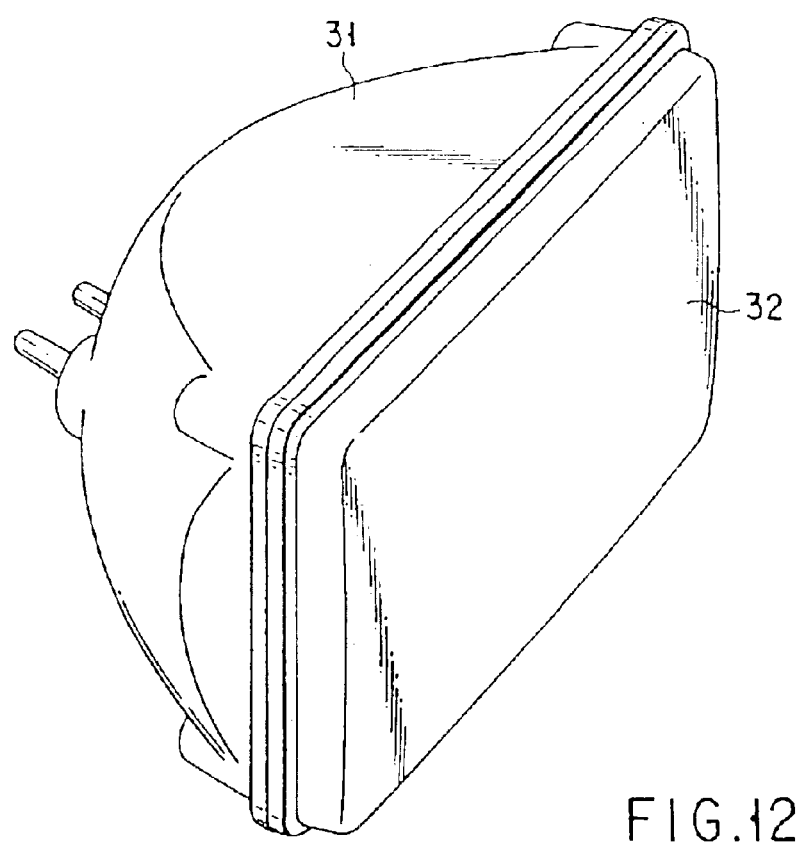
FIG. 12 is an oblique view showing a headlamp used in a vehicle such as an automobile as an illumination device according to the second embodiment of the present invention.

FIG. 12 is an oblique view showing a headlamp for a vehicle such as an automobile as a second embodiment of the illumination apparatus of the present invention. As shown in the drawing, the headlamp of the present invention comprises a reflector 31 and a front cover 32. The reflector 31 is formed of a curved plastic plate having a parabolic cross section including a tip on the back surface. A metal halide discharge lamp shown in FIG. 11, which is not shown in FIG. 12, is attached to or detached from the reflector 31 from the back surface at the tip of the reflector 31.

On the other hand, the front cover 32, which is formed of a transparent plastic plate, is mounted to close hermetically the front opening of the reflector 31. Incidentally, a prism or a lens is formed integral with the front cover 32.

Embodiment 6

Figure 13:
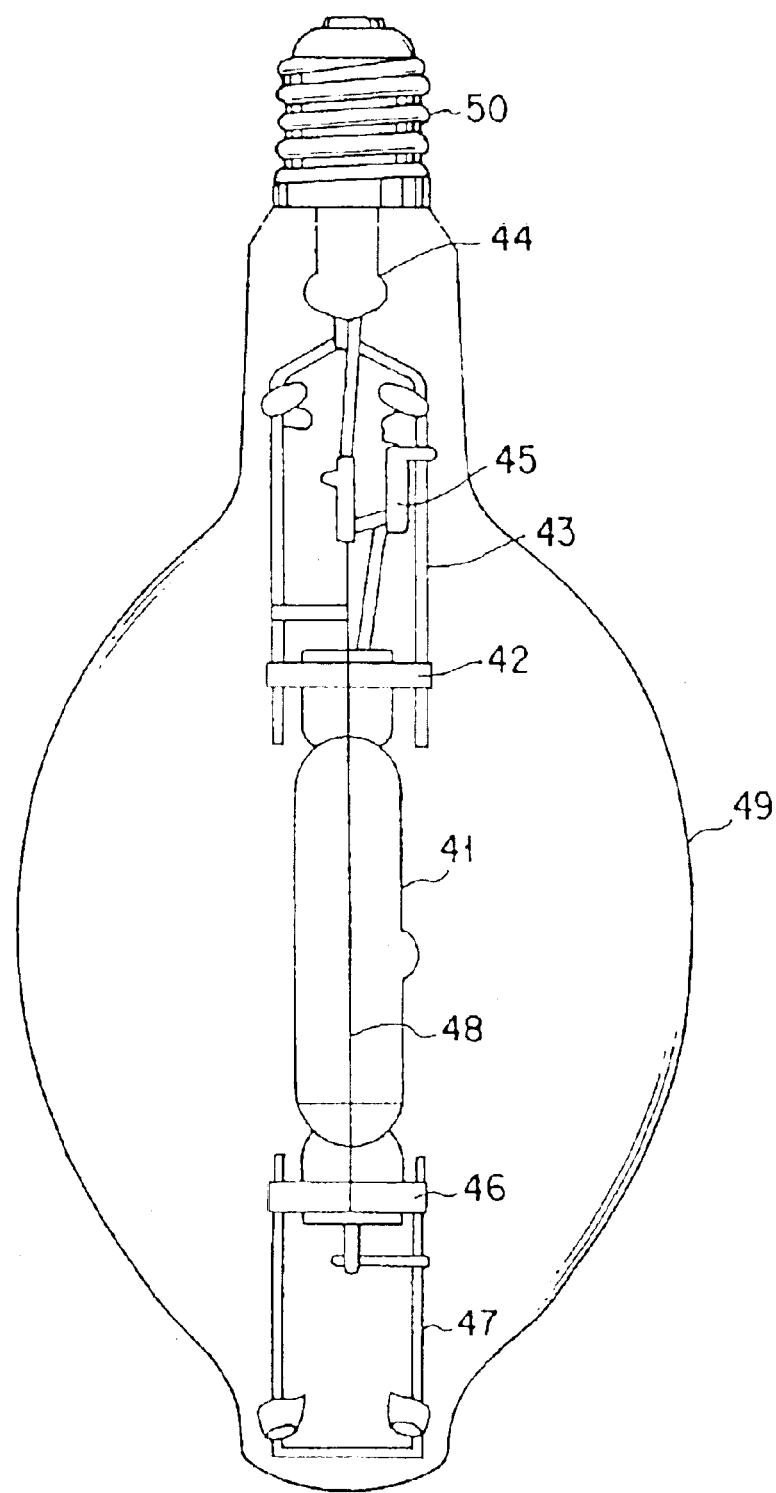
FIG. 13 is a front view showing a metal halide discharge lamp according to a fourth embodiment of the present invention.

FIG. 13 is a front view showing a metal halide discharge lamp according to a fourth embodiment of the present invention. As shown in the drawing, the discharge lamp of the fourth embodiment comprises a light emitting tube 41, a first support band 42, a first conductor frame 43, a flare stem 44, a bimetal and starting resistor 45, a second support band 46, a second conductor frame 47, a conductor wire 48, an outer tube 49 and a base 50.

The light emitting tube 41 comprises a slender quartz glass tube having an inner diameter of 20 mm. A pair of main electrodes are sealed at both ends of the quartz glass tube. Also, a starting auxiliary electrode is sealed in the vicinity of one of the main electrodes. The distance between the main electrodes is set at 42 mm.

The first support band 42 is fixed to the first conductor frame 43 in a manner to embrace a pinch sealing portion above the light emitting tube 41 in the drawing. The first conductor frame 43, which is fixed to the flare stem 44, serves to apply a voltage to the main electrode above the light emitting tube 41. The flare stem 44 is fixed to a neck portion of the outer tube 49. Further, the bimetal or starting resistor 45 forms a starting circuit and serves to apply at the starting time a voltage of a polarity opposite to that of the main electrode formed in the vicinity of the starting auxiliary electrode.

The second support band 46 is fixed to the second conductor frame 47 in a manner to embrace the pinch sealing portion in a lower portion of the light emitting tube 41 in the drawing. The second conductor frame 47 is fixed to a top portion of the outer tube 49. Further, the conductor wire 48 is connected at one end to a conductor wire of the flare stem 44 and at the other end to the second support band 46 so as to be connected to the other main electrode of the light emitting tube 41 via the second conductor frame 47.

The light emitting tube 41 of the construction described above and the bimetal or starting resistor 45 are mounted within the outer tube 49. Further, an initial getter (not shown) is mounted within the outer tube 49 so as to have the impurity gases within the outer tube 49 adsorbed on the getter.

Sealed inside the light emitting tube 41 were 3 mg of scandium iodide ($ScI_3$) and 15 mg of sodium iodide (NaI) as the first halides. Also sealed was 20 mg of the second halide shown in Table 8 together with $2.66 \times 10^3$ pa of argon as a rare gas. As a result, prepared were 15 kinds of metal halide discharge lamps. Among these discharge lamps, sample No. 14 of the discharge lamp was equal to sample No. 2 of the discharge lamp, except that 5 mg of $ZnI_2$ was further sealed in the light emitting tube in sample No. 14. Likewise, sample No. 15 of the discharge lamp was equal to sample No. 10 of the discharge lamp, except that 5 mg of $FeI_2$ was further sealed in the light emitting tube in sample No. 15. Each of these samples 14 and 15 was intended to increase the lamp voltage by sealing a plurality of the second halide compounds in the light emitting tube.

For comparison, a conventional metal halide discharge lamp was also prepared as sample No. 1 by sealing 40 mg of mercury in the light emitting tube in place of the second halide specified in the present invention. These discharge lamps including the conventional discharge lamp (sample No. 1) were lit with the lamp input power set constant at 400 W for evaluating the lamp voltage, light emitting efficiency, color temperature and color rendering properties. The results are shown in Table 8:

TABLE 8

| Sample No. | Second halide | Lamp voltage | Light emitting efficiency | Color rendering properties (Ra) | Color temperature |
|---|---|---|---|---|---|
| 1 (Prior Art) | — | 132 V | 101 lm/W | 62 | 4320 K |
| 2 | $AlI_3$ | 112 V | 96 lm/W | 65 | 4120 K |
| 3 | $FeI_2$ | 118 V | 95 lm/W | 68 | 4510 K |
| 4 | $ZnI_2$ | 120 V | 98 lm/W | 65 | 4160 K |
| 5 | $SbI_3$ | 114 V | 94 lm/W | 69 | 4040 K |
| 6 | $MnI_2$ | 83 V | 93 lm/W | 64 | 4210 K |
| 7 | $CrI_2$ | 109 V | 96 lm/W | 68 | 4260 K |
| 8 | $GaI_3$ | 125 V | 97 lm/W | 67 | 4130 K |
| 9 | $ReI_3$ | 103 V | 91 lm/W | 69 | 4240 K |
| 10 | $MgI_2$ | 78 V | 95 lm/W | 66 | 4140 K |
| 11 | $CoI_2$ | 118 V | 95 lm/W | 68 | 4480 K |
| 12 | $NiI_2$ | 109 V | 95 lm/W | 69 | 4410 K |
| 13 | $BeI_2$ | 95 V | 93 lm/W | 63 | 4210 K |
| 14 | $AlI_3 + ZnI_2$ | 137 V | 97 lm/W | 65 | 4150 K |
| 15 | $MgI_2 + FeI_2$ | 105 V | 95 lm/W | 67 | 4210 K |

Let us describe the electrical characteristics of the metal halide discharge lamp according to the fourth embodiment of the present invention.

As apparent from Table 8, the lamp voltage of the conventional metal halide discharge lamp is determined by the sealing amount of mercury. On the other hand, the lamp voltage of the discharge lamp according to the fourth embodiment of the present invention is determined mainly by the amount of evaporation of the second halide. In this case, if a heat insulating means is mounted to the light emitting tube, it is possible to permit, for example, $FeI_2$ sealed in sample No. 3 of the discharge lamp to be evaporated in an amount required for obtaining a desired lamp voltage. It follows that it is possible to obtain a lamp voltage fully comparable with that of the conventional discharge lamp by applying a heat insulating means to the light emitting tube 41.

Then, let us describe the light emitting characteristics. Specifically, in sample No. 3 of the discharge lamp, a visible light is emitted slightly from iron contained in the second halide of $FeI_2$. However, light emission from mercury is not observed. In sample No. 3, the light emitting efficiency is somewhat lowered. However, the color rendering properties are somewhat improved. It should be noted that, a strong ultraviolet, light is emitted if an iron halide is sealed singly in the light emitting tube. However, if a first halide is sealed together with the iron halide, the strong emission of the ultraviolet light has been found to be markedly weakened. Further, the ultraviolet light emission is weakened where an iron halide is used together with another second halide.

As described above, the long arc type metal halide discharge lamp of the present invention also produces the electrical characteristics and light emitting characteristics of the discharge lamp substantially equal to those produced by the conventional discharge lamp having mercury sealed therein, though the discharge lamp of the present invention is substantially free from the mercury sealing.

Further, as apparent from samples Nos. 15 and 16, the lamp voltage can be controlled at a level similar to that of the conventional discharge lamp having mercury sealed therein by sealing together a plurality of second halides containing different metals.

Then, samples Nos. 1 and 2 of the discharge lamps equal in construction to the discharge lamp according to the fourth embodiment of the present invention were tested for the color rendering properties and the color temperature under the condition that each of these discharge lamps was lit with a lamp power of 350 W, 300 W, 250 W and 20 W, with the results as shown in Table 9:

TABLE 9

| Sample No. | 200 W | 250 W | 300 W | 350 W |
|---|---|---|---|---|
| 1 (Prior Art) | | | | |
| Color Rendering Properties (Ra) | 38 | 46 | 54 | 60 |
| Color Temperature (K) | 6010 | 5630 | 5160 | 4530 |
| 2 (Present Invention) | | | | |
| Color Rendering Properties (Ra) | 60 | 61 | 62 | 64 |
| Color Temperature (K) | 4560 | 4450 | 4220 | 4100 |

As apparent from Table 9, the color temperature is markedly increased and the color rendering properties are markedly lowered, with decrease in the lamp power in the conventional discharge lamp (sample No. 1). In the discharge lamp of the present invention (sample No. 2), however, the color rendering properties and the color temperature remain substantially unchanged in spite of the change in the lamp power, making it possible to perform light control (dimming).

Figure 14:
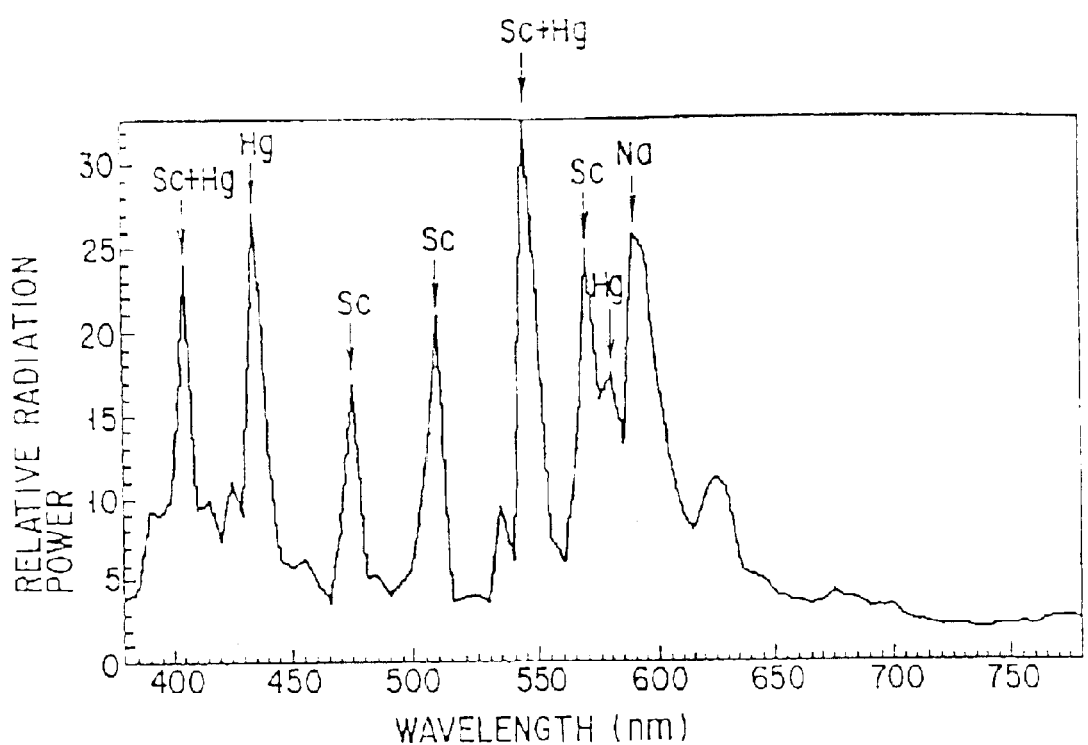
FIG. 14 is a graph showing the spectral distribution of a conventional long arc type metal halide discharge lamp.
Figure 15:
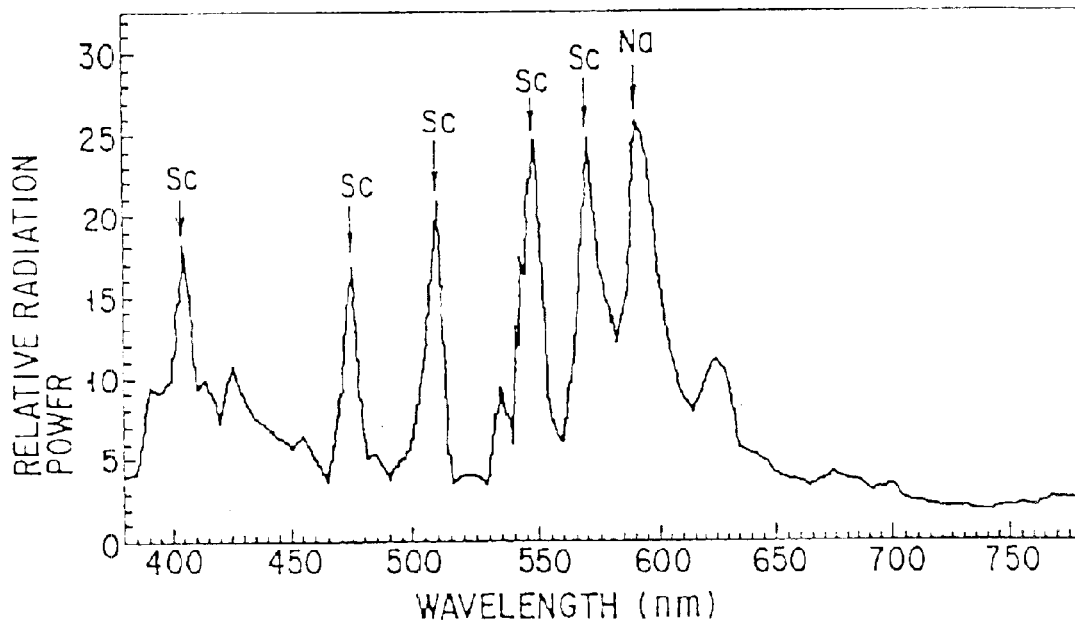
FIG. 15 is a graph showing the spectral distribution of a long arc type metal halide discharge lamp according to the fourth embodiment of the present invention.

FIG. 14 is a graph showing the spectral distribution of the conventional long arc type metal halide discharge lamp. On the other hand, FIG. 15 is a graph showing the spectral distribution of the long arc type metal halide discharge lamp according to the fourth embodiment of the present invention. In each of the graphs shown in FIGS. 14 and 15, the wavelength (nm) is plotted on the abscissa, with a relative discharge power (%) being plotted on the ordinate.

FIG. 14 covers sample No. 1 of the conventional metal halide discharge lamp shown in Table 8. The main bright-line spectra are caused by the elements denoted above the arrows in the drawing. To be more specific, the light emitted from the conventional discharge lamp (sample No. 1) consists mainly of light rays emitted from scandium (Sc), sodium (Na) and mercury (Hg). Since scandium iodide ($ScI_3$) and sodium iodide (NaI) have a low vapor pressure, the evaporation amounts of these metal iodides are decreased with decrease in the lamp input in the conventional discharge lamp (sample No. 1). On the other hand, mercury has a high vapor pressure. As a result, mercury is entirely evaporated even if the lamp input is decreased to 200 W. It follows that, if the lamp power is lowered, the light emission from mercury is rendered relatively predominant, leading to increase in the color temperature. What should be noted is that, if the lamp power is changed for the dimming purpose in the conventional discharge lamp, a large change in the color temperature is brought about.

When it comes to the metal halide discharge lamp according to the fourth embodiment of the present invention, both sodium and scandium are decreased with substantially the same rate in accordance with decrease in the lamp power. In addition, since the second halide emits a visible light only slightly, the light emitting characteristics of the metal halide discharge lamp are scarcely affected. It follows that the color temperature remains substantially constant regardless of decrease in the lamp power. To be more specific, the change in the color temperature was as large as 1690K in the conventional discharge lamp (sample No. 1) in contrast to only 440K for the discharge lamp according to the fourth embodiment of the present invention, when the lamp power was changed from 400 W to 200 W, as apparent from the experimental data given in Tables 8 and 9.

Embodiment 7

Figure 16:
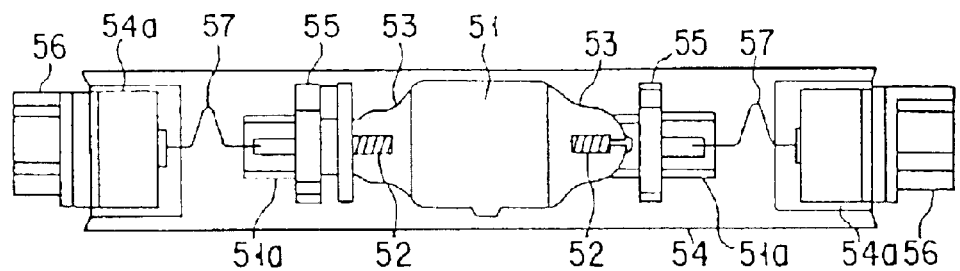
FIG. 16 is a front view showing a metal halide discharge lamp according to a fifth embodiment of the present invention.

FIG. 16 is a front view showing a cross section of a metal halide discharge lamp according to a fifth embodiment of the present invention. As shown in the drawing, the discharge lamp comprises a hermetic vessel 51, a pair of electrodes 52, a heat insulating means 53, an outer tube 54, a support band 55, a base 56, and a conductor wire 57. The hermetic vessel 51, which is made of a quartz glass, has an inner diameter of 12 mm. Pinch sealing portions 51a are formed on both end portions of the hermetic vessel 51. The electrode 52 is positioned in a central portion of the small diameter portion at the end of the hermetic vessel 51. The substrate portion of the electrode 52 is buried in the pinch sealing portion 51a so as to permit the electrode 52 to be fixed to the hermetic vessel 51. Further, the distance between the two electrodes 52 is set at 17 mm.

The heat insulating means 53 is arranged to cover the outer surface of that region of the hermetic vessel 51 which surrounds the electrode 52. The outer tube 54 comprises a quartz glass cylinder. The both open ends of the cylinder are sealed by pinch sealing portions 54a. The hermetic vessel 51 is housed in the outer tube 54 with the support bands 55, 55 interposed therebetween such that a relatively small free space is formed within the outer tube 54. The base 56 is fixed to the pinch sealing portion 54a by using a base cement. Further, the pinch sealing portion 54a of the outer tube 54 is electrically connected to the pinch sealing portion 51a of the hermetic vessel 51 by the conductor wire 57.

Sealed in the hermetic vessel 51 were 1.5 mg of scandium iodide as a first halide, 7.5 mg of sodium iodide as a first halide, $2.66 \times 10^3$ Pa of argon as a rare gas, and 5 mg of the second halide shown in Table 10 so as to prepare a metal halide discharge lamp constructed as described above. For comparison, also prepared was a conventional metal halide discharge lamp of the same construction, except that 12.5 mg of mercury was sealed in the hermetic vessel 51 in place of the second halide sealed in the discharge lamp of the present invention.

Each of the discharge lamps thus prepared was lit at a lamp input of 100 W so as to evaluate the lamp voltage, light emitting efficiency, color temperature, and general color rendering index Ra, with the results as shown in Table 10:

TABLE 10

| Sample No. | Second halide | Lamp voltage | Light emitting efficiency | Color rendering properties (Ra) | Color temperature |
|---|---|---|---|---|---|
| 1 (Prior Art) | — | 122 V | 71 lm/W | 61 | 4120 K |
| 2 | $AlI_3$ | 112 V | 67 lm/W | 65 | 4140 K |
| 3 | $FeI_2$ | 110 V | 66 lm/W | 67 | 4480 K |
| 4 | $ZnI_2$ | 111 V | 68 lm/W | 64 | 4160 K |
| 5 | $SbI_3$ | 106 V | 63 lm/W | 68 | 4140 K |
| 6 | $MnI_2$ | 80 V | 66 lm/W | 64 | 4250 K |
| 7 | $CrI_2$ | 109 V | 66 lm/W | 68 | 4230 K |
| 8 | $GaI_3$ | 115 V | 67 lm/W | 67 | 4180 K |
| 9 | $CoI_2$ | 110 V | 65 lm/W | 66 | 4380 K |
| 10 | $NiI_2$ | 105 V | 65 lm/W | 68 | 4460 K |

As apparent from Table 10, the metal halide discharge lamp according to the fifth embodiment of the present invention, in which mercury is not sealed in the hermetic vessel, produces the electrical and light emitting characteristics substantially equal to those produced by the conventional metal halide discharge lamp having mercury sealed in the hermetic vessel.

Let us describe the pressure during the lighting of the discharge lamp of the fifth embodiment with reference to sample No. 2 (present invention) and sample No. 1 (prior art).

First of all, the pressure during the lighting of the discharge lamp of sample No. 1 (prior art) is proportional to the amount of mercury (the number of mols). Likewise, the pressure during the lighting of the discharge lamp of sample No. 2 (present invention) is proportional to the amount of aluminum iodide ($AlI_3$). In terms of the number of mols, the ratio of the mercury amount in sample No. 1 to the aluminum iodide amount in sample No. 2 is about 5:1. It follows that the ratio of sample No. 1 to sample No. 2 in terms of the pressure during the lighting of the discharge lamp is also about 5:1. Since the estimated pressure for sample No. 1 is about 15 atmospheres, the pressure for sample No. 2 is about 3 atmospheres.

The metal halide discharge lamp gives rise to a problem that the quartz glass forming the light emitting tube reacts with the halide, with the result that the quartz glass is rendered brittle during the use of the discharge lamp over a long period of time. It follows that the light emitting tube is rendered incapable of withstanding the internal pressure, leading to breakage of the light emitting tube.

What should be noted in this connection is that the light emitting tube is substantially free from mercury in the discharge lamp of the present invention. It follows that the internal pressure of the light emitting tube is held low during the lighting of the discharge lamp. Naturally, the danger of the light emitting tube breakage can be markedly suppressed in the present invention.

Further, sample No. 2 of the metal halide discharge lamp according to the fifth embodiment of the present invention was tested together with sample No. 1 for the prior art for the rising of the spectral characteristics. Used in this experiment was a lighting circuit which permits the rising of the light flux to become 100% in 8 seconds after the switching on. The spectral distribution of the visible light emitted from samples Nos. 1 and 2 of the discharge lamps was measured every second after the switching on by using an instant spectroscope, and chromaticity coordinates for each second were calculated on the basis of the spectral distribution thus measured.

Figure 17:
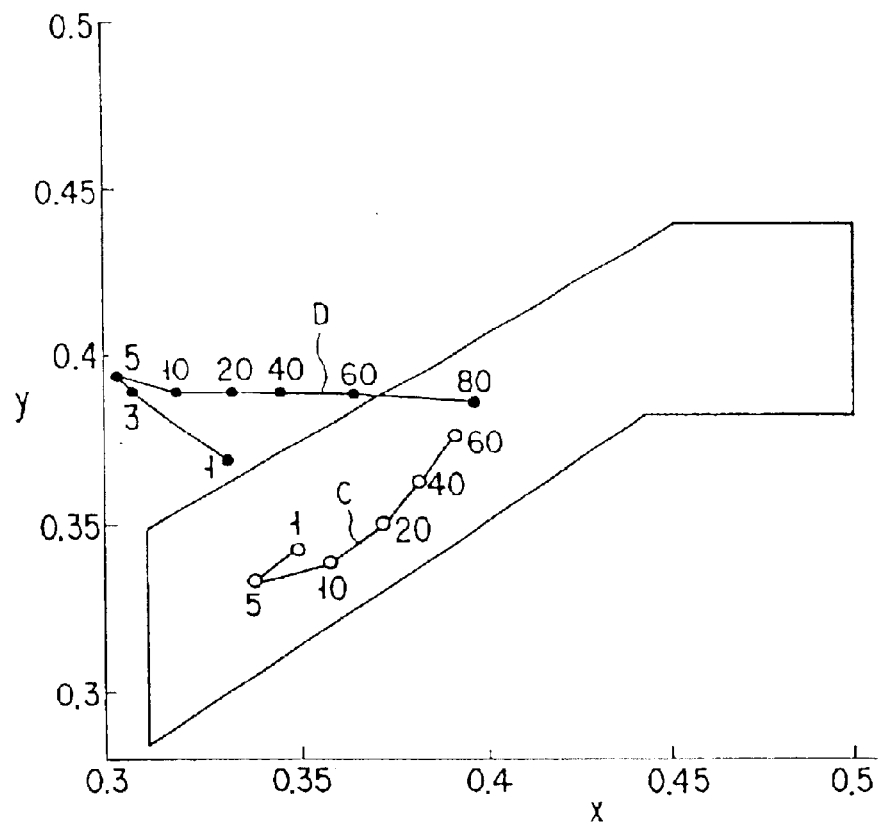
FIG. 17 is a chromaticity diagram showing the rising in the spectral characteristics of the metal halide discharge lamp according to the fifth embodiment of the present invention in comparison with the prior art.

FIG. 17 is a graph of chromaticity showing the rising of the spectral characteristics for the metal halide discharge lamp according to the fifth embodiment of the present invention and for the conventional metal halide discharge lamp. In the graph of FIG. 17, the x-axis of the chromaticity coordinates is plotted on the abscissa, with the y-axis of the chromaticity coordinates being plotted on the ordinate. The region surrounded by a frame of solid line in FIG. 17 represents a white region for a headlamp for an automobile, which is specified in Japanese Industrial Standards (JIS). Curve C in FIG. 17 represents the rising of the spectral distribution for sample No. 2 of the metal halide discharge lamp according to the fifth embodiment of the present invention. On the other hand, curve D denotes the rising of the spectral characteristics for sample No. 2 of the conventional discharge lamp.

Curve D in the graph clearly shows that the spectral characteristics for the conventional discharge lamp (sample No. 1) were poor in the initial stage, failing to fall within the white region specified in JIS. This is because mercury alone emits light in the conventional discharge lamp. It took about one minute for the spectral characteristics to fall within the white region.

On the other hand, the spectral characteristics for the sample No. 2 of the discharge lamp of the present invention fell within the white region immediately after the switching on. This is because light was emitted from both sodium and scandium. It follows that the metal halide discharge lamp according to the fifth embodiment of the present invention is adapted for use in the field in which are required both prompt rising of the light flux and prompt rising of the spectral characteristics after the switching on.

Embodiment 8

Figure 18:
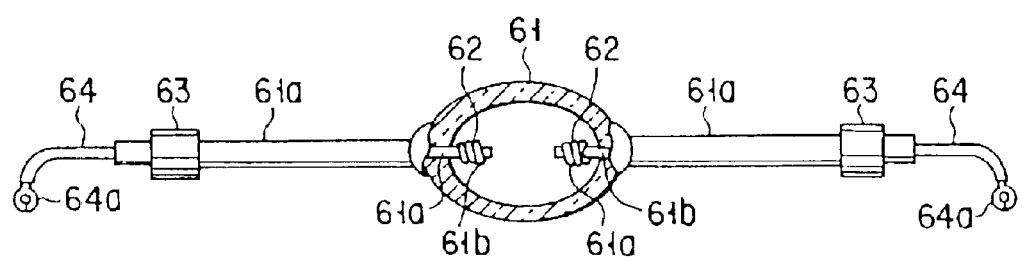
FIG. 18 is a front view showing the gist portion of a metal halide discharge lamp according to a sixth embodiment of the present invention.

FIG. 18 is a cross sectional view showing a gist portion of a metal halide discharge lamp according to a sixth embodiment of the present invention. As shown in the drawing, the discharge lamp comprises a hermetic vessel 61, a pair of electrodes 62, a base 63, and an outer lead wire 64. The hermetic vessel 61 is made of a quartz glass and has an elliptical cross section. The largest inner diameter of the hermetic vessel 61 is 32 mm. Slender sealing portions 61a extend outward from both ends of the hermetic vessel 61. The hermetic vessel 61 is sealed within the sealing portion 61a with a sealing metal foil made of molybdenum arranged within the sealing portion 61a. An electric current is supplied to the electrode 62 through the molybdenum foil. The electrode 62 consists of an electrode shaft 62a and a coil 62b. The proximal end portion of the electrode shaft 62a is buried in and supported by the sealing portion 61a. In this embodiment, the distance between the two electrodes 62, 62 is set at 30 mm. The base 63 is mounted to an end portion of the sealing portion 61a by a base cement, and the outer lead wire 64 extends to the outside through a hole formed along the axis of the sealing portion 61a. The outer lead wire 64, which is covered with an insulating film, is provided with a connection terminal 64a at the tip.

Prepared was a metal halide discharge lamp by sealing in the hermetic vessel 61 first halides consisting of 4 mg of dysprosium bromide ($DyBr_3$), 4 mg of holmium bromide ($HoBr_3$), and thulium bromide ($TmBr_3$). Also sealed were $1.33 \times 10^4$ Pa of argon as a rare gas and 30 mg of a second halide shown in Table 11.

A conventional metal halide discharge lamp was also prepared similarly for the purpose of comparison, except that 90 mg of mercury was sealed in the hermetic vessel 61 in place of the second halide sealed in the discharge lamp of the present invention.

The metal halide discharge lamps including the conventional discharge lamp thus prepared were lit under a constant input power of 2 kW for evaluation of the lamp voltage, light emitting efficiency, color temperature and general color rendering index (Ra), with the results as shown in Table 11:

TABLE 11

| Sample No. | Second halide | Lamp voltage | Light emitting efficiency | Color rendering properties (Ra) | Color temperature |
|---|---|---|---|---|---|
| 1 Prior Art | — | 116 V | 94 lm/W | 91 | 5120 K |
| 2 | $AlI_3$ | 104 V | 92 lm/W | 92 | 5020 K |
| 3 | $FeI_2$ | 107 V | 93 lm/W | 90 | 5220 K |
| 4 | $ZnI_2$ | 112 V | 92 lm/W | 92 | 5340 K |
| 5 | $SbI_3$ | 106 V | 89 lm/W | 92 | 5080 K |
| 6 | $CrI_2$ | 109 V | 90 lm/W | 91 | 5020 K |
| 7 | $GaI_3$ | 115 V | 90 lm/W | 89 | 5220 K |
| 8 | $ZrI_4$ | 116 V | 88 lm/W | 93 | 5430 K |

As apparent from Table 11, it has been confirmed that the metal halide discharge lamp according to the sixth embodiment of the present invention exhibits the electrical and light emitting characteristics substantially equal to those produced by the conventional metal halide discharge lamp having mercury sealed therein.

Let us describe the pressure during the lighting of the metal halide discharge lamp according to the sixth embodiment of the present invention on the basis of comparison between sample No. 1, shown in Table 11, of the conventional discharge lamp and sample No. 2, shown in Table 11, of the discharge lamp according to the sixth embodiment of the present invention. It should be noted that the pressure within the hermetic vessel of the conventional discharge lamp (sample No. 1) is proportional to the mercury amount (the number of mols). Likewise, the pressure within the hermetic vessel of sample No. 2 of the discharge lamp of the present invention is proportional to the amount of aluminum iodide ($AlI_3$). Since the ratio of the mercury amount (the number of mols) in sample No. 1 to the aluminum iodide amount in sample No. 2 is 6:1, the pressure within the hermetic vessel in sample No. 2 during the lighting of the discharge lamp is ⅙ of that in sample No. 1. It should be noted that the pressure within the hermetic vessel during the lighting of the conventional discharge lamp of sample No. 1 is estimated at 12 atmospheres. It follows that the pressure within the hermetic vessel for sample No. 2 of the present invention is about 2 atmospheres.

The metal halide discharge lamp according to the sixth embodiment of the present invention is designed to be adapted for use in a projector. In order to make the projector as compact as possible, the discharge lamp of the sixth embodiment is also designed compact. As a result, the tube wall load is high, leading to a high operating temperature of the light emitting tube. In a metal halide discharge lamp having a high load, the quartz glass forming the light emitting tube vigorously reacts with the halide during the lighting over a long period of time. The vigorous reaction causes the quartz glass brittle so as to make the light emitting tube incapable of withstanding the internal pressure of the light emitting tube, giving rise to a problem in terms of breakage of the light emitting tube.

In the discharge lamp according to the sixth embodiment of the present invention, however, the internal pressure of the hermetic vessel is low during the lighting of the discharge lamp. It follows that it is possible to suppress markedly the danger in respect of breakage of the hermetic vessel.

What should also be noted is that the projector is used mainly in an athletic field and, thus, an hot re-starting is required for the metal halide discharge lamp. For the hot re-starting, it is necessary to apply a high pulse voltage to the discharge lamp. In sample No. 1 of the conventional discharge lamp, required was 35 kV of a pulse voltage. In samples Nos. 2 to 8 of the discharge lamps of the present invention, however, the pulse voltage required for the hot re-starting was as low as only at most 8 kV because the internal pressure of the hermetic vessel was low during the lighting of the discharge lamp.

Embodiment 9

Prepared was a metal halide discharge lamp substantially equal in construction and size to the discharge lamp shown in FIG. 13. In this embodiment, however, the discharge medium sealed in the discharge lamp was as follows:

First halide . . . 3 mg of scandium iodide ($ScI_3$) and 15 mg of sodium iodide (NaI);

Second halide . . . 20 mg of the halides shown in Table 12;

Third halide . . . 3 mg of cesium iodide (CsI);

Rare gas . . . $2.66 \times 10^3$ Pa of argon gas.

For comparison, a conventional metal halide discharge lamp was similarly prepared, except that cesium iodide was not sealed in the discharge lamp.

Also prepared were conventional metal halide discharge lamps equal to the discharge lamp of the present invention, except that 40 mg of mercury was sealed in the discharge lamp. The conventional discharge lamps also include a case where cesium iodide was not sealed in the hermetic vessel.

The discharge lamps thus prepared including the comparative cases and the conventional discharge lamps were lit at a constant lamp input of 400 W for evaluation of the light emitting efficiency and color rendering properties (general color rendering index Ra), with the results as shown in Table 12. Incidentally, $5.32 \times 10^4$ Pa of nitrogen gas was sealed in the outer tube included in any of the discharge lamps tested.

TABLE 12

| Sample No. | CsI | Second halide | Light emitting efficiency (lm/W) | Color rendering properties (Ra) |
|---|---|---|---|---|
| 1 (Prior Art) | a . . . none | — | 101 | 62 |
|  | b . . . sealed | — | 98 | 61 |
| 2 | a . . . none | $AlI_3$ | 96 | 65 |
|  | b . . . sealed | " | 106 | 67 |
| 3 | a . . . none | $ZnI_2$ | 94 | 69 |
|  | b . . . sealed | " | 108 | 70 |
| 4 | a . . . none | $GaI_3$ | 97 | 67 |
|  | b . . . sealed | " | 107 | 70 |

As apparent from Table 12, the light emitting efficiency is somewhat lowered by the cesium iodide sealing in the conventional metal halide discharge lamp having mercury sealed therein.

Also, in the comparative cases where cesium iodide was not sealed, i.e., case "a" for each of samples Nos. 2 to 4, the light emitting efficiency was found lower than that for the conventional discharge lamp having mercury sealed therein.

On the other hand, the discharge lamp of the present invention, i.e., case "b" for each of samples Nos. 2 to 4, was found to be superior to the conventional discharge lamp in the light emitting efficiency. It should be noted in this connection that, in the conventional discharge lamp, the light is emitted from mercury as well as from sodium and scandium, and that mercury is low in the light emitting efficiency, as described previously, leading to the low light emitting efficiency of the conventional discharge lamp. In the discharge lamp according to this embodiment of the present invention, however, the energy consumed for the light emission is not distributed to mercury but is distributed to the light emitting metal alone, with the result that the light emitting efficiency for the present invention is clearly improved, compared with Further, the discharge lamp according to the present invention is somewhat superior to the comparative case, i.e., case "a" for samples Nos. 2 to 4, in the color rendering properties, too.

Embodiment 10

Prepared was a metal halide discharge lamp substantially equal in construction to the discharge lamp shown in FIG. 13. In this embodiment, however, the light emitting tube of the discharge lamp had an inner diameter of 12 mm, and the distance between the two electrodes was 17 mm. Further, the discharge medium sealed in the discharge lamp was as follows:

First halide . . . 1.5 mg of scandium iodide ($ScI_3$) and 17.5 mg of sodium iodide (NaI);
Second halide . . . 5 mg of the halides shown in Table 13;
Third halide . . . 1.5 mg of cesium iodide (CsI);
Rare gas . . . $2.66 \times 10^3$ Pa of argon gas.

For comparison, a conventional metal halide discharge lamp was similarly prepared, except that cesium iodide was not sealed in the discharge lamp.

Also prepared were conventional metal halide discharge lamps equal to the discharge lamp of the present invention, except that 12.5 mg of mercury was sealed in the discharge lamp. The conventional discharge lamps also include a case where cesium iodide was not sealed in the light emitting tube.

The discharge lamps thus prepared including the comparative cases and the conventional discharge lamps were lit at a constant lamp input of 100 W for evaluation of the light emitting efficiency and color rendering properties (general color rendering index Ra), with the results as shown in Table 13. Incidentally, $5.32 \times 10^4$ Pa of nitrogen gas was sealed in the light emitting tube included in any of the discharge lamps tested.

TABLE 13

| Sample No. | CsI | Second halide | Light emitting efficiency (lm/W) | Color rendering properties (Ra) |
|---|---|---|---|---|
| 1 (Prior Art) | a . . . none | — | 71 | 61 |
|  | b . . . sealed | — | 69 | 60 |
| 2 | a . . . none | $AlI_3$ | 67 | 65 |
|  | b . . . sealed | " | 77 | 66 |
| 3 | a . . . none | $NiI_2$ | 65 | 68 |
|  | b . . . sealed | " | 76 | 68 |
| 4 | a . . . none | $MnI_2$ | 68 | 64 |
|  | b . . . sealed | " | 77 | 63 |

The tendencies similar to those for Embodiment 9 were also recognized in this Embodiment 10, too.

Embodiment 11

Prepared was a metal halide discharge lamp substantially equal in construction to the discharge lamp shown in FIG. 13. In this embodiment, however, the light emitting tube of the discharge lamp had an inner diameter of 25 mm, and the distance between the two electrodes was 60 mm. Further, the discharge medium sealed in the discharge lamp was as follows:

First halide . . . 12 mg of dysprosium iodide ($DyI_3$) and 3 mg of thallium iodide (TlI);
Second halide . . . 40 mg of the halides shown in Table 14;
Third halide . . . 15 mg of cesium iodide (CsI);
Rare gas . . . $2.39 \times 10^3$ Pa of argon gas.

For comparison, a conventional metal halide discharge lamp was similarly prepared, except that cesium iodide was not sealed in the discharge lamp.

Also prepared were conventional metal halide discharge lamps equal to the discharge lamp of the present invention, except that 150 mg of mercury was sealed in the discharge lamp. The conventional discharge lamps also include a case where cesium iodide was not sealed in the light emitting tube.

The discharge lamps thus prepared including the comparative cases and the conventional discharge lamps were lit at a constant lamp input of 1 kW for evaluation of the light emitting efficiency and color rendering properties (general color rendering index Ra), with the results as shown in Table 14. Incidentally, $5.32 \times 10^4$ Pa of nitrogen gas was sealed in the outer tube included in any of the discharge lamps tested.

TABLE 14

| Sample No. | CsI | Second halide | Light emitting efficiency (lm/W) | Color rendering properties (Ra) |
|---|---|---|---|---|
| 1 Prior Art | a . . . none | — | 81 | 92 |
|  | b . . . sealed | — | 80 | 93 |
| 2 | a . . . none | $AlI_3$ | 74 | 92 |
|  | b . . . sealed | " | 88 | 93 |
| 3 | a . . . none | $SbI_3$ | 76 | 91 |
|  | b . . . sealed | " | 87 | 92 |
| 4 | a . . . none | $FeI_2$ | 75 | 92 |
|  | b . . . sealed | " | 86 | 92 |

The tendencies similar to those for Embodiments 9 and 10 were also recognized in this Embodiment 11, too.

Embodiment 12

Prepared was a metal halide discharge lamp substantially equal in construction to the discharge lamp shown in FIG. 18. In this embodiment, however, the light emitting tube of the discharge lamp had an inner diameter of 32 mm, and the distance between the two electrodes was 30 mm. Further, the discharge medium sealed in the discharge lamp was as follows:.

First halide . . . 4 mg of dysprosium bromide ($DyBr_4$), 4 mg of holmium bromide ($HoBr_3$) and 4 mg of thulium bromide ($TmBr_3$);
Second halide . . . 30 mg of the halides shown in Table 15;
Third halide . . . 5 mg of cesium iodide (CsI);
Rare gas . . . $1.33 \times 10^4$ Pa of argon gas.

For comparison, a conventional metal halide discharge lamp was similarly prepared, except that cesium iodide was not sealed in the discharge lamp.

Also prepared were conventional metal halide discharge lamps equal to the discharge lamp of the present invention, except that 90 mg of mercury was sealed in the discharge lamp. The conventional discharge lamps also include a case where cesium iodide was not sealed in the light emitting tube.

The discharge lamps thus prepared including the comparative cases and the conventional discharge lamps were lit at a constant lamp input of 2 kW for evaluation of the light emitting efficiency and color rendering properties (general color rendering index Ra), with the results as shown in Table 15.

TABLE 15

| Sample No. | CsI | Second halide | Light emitting efficiency (lm/W) | Color rendering properties (Ra) |
|---|---|---|---|---|
| 1 (Prior Art) | a ... none | — | 94 | 91 |
|  | b ... sealed | — | 93 | 92 |
| 2 | a ... none | AlI$_3$ | 87 | 92 |
|  | b ... sealed | " | 101 | 93 |
| 3 | a ... none | MnI$_2$ | 86 | 90 |
|  | b ... sealed | " | 100 | 92 |
| 4 | a ... none | FeI$_2$ | 88 | 92 |
|  | b ... sealed | " | 102 | 93 |

The tendencies similar to those for Embodiments 9 to 11 were also recognized in this Embodiment 12, too.

Embodiment 13

Prepared was a metal halide discharge lamp substantially equal in construction to the discharge lamp shown in FIG. 13. In this embodiment, however, the light emitting tube of the discharge lamp had an inner diameter of 20 mm, and the distance between the two electrodes was 42 mm. Further, the inner space of the outer tube 49 was held at a vacuum condition of $1.33 \times 10^{-2}$ Pa or less. Still further, the discharge medium sealed in the discharge lamp was as follows:

First halide ... 3 mg of scandium iodide (ScI$_3$) and 15 mg of sodium iodide (NaI);

Second halide ... 20 mg of the halides shown in Table 16;

Rare gas ... $2.66 \times 10^3$ Pa of argon gas.

For comparison, a conventional metal halide discharge lamp was similarly prepared, except that $5.32 \times 10^4$ Pa of nitrogen gas was sealed in the outer tube 49 of the discharge lamp.

Also prepared were conventional metal halide discharge lamps equal to the discharge lamp of the present invention, except that 40 mg of mercury was sealed in the light emitting tube 41. The conventional discharge lamps also include a case where nitrogen gas was not sealed in the outer tube 49.

The discharge lamps thus prepared including the comparative cases and the conventional discharge lamps were lit at a constant lamp input of 400 W for evaluation of the light emitting efficiency and color rendering properties (general color rendering index Ra), with the results as shown in Table 16.

TABLE 16

| Sample No. | Inner space of outer tube | Second halide | Light emitting efficiency (lm/W) | Color rendering properties (Ra) |
|---|---|---|---|---|
| 1 Prior Art | a ... N$_2$ gas | — | 101 | 62 |
|  | b ... vacuum | — | 103 | 63 |
| 2 | a ... N$_2$ gas | AlI$_3$ | 96 | 65 |
|  | b ... vacuum | " | 106 | 67 |
| 3 | a ... N$_2$ gas | FeI$_2$ | 95 | 68 |
|  | b ... vacuum | " | 107 | 70 |
| 4 | a ... N$_2$ gas | GaI$_3$ | 97 | 67 |
|  | b ... vacuum | " | 108 | 69 |

As apparent from Table 16, in sample No. 1 of the conventional discharge lamp having mercury sealed therein, an appreciable difference in any of the light emitting efficiency and the color rendering properties Ra is not recognized between case "a" where a nitrogen gas was sealed in the outer tube and case "b" where the inner space of the outer tube was held at a vacuum condition.

On the other hand, in any of samples Nos. 2 to 4 of the discharge lamps in which mercury was not sealed, the light emitting efficiency for case "b" where the inner space of the outer tube was held at a vacuum condition was clearly higher than that for case "a" where a nitrogen gas was sealed in the outer tube. In other words, the discharge lamp of the present invention in which the inner space of the outer tube is held at a vacuum condition is clearly advantageous in the light emitting efficiency over the conventional discharge lamp. It should be noted in this connection that mercury also emits light in the conventional discharge lamp in addition to the light emission from sodium and scandium, and that mercury is low in the light emitting efficiency, as described previously. In the present invention, however, all the light emitting energy is distributed to the light emitting metals contained in the first halides, leading to the high light emitting efficiency. Further, the discharge lamp according to Embodiment 13 was found somewhat superior to the conventional discharge lamp in the color rendering properties, too.

The tendencies similar to those for Embodiments 9 to 11 were also recognized in this Embodiment 13, too.

Embodiment 14

Prepared was a metal halide discharge lamp substantially equal in construction to the discharge lamp shown in FIG. 13. In this embodiment, however, the light emitting tube of the discharge lamp had an inner diameter of 12 mm, and the distance between the two electrodes was 17 mm. Further, the inner space of the outer tube 49 was held at a vacuum condition of $1.33 \times 10^{-2}$ Pa or less. Still further, the discharge medium sealed in the discharge lamp was as follows:

First halide ... 1.5 mg of scandium iodide (ScI$_3$) and 7.5 mg of sodium iodide (NaI);

Second halide ... 5 mg of the halides shown in Table 17;

Rare gas ... $2.66 \times 10^3$ Pa of argon gas.

For comparison, a conventional metal halide discharge lamp was similarly prepared, except that $5.32 \times 10^4$ Pa of nitrogen gas was sealed in the outer tube 49 of the discharge lamp.

Also prepared were conventional metal halide discharge lamps equal to the discharge lamp of the present invention, except that 12.5 mg of mercury was sealed in the light emitting tube 41. The conventional discharge lamps also include a case where nitrogen gas was not sealed in the outer tube 49 to keep at a vacuum condition the inner space of the outer tube 49.

The discharge lamps thus prepared including the comparative cases and the conventional discharge lamps were lit at a constant lamp input of 100W for evaluation of the light emitting efficiency and color rendering properties (general color rendering index Ra), with the results as shown in Table 17.

TABLE 17

| Sample No. | Inner space of outer tube | Second halide | Light emitting efficiency (lm/W) | Color rendering properties (Ra) |
|---|---|---|---|---|
| 1 (Prior Art) | a ... N$_2$ gas | — | 71 | 61 |
|  | b ... vacuum | — | 74 | 64 |
| 2 | a ... N$_2$ gas | AlI$_3$ | 67 | 65 |
|  | b ... vacuum | " | 77 | 67 |
| 3 | a ... N$_2$ gas | NiI$_2$ | 65 | 68 |
|  | b ... vacuum | " | 76 | 70 |
| 4 | a ... N$_2$ gas | ZnI$_2$ | 68 | 64 |
|  | b ... vacuum | " | 79 | 66 |

The tendencies similar to those for Embodiments 13 were also recognized in this Embodiment 14, too.

Embodiment 15

Prepared was a metal halide discharge lamp substantially equal in construction to the discharge lamp shown in FIG. 13. In this embodiment, however, the light emitting tube of the discharge lamp had an inner diameter of 25 mm, and the distance between the two electrodes was 60 mm. Further, the inner space of the outer tube 49 was held at a vacuum condition of 1.33×10$^{-2}$ Pa or less. Still further, the discharge medium sealed in the discharge lamp was as follows:

First halide . . . 12 mg of dysprosium iodide (DyI$_3$) and 3 mg of thallium iodide (TlI);

Second halide . . . 40 mg of the halides shown in Table 18;

Rare gas . . . 2.39×1 Pa of argon gas.

For comparison, a conventional metal halide discharge lamp was similarly prepared, except that 5.32×10$^4$ Pa of nitrogen gas was sealed in the outer tube 49 of the discharge lamp.

Also prepared were conventional metal halide discharge lamps equal to the discharge lamp of the present invention, except that 150 mg of mercury was sealed in the light emitting tube 41. The conventional discharge lamps also include a case where nitrogen gas was not sealed in the outer tube 49 to keep at a vacuum condition the inner space of the outer tube 49.

The discharge lamps thus prepared including the comparative cases and the conventional discharge lamps were lit at a constant lamp input of 1 kW for evaluation of the light emitting efficiency and color rendering properties (general color rendering index Ra), with the results as shown in Table 18.

TABLE 18

| Sample No. | Inner space of outer tube | Second halide | Light emitting efficiency (lm/W) | Color rendering properties (Ra) |
|---|---|---|---|---|
| 1 (Prior Art) | a ... N$_2$ gas | — | 81 | 92 |
|  | b ... vacuum | — | 83 | 93 |
| 2 | a ... N$_2$ gas | AlI$_3$ | 74 | 92 |
|  | b ... vacuum | " | 88 | 93 |
| 3 | a ... N$_2$ gas | SbI$_3$ | 76 | 91 |
|  | b ... vacuum | " | 87 | 92 |
| 4 | a ... N$_2$ gas | MnI$_2$ | 75 | 92 |
|  | b ... vacuum | " | 86 | 92 |

The tendencies substantially equal to those for Embodiments 13 and 14 were also recognized in this Embodiment 15, too.

Embodiment 16

Figure 19:
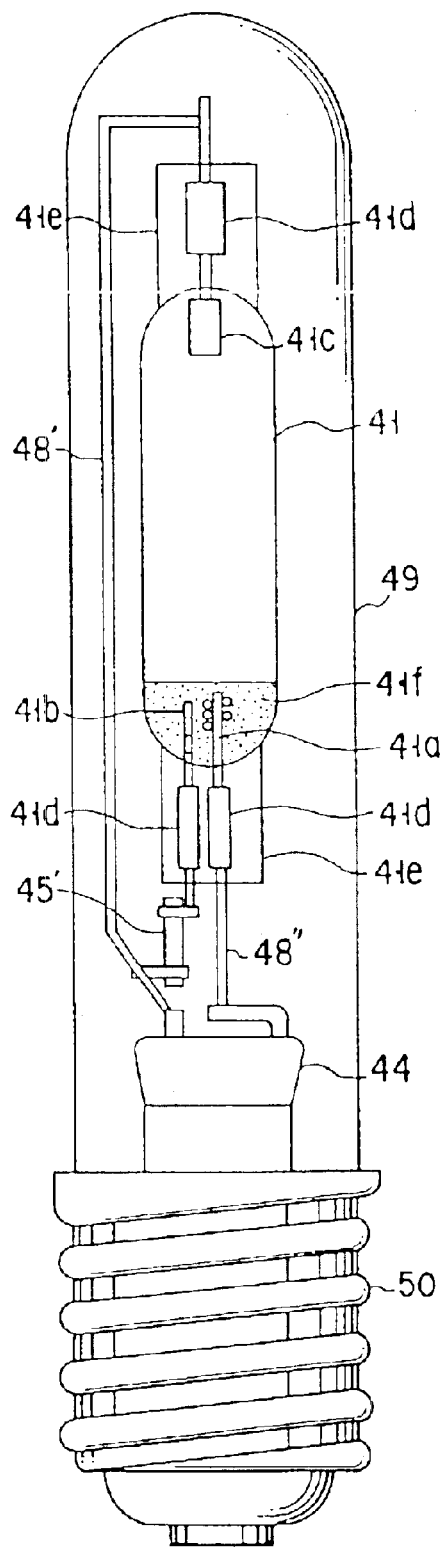
FIG. 19 is a front view showing a metal halide discharge lamp according to a seventh embodiment of the present invention.

FIG. 19 is a front view showing a metal halide discharge lamp according to a seventh embodiment of the present invention. The reference numerals common with FIGS. 13 and 19 denote the same members of the discharge lamp and, thus, reference thereto is omitted in the following description. The seventh embodiment shown in FIG. 19 differs from the embodiment shown in FIG. 13 in that the discharge lamp shown in FIG. 19 is of a long arc type and is lit by a DC current.

To be more specific, the light emitting tube 41 has an inner diameter of 18 mm. A cathode 41a and an auxiliary electrode 41b are sealed to one end of the light emitting tube 41, with an anode 41c being sealed to the other end of the tube 41. The cathode 41a consists of a tungsten rod having a diameter of 1 mm and a length of 15 mm. The tungsten rod contains thorium, and a tungsten wire having a diameter of 0.4 mm is wound-about the tungsten rod. The auxiliary electrode 41b consists of a tungsten wire having a diameter of 0.3 mm. These cathode 41a, auxiliary electrode 41b and anode 41c are connected respectively to a sealing foil 41d made of molybdenum and hermetically buried inside a sealing portion 41e. The anode 41c is connected to a base 50 through the sealing foil 41e, a conductor wire 48' and a flare stem 44. The auxiliary electrode 41b is connected to the conductor wire 48' through a starting resistor 45'. The cathode 41a is connected to the base 50 through the conductor wire 48' and the flare stem 44. The distance between the cathode and the anode is set at 40 mm. A heat insulating film 41f consisting essentially of platinum is formed at an end portion of the light emitting tube 41 on the side of the cathode 41a. Further, the outer tube 49 consists of a glass tube having an inner diameter of 40 mm. The inner space of the outer tube 49 is held at a vacuum condition.

The discharge medium sealed in the discharge lamp was as follows:

First halide . . . 3 mg of scandium iodide (ScI$_3$) and 15 mg of sodium iodide (NaI);

Second halide . . . 20 mg of the halides shown in Table 19;

Rare gas . . . 3.72×10$^3$ Pa of argon gas.

For comparison, a conventional metal halide discharge lamp was similarly prepared, except that 40 mg of mercury was sealed in the light emitting tube 41 of the discharge lamp.

Five discharge lamps were prepared for each of samples Nos. 2 to 4 of the seventh embodiment of the present invention. Also, three discharge lamps were prepared for sample No. 1 of the prior art. The discharge lamps thus prepared including the conventional discharge lamps were lit by a DC current at a constant rated output of 360 W for evaluation of the light emitting efficiency (lm/W), lamp voltage (V), color temperature (K), and color rendering properties (general color rendering index Ra), with the results as shown in Table 19.

TABLE 19

| Sample No. | Second halide | Lamp voltage | Light emitting efficiency | Color rendering properties (Ra) | Color temperature |
|---|---|---|---|---|---|
| 1 (Prior Art) | — | 132 V | 101 lm/W | 62 | 4320 K |
| 2 | $AlI_3$ | 112 V | 96 lm/W | 65 | 4120 K |
| 3 | $ZnI_2$ | 120 V | 98 lm/W | 65 | 4160 K |
| 4 | $GaI_3$ | 125 V | 97 lm/W | 67 | 4130 K |

As apparent from Table 19, the metal halide discharge lamp according to the seventh embodiment of the present invention, which is somewhat inferior in the light emitting efficiency to the conventional discharge lamp, is fully comparable with the conventional discharge lamp in the other characteristics of the discharge lamp.

Then, sample No. 3 of the discharge lamp of the present invention and sample No. 1 of the conventional discharge lamp were tested for the color rendering properties and the color temperature under the condition that each of these discharge lamps was lit with an input power of 200 W, 250 W and 300 W, with the results as shown in Table 20:

TABLE 20

| Sample No. | 200 W | 250 W | 300 W |
|---|---|---|---|
| 1 (prior Art) | | | |
| Color Rendering Properties (Ra) | 38 | 46 | 57 |
| Color Temperature (K) | 6010 | 5680 | 5210 |
| 3 (Present Invention) | | | |
| Color Rendering Properties (Ra) | 59 | 62 | 63 |
| Color Temperature (K) | 4500 | 4210 | 4150 |

As apparent from Table 20, the color rendering properties Ra was lowered and the color temperature (K) was increased in the conventional discharge lamp with decrease of the lamp input from the rated value. In the discharge lamp of the present invention, however, the changes in the color rendering properties Ra and the color temperature (K) were-maintained substantially constant in spite of the change in the input power, supporting that the discharge lamp of the present invention is suitable for the dimming.

Further, each of the conventional discharge lamp and the discharge lamps of the present invention was subjected to a horizontal lighting under the condition that each lamp was kept lit for 2 hours at 400 W, which was 10% higher than the rated power, followed by keeping the light put out for 10 minutes, so as to look into the occurrence of rupture of the light emitting tube and the hot re-starting voltage after put-out of the light for 2 seconds during the lighting at a rated input power. Rupture of the light emitting tube was not found at all even after the lighting for about 2,500 hours. On the other hand, the average values of the hot re-starting voltage were as shown in Table 21:

TABLE 21

| Sample No. | Second Halide | Re-starting Voltage (kV) |
|---|---|---|
| 1 (Prior Art) | — | 1.8 |
| 2 | $AlI_3$ | 0.89 |
| 3 | $ZnI_2$ | 0.8 |
| 4 | $GaI_3$ | 1.0 |

As apparent from Table 21, the re-starting voltage for the discharge lamp of the present invention is markedly lower than that for the conventional discharge lamp.

Further, a severe color separation was observed during the lighting of the conventional discharge lamp. On the other hand, a color separation was observed only slightly in the discharge lamp of the present invention. In this case, the discharge lamp was considered to be sufficient for being put to practical use.

Embodiment 17

Prepared was a metal halide discharge lamp equal in construction and size to the discharge lamp shown in FIG. 8 and adapted for use in a headlamp for a vehicle. The discharge medium sealed in the discharge lamp was as follows:

First halide . . . 0.14 mg of scandium iodide ($ScI_3$) and 0.7 mg of sodium iodide (NaI);

Second halide . . . 0.4 mg of the halides shown in Table 22;

Rare gas . . . 5 atmospheres of xenon gas.

For comparison, a conventional metal halide discharge lamp was prepared by further sealing 1 mg of mercury in addition to the second halide.

Each of the discharge lamps of the present invention and the conventional discharge lamp thus prepared was lit at a constant lamp input of 35 W for evaluation of the lamp voltage, light emitting efficiency, color rendering properties (general color rendering index Ra), and color temperature, with the results as shown in Table 22.

TABLE 22

| Sample No. | Second halide | Lamp voltage | Light emitting efficiency | Color rendering properties (Ra) | Color temperature |
|---|---|---|---|---|---|
| 1 Prior Art | — | 83 V | 87 lm/W | 63 | 4120 K |
| 2 | AlI | 65 V | 81 lm/W | 68 | 3960 K |
| 3 | $FeI_2$ | 70 V | 79 lm/W | 71 | 4210 K |
| 4 | $ZnI_2$ | 75 V | 81 lm/W | 65 | 3830 K |
| 5 | $MnI_2$ | 66 V | 81 lm/W | 65 | 4230 K |
| 6 | $GaI_3$ | 76 V | 78 lm/W | 65 | 4330 K |

The lamp voltage is determined by the sealing amount of mercury in the conventional discharge lamp. In the discharge lamp of the present invention, however, the lamp voltage is determined by the evaporation amount of the second halide. It follows that a desired lamp voltage can be obtained without difficulty in the discharge lamp of the present invention by applying a satisfactory heat insulation to the light emitting tube. As apparent from Table 22, the lamp voltage for the discharge lamp of the present invention was found somewhat lower than that for the conventional discharge lamp. However, since the lamp voltage was higher than 50V, the discharge lamp of the present invention does not give rise to any practical problem because an electronic lighting circuit is used for lighting a small metal halide discharge lamp of this type. Also, the discharge lamp of the present invention is somewhat inferior to the conventional discharge lamp in the light emitting efficiency. However, the discharge lamp of the present invention tends to improve the color rendering properties because a visible light is slightly emitted by the metal contained in the second halide such as aluminum.

Figure 20:
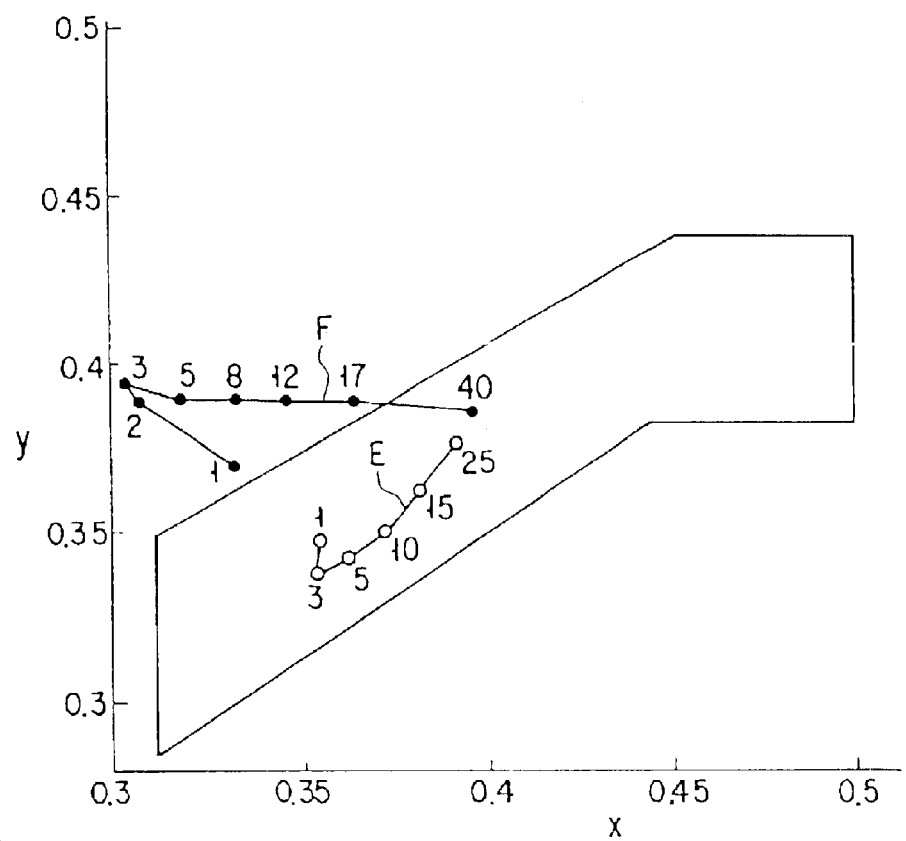
FIG. 20 is a chromaticity diagram showing the changes in chromaticity of the discharge lamp 2 (present invention) and the conventional discharge lamp 1 shown in Table 22 in Embodiment 17 described herein later.

FIG. 20 is a graph showing the changes in the chromaticity in respect of sample No. 2 of the discharge lamp of the present invention and sample No. 1 of the conventional discharge lamp shown in Table 22.

The graph shows the range of chromaticity of white color specified in JIS (Japanese Industrial Standards) D 5500-1984 relating to the lamps for automobiles. Curve E shown in the graph denotes the changes in the chromaticity for the discharge lamp of the present invention, with curve F denoting the changes in the chromaticity for the conventional discharge lamp. The numbers put near the measuring points for each of these curves E and F denote the time (seconds) after the lighting of the discharge lamp. Used in this experiment was a lighting circuit designed such that 2.6A of lamp current was allowed to flow immediately after the turning on of the power source, followed by gradually decreasing the current so as to control the lamp power at a rated power of 35 W.

As apparent from FIG. 20, the discharge lamp of the present invention emits light falling within a white color range in 0.5 second or less after the lighting; whereas, the conventional discharge lamp emits light falling within a white color range in 18 seconds after the lighting.

Further, each of sample No. 2 of the discharge lamp of the present invention and sample No. 1 of the conventional discharge lamp was lit at a lamp input power of 15 W, 20 W, 25 W and 30 W for evaluation of the general color rendering index Ra and the color temperature (K), with the results as shown in Table 23:

TABLE 23

| Sample No. | 15 W | 20 W | 125 W | 130 W |
| --- | --- | --- | --- | --- |
| 1 (Prior Art) | | | | |
| Color Rendering Properties (Ra) | 40 | 45 | 58 | 61 |
| Color Temperature (K) | 5640 | 4970 | 4630 | 4350 |
| 2 (Present Invention) | | | | |
| Color Rendering Properties (Ra) | 63 | 64 | 65 | 66 |
| Color Temperature (K) | 4280 | 4220 | 4110 | 4040 |

Sample No. 1 of the conventional discharge lamp has a high mercury vapor pressure, with the result that mercury is entirely in an evaporated state even if the lamp input power is lowered to 15W. It follows that the light emission from mercury is rendered predominant with decrease in the lamp input power so as to increase the color temperature and to lower the color rendering properties. It may be of no difficulty to understand that the conventional discharge lamp is unsuitable for the dimming in the practical sense.

On the other hand, both the color rendering properties and the color temperature remain substantially unchanged regardless of change in the lamp input power in the sample No. 2 of the discharge lamp of the present invention. Clearly, the discharge lamp of the present invention is sufficiently adapted for the dimming.

Further, the re-starting voltage in the step of hot re-starting of the discharge lamp was measured for each of the discharge lamps of the present invention and the conventional discharge lamp, with the results as shown in Table 24. For measuring the re-starting voltage, the discharge lamp was kept lit for 30 minutes, followed by putting out the lamp and, then, re-starting the lighting of the lamp. It should be noted that, if the discharge lamp is kept put out for a longer time, the electrode temperature is lowered so as to make it difficult for the discharge lamp to be re-started. On the other hand, the vapor pressures of mercury and the metal halide within the light emitting tube are lowered with increase in the time during which the discharge lamp is kept put out, with the result that the re-starting of the discharge lamp is facilitated. Because of these contradictory tendencies, it is most difficult for the discharge lamp to be re-started in the case where the discharge lamp is kept put out for about 10 seconds.

TABLE 24

| Sample No. | Second Halide | Re-starting voltage (kV) |
| --- | --- | --- |
| 1 (Prior Art) | — | 15.2 |
| 2 | $AlI_3$ | 8.7 |
| 3 | $FeI_2$ | 9.1 |
| 4 | $ZnI_2$ | 9.6 |
| 5 | $MnI_2$ | 9.3 |
| 6 | $GaI_3$ | 8.3 |

The starting voltage for sample No. 1 of the conventional discharge lamp was found to be high because the mercury vapor pressure of the discharge lamp remained to be high.

On the other hand, the vapor pressure of the metal contained in the second metal halide was clearly lower than the vapor pressure of mercury during the steady lighting time in samples Nos. 2 to 6 of the discharge lamps of the present invention. Nevertheless, the difference between the vapor pressure of the metal contained in the second halide and the mercury vapor pressure is minimized in 10 seconds after the discharge lamp is put out. This indicates that the discharge lamp of the present invention is quite satisfactory in the re-starting characteristics, compared with the conventional discharge lamp having mercury sealed therein.

Further, the color characteristics in the vicinity of the electrodes were measured, covering the case where each of the discharge lamps of the present invention and the conventional discharge lamp was lit by a DC current, with the results as shown in Table 25. To be more specific, the color temperatures (K) in the vicinity of the anode and in the vicinity of the cathode were measured, covering the case where the light emitted from the discharge lamp when the discharge lamp was lit with a lamp input power of 35 W was projected onto a screen.

TABLE 25

| sample No. | Second Halide | Color temp. (K) on anode side | Color temp. (K) on cathode side |
| --- | --- | --- | --- |
| 1 (Prior Art) | — | 5330 | 3720 |
| 2 | $AlI_3$ | 4210 | 3840 |
| 3 | $FeI_2$ | 4420 | 4010 |

TABLE 25-continued

| sample No. | Second Halide | Color temp. (K) on anode side | Color temp. (K) on cathode side |
|---|---|---|---|
| 4 | $ZnI_2$ | 4080 | 3650 |
| 5 | $MnI_2$ | 4450 | 4060 |
| 6 | $GaI_3$ | 4530 | 4130 |

As apparent from Table 25, there is a large difference in the color temperature between the anode side and the cathode side in sample No. 1 of the conventional discharge lamp. It is difficult to make up for the large difference in the color temperature by designing appropriately the headlamp using the conventional discharge lamp.

In samples Nos. 2 to 6 of the discharge lamps of the present invention, however, the difference in the color temperature between the anode side and the cathode side is small. Naturally, the discharge lamp of the present invention can be put to practical use satisfactorily.

Embodiment 18

Prepared was a metal halide discharge lamp substantially equal to the discharge lamp shown in FIG. 11 and suitable for use in a headlamp of a vehicle, except that the end portions of the outer tube 21 were hermetically sealed to the sealing portions 1a, 1a of the light emitting tube 1 and the inner space of the outer tube 21 was held at a vacuum condition. The discharge lamp thus prepared was equal to the discharge lamp of Embodiment 17 in the other construction including the discharge medium sealed in the light emitting tube. Also prepared was a conventional discharge lamp equal to the conventional discharge lamp of Embodiment 17, except that the inner space of the outer tube was held at a vacuum condition.

Each of the discharge lamps of the present invention and the conventional discharge lamp was tested for the lamp voltage (V), light emitting efficiencies (lm/W), color rendering properties (general color rendering index) Ra, and color temperature (K), with the results as shown in Table 26.

TABLE 26

| Sample No. | Second halide | Lamp voltage | Light emitting efficiency | Color rendering properties (Ra) | Color temperature |
|---|---|---|---|---|---|
| 1 (Prior Art) | — | 84 V | 89 lm/W | 63 | 4010 K |
| 2 | $AlI_3$ | 70 V | 94 lm/W | 68 | 3890 K |
| 3 | $FeI_2$ | 76 V | 91 lm/W | 73 | 4120 K |
| 4 | $ZnI_2$ | 81 V | 91 lm/W | 68 | 3720 K |
| 5 | $MnI_2$ | 71 V | 92 lm/W | 67 | 4110 K |
| 6 | $GaI_3$ | 80 V | 90 lm/W | 65 | 4330 K |

In the discharge lamp of the present invention, the lamp voltage is increased and the light emitting efficiency is markedly improved by establishing a vacuum condition in the inner space of the outer tube. In the conventional discharge lamp, however, improvements in the lamp voltage and the light emitting efficiency were achieved only slightly.

Embodiment 19

Prepared was a metal halide discharge lamp equal in construction and size to the discharge lamp shown in FIG. 8 and adapted for use in a headlamp of a vehicle. Discharge medium sealed in the discharge lamp was as follows:

First halide . . . 0.14 mg of scandium iodide ($ScI_3$) and 0.7 mg of sodium iodide (NaI);

Second halide . . . 0.4 mg of zinc iodide ($ZnI_2$) and 0.1 mg of the halides shown in Table 27;

Rare gas . . . 5 atmospheres of xenon gas.

Each of the discharge lamps of the present invention thus prepared was tested for the lamp voltage (V), light emitting efficiency (lm/w), color rendering properties (general color rendering index Ra), and color temperature (K), with the results as shown in Table 27.

TABLE 27

| Sample No. | Second halide | Lamp voltage | Light emitting efficiency | Color rendering properties (Ra) | Color temperature |
|---|---|---|---|---|---|
| 1 | $MgI_2$ | 88 V | 81 lm/W | 65 | 3890 K |
| 2 | $NiI_2$ | 91 V | 80 lm/W | 66 | 3990 K |
| 3 | $CoI_2$ | 88 V | 82 lm/W | 67 | 4020 K |
| 4 | $CrI_2$ | 96 V | 82 lm/W | 64 | 4110 K |
| 5 | $SbI_3$ | 83 V | 79 lm/W | 66 | 3810 K |
| 6 | $ReI_2$ | 86 V | 80 lm/W | 66 | 3960 K |

The second halide, which has a vapor pressure lower than that of mercury in general, contributes more greatly to formation of the lamp voltage than mercury under the same vapor pressure.

However, mercury, which always has a high vapor pressure, is evaporated completely when sealed in a small metal halide discharge lamp having a small load, e.g., rate lamp power of at most 100 W, which is used in, for example, a headlamp for a vehicle. Therefore, the lamp voltage can be controlled by controlling the sealing amount of mercury.

On the other hand, when it comes to the discharge lamp of the present invention in which a second halide is sealed in place of mercury, the vapor pressure of the sealed halide reaches a saturation before the halide is completely evaporated, making it impossible to further increase the lamp voltage.

However, the lamp voltage can be further increased by sealing a plurality of second halides as in this Embodiment 19. To be more specific, when the vapor pressure of one of the second halides has reached a saturation, evaporation of the other second halide contributes to the increase in the lamp voltage. It follows that the lamp voltage in the case of sealing a plurality of second halides is made higher than that in the case of sealing only a single kind of the second halide.

Embodiment 20

Prepared was a metal halide discharge lamp equal in construction and size to the discharge lamp shown in FIG. 8 and adapted for use in a headlamp of a vehicle. Discharge medium sealed in the discharge lamp was as follows:

First halide . . . 0.14 mg of scandium iodide ($ScI_3$) and 0.7 mg of sodium iodide (NaI);

Second halide . . . 0.4 mg of the halides shown in Table 28;

Third halide . . . 0.1 mg of cesium iodide (CsI);

Rare gas . . . 5 atmospheres of xenon gas.

Also prepared was a conventional metal halide discharge lamp equal to the discharge lamp of the present invention, except that 1 mg of mercury was sealed in the discharge lamp in place of the second halide used in the discharge lamp of the present invention.

Each of the discharge lamps of the present invention and the conventional discharge lamp thus prepared was tested for the lamp voltage (V), light emitting efficiency (lm/W), color rendering properties (general color rendering index Ra), and color temperature (K), with the results as shown in Table 28.

TABLE 28

| Sample No. | Second halide | Lamp voltage | Light emitting efficiency | Color rendering properties (Ra) | Color temperature |
|---|---|---|---|---|---|
| 1 (Prior art) | — | 83 V | 86 lm/W | 63 | 4140 K |
| 2 | $AlI_3$ | 63 V | 93 lm/W | 68 | 3940 K |
| 3 | $FeI_2$ | 68 V | 92 lm/W | 70 | 4180 K |
| 4 | $ZnI_2$ | 73 V | 94 lm/W | 66 | 3800 K |
| 5 | $MnI_2$ | 65 V | 94 lm/W | 65 | 4200 K |
| 6 | $GaI_3$ | 75 V | 92 lm/W | 65 | 4310 K |

In this embodiment, cesium iodide CsI was added as a third halide. Although the CsI addition did not bring about appreciable changes in the color rendering properties Ra and the color temperature, the temperature distribution of the arc is flattened by the CsI addition so as to suppress the heat loss and, thus, to improve the light emitting efficiency. In the prior art having mercury sealed therein, however, an improvement in the light emitting efficiency was not recognized in spite of the third halide addition.

It should also be noted that, in the present invention, mercury which is low in its light emitting efficiency is not sealed in the light emitting tube so as to make the present invention higher in its light emitting efficiency than the prior art.

Further, an additional experiment was conducted in which the sealing amount of the third halide, i.e., cesium iodide (CsI), was changed in sample No. 3 of the discharge lamp of the present invention shown in Table 28 so as to measure the changes in the light emitting efficiency (lm/W), with the results as shown in Table 29:

TABLE 29

| CsI (mg) | 0.005 | 0.01 | 0.05 | 0.1 | 0.3 | 0.5 | 1.0 | 2.0 | 2.5 |
|---|---|---|---|---|---|---|---|---|---|
| LEE* (lm/W) | 83 | 85 | 88 | 92 | 91 | 90 | 89 | 84 | 79 |

*LEE . . . Light Emitting Efficiency

As apparent from Table 29, the CsI addition is effective if the addition amount is 0.01 mg or more. By contraries, if CsI is added excessively, the vapor pressure of the light emitting metal is lowered, with the result that the light emitting effect is lowered.

Further, the discharge lamps shown in Table 28 were subjected to hot a re-starting test under the conditions equal to those in Embodiment 17 so as to measure the re-starting voltage, with the results as shown in Table 30:

TABLE 30

| Sample No. | Second Halide | Re-starting Voltage (kV) |
|---|---|---|
| 1 (Prior Art) | — | 15.2 |
| 2 | $AlI_3$ | 9.2 |
| 3 | $FeI_2$ | 9.6 |
| 4 | $ZnI_2$ | 10.1 |
| 5 | $MnI_2$ | 9.8 |
| 6 | $GaI_3$ | 8.9 |

The discharge lamp of the present invention is markedly lower in the re-starting voltage than the prior art having mercury sealed in the light emitting tube, but is somewhat higher in the re-starting voltage than the case where the third halide of cesium iodide (CsI) is not sealed in the light emitting tube. However, the re-starting voltage shown in Table 30, which is required in the discharge lamp of the present invention, does not produce any practical problem.

Embodiment 21

Figure 21:
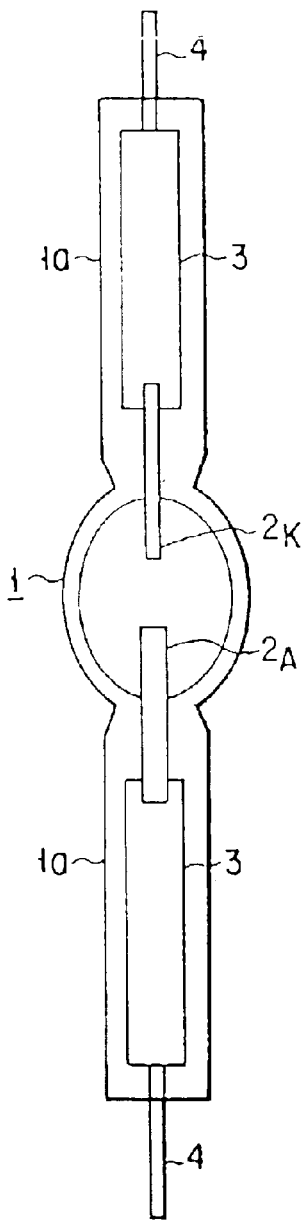
FIG. 21 is a front view showing a metal halide discharge lamp according to an eighth embodiment of the present invention.

FIG. 21 is a front view showing a metal halide discharge lamp according to an eighth embodiment of the present invention. The reference numerals common with FIGS. 8 and 21 denote the same members of the discharge lamp and, thus, reference thereto is omitted in the following description. The eighth embodiment shown-in FIG. 21 equal to the embodiment shown in FIG. 8 in that the discharge lamp shown in FIG. 21 is suitable for use in a headlamp for a vehicle, but differs from the embodiment shown in FIG. 8 in that the discharge lamp shown in FIG. 21 is lit by a DC current. To be more specific, the discharge lamp shown in FIG. 21 comprises a cathode $2_K$ and an anode $2_A$.

The hermetic vessel 1, which is prepared from a cylinder having an inner diameter of 4 mm and a length of 7 mm, is in the shape of a bulb having an elliptical cross section. Sealing portions 1a each having a length of 30 mm are mounted to the end portions of the hermetic vessel 1. The cathode $2_K$ consists of a tungsten rod containing thorium and having a diameter of 0.4 mm and a length of 6 mm. The proximal end portion of the cathode $2_K$ is welded to one end of a molybdenum foil 3 buried in the sealing portion 1a and having a width of 1.5 mm, a length of 15 mm and a thickness of 15 $\mu$m. On the other hand, the anode $2_A$ consists of a tungsten rod having a diameter of 0.8 mm and a length of 6 mm. The proximal end portion of the anode $2_A$ is welded to one end of the molybdenum foil 3. Further, the outer lead wire 4, which consists of a conductive wire having a diameter of 0.5 mm and a length of 25 mm, is welded to the other end of the molybdenum foil 3.

In preparing the metal halide discharge lamp of the construction described above, prepared first are a pair of sealing tubes for forming the sealing portions 1a on both end portions of the hermetic vessel 1. Then, a connection assembly including the cathode $2_K$, the molybdenum foil 3 and the outer lead wire 4 is inserted into one of the sealing tubes, followed by fusing under heat the sealing tube using an oxygen-hydrogen burner and subsequently sealing the sealing tube with a pinch seal so as to seal the cathode $2_K$ to the hermetic vessel 1. Further, the first and second halides are sealed in the hermetic vessel 1 through the other sealing tube, followed by inserting a connection assembly including the anode $2_A$, the molybdenum foil 3 and the outer lead wire 4 into the sealing tube so as to set the distance between the anode and the cathode at 4.2 mm.

In the next step, these connection assemblies are mounted to an exhaust system through the sealing tubes so as to exhaust the hermetic vessel 1, followed by introducing a xenon gas at a pressure of 2 atmospheres into the hermetic vessel 1. Then, the other sealing tube is fused by heating with an oxygen-hydrogen burner while cooling the hermetic vessel 1, followed by sealing the anode $2_A$ to the hermetic vessel 1 with a pinch seal, thereby to prepare the metal halide discharge lamp shown in FIG. 21.

The discharge medium sealed in the hermetic vessel 1 included the first and second halides given below:

First halide . . . 0.17 mg of scandium iodide ($ScI_3$) and 0.83 mg of sodium iodide (NaI);

Second halide . . . 0.4 mg of $ZnI_2$ (sample No. 2 of the dischargemp of the present invention);

. . . 0.2 mg of $AlI_3$ (sample No. 3 of the discharge lamp of the present invention); and . . . 0.4 mg of $FeI_2$ (sample No. 4 of the discharge lamp of the present invention).

Also prepared was sample No. 1 of the conventional discharge lamp equal to the discharge lamps of the present invention except that 1 mg of mercury was sealed in the conventional discharge lamp in place of the second halide sealed in the discharge lamp of the present invention.

Sample No. 2 of the discharge lamp of the present invention and sample No. 1 of the conventional discharge lamp each having a rated lamp input power of 35 W were lit with a lamp input power of 20W, 25W, 30W and 35 W, so as to measure the light emitting efficiency (lm/W), the color rendering properties (general color rendering index) Ra, and the color temperature (K) of the discharge lamps, with the results as shown in Table 31:

TABLE 31

| Sample No. | Lamp input power (W) | Light emitting efficiency (lm/W) | Color rendering properties (Ra) | Color temperature (K) |
|---|---|---|---|---|
| 1 | 20 | | 45 | 4970 |
| (Prior Art) | 35 | 80 | 65 | 4100 |
| 2 | 20 | | 64 | 4400 |
| (Present Invention) | 25 | | 66 | 4310 |
| | 30 | | 69 | 4240 |
| | 35 | 75 | 70 | 4190 |

Figure 22:
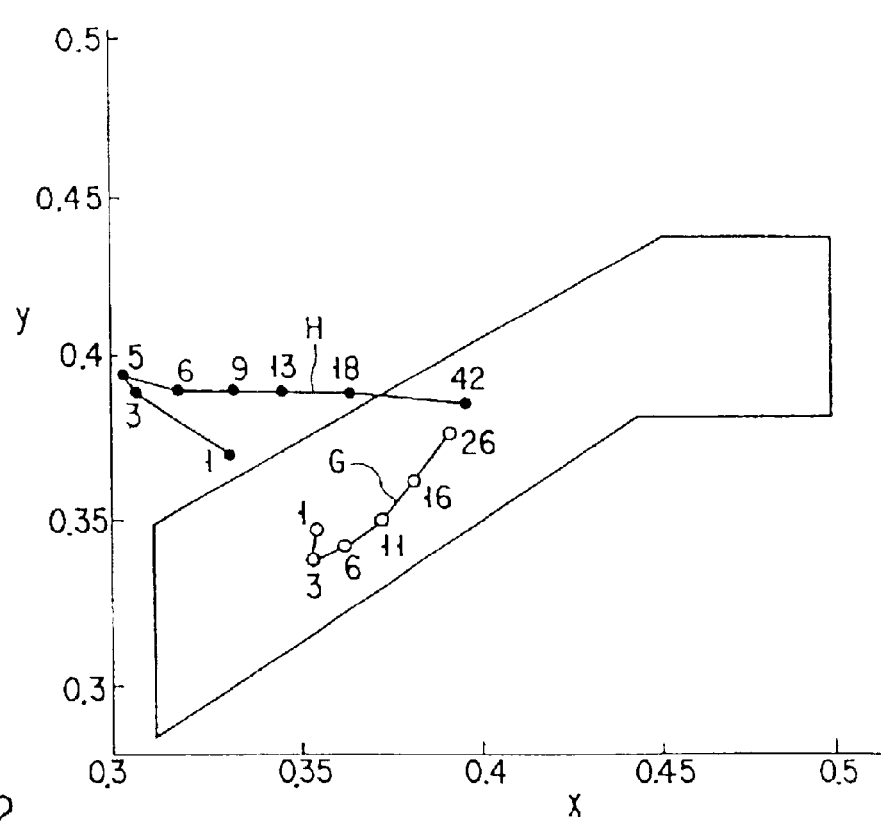
FIG. 22 is a chromaticity diagram showing the rising characteristics in the spectral characteristics of the discharge lamp according to the eighth embodiment of the present invention in comparison with the prior art.

FIG. 22 is a graph of chromaticity showing the rising of the spectral characteristics of sample No. 2 of the metal halide discharge lamp according to eighth embodiment of the present invention in comparison with sample No. 1 of the conventional discharge lamp. Curve G shown in FIG. 22 represents the rising of the spectral characteristics for the discharge lamp of the present invention, with curve H denoting the rising of the spectral characteristics for the conventional discharge lamp. As apparent from FIG. 22, the light emitted from the discharge lamp of the present invention falls within a range of white light immediately after the lighting. On the other hand, the light emitted from the conventional discharge lamp falls within a range of white light about 18 seconds after the lighting.

Then, an intermittent lighting test was applied to each of the samples of the discharge lamps under the condition that each lamp was kept lit for 60 minutes at a lamp input power of 42 W, which was 20% higher than the rated lamp input power, followed by putting out the lamps for 15 seconds in order to look into the rupture of the hermetic vessel. No rupture of the hermetic vessel was found in any of the tested samples 1,000 hours after the starting of the test.

Further, the re-starting voltage required for the hot starting 2 seconds after the putting out of the discharge lamp was measured, with the results as shown in Table 32:

TABLE 32

| Sample No. | 1 (Prior Art) | 2 | 3 | 4 |
|---|---|---|---|---|
| Re-Starting Voltage (kV) | 12 | 5 | 4 | 4.3 |

Figure 23:
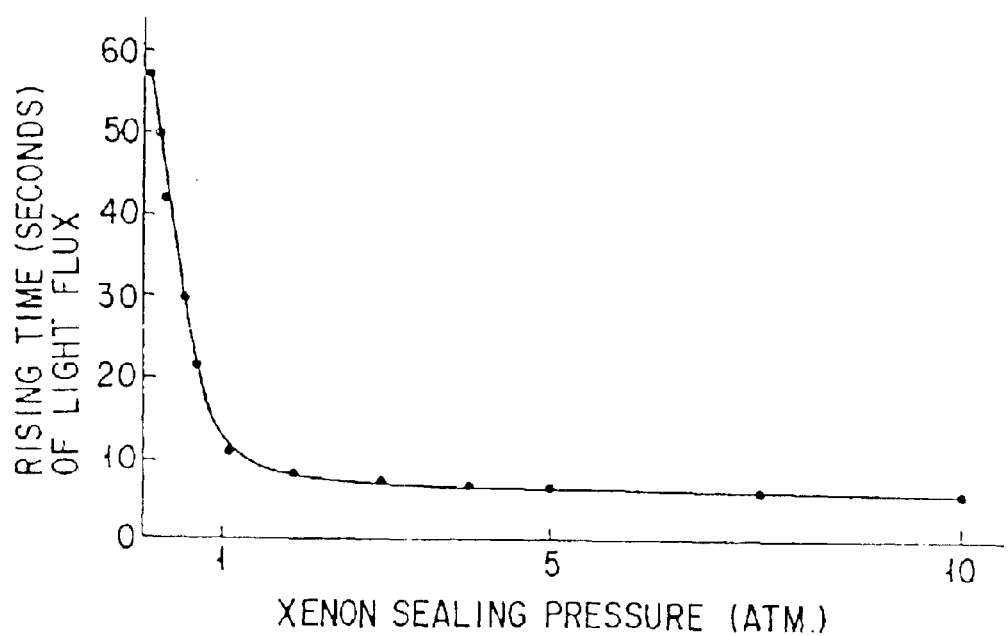
FIG. 23 is a graph showing the relationship between the rare gas sealing pressure and the rising time of the light flux, which covers the metal halide discharge lamp according to the eight embodiment of the present invention shown in FIG. 21.

FIG. 23 is a graph showing the relationship between the rare gas sealing pressure (atmospheres) and the rising time of the light flux, covering the case where the rare gas sealing pressure was changed in the metal halide discharge lamp according to the eighth embodiment of the present invention shown in FIG. 21. In the graph of FIG. 23, the xenon sealing pressure (atmospheres) is plotted on the abscissa, with the rising time (seconds) of the light flux being plotted on the ordinate.

As seen from FIG. 23, the rising time of the light flux was rapidly shortened where the sealing pressure of the xenon gas exceeded one atmosphere, supporting that the discharge lamp of the present invention can be put to practical use.

Figure 24:
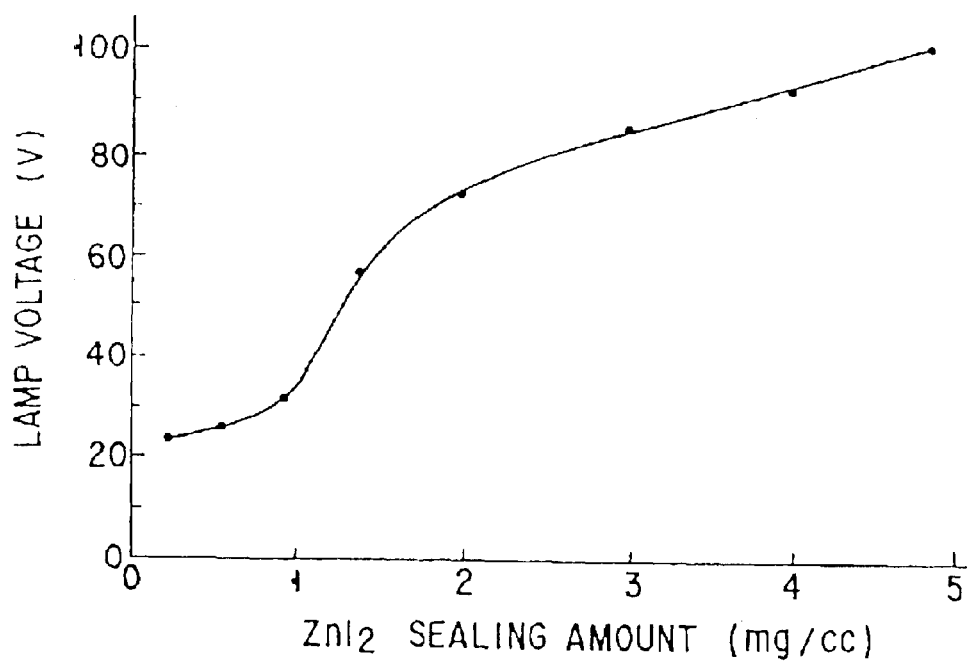
FIG. 24 is a graph showing the relationship between the sealing amount (mg/cc) of $ZnI_2$ used as the second halide and the lamp voltage (V), which covers the metal halide discharge lamp according to the eight embodiment of the present invention shown in FIG. 21.

FIG. 24 is a graph showing the relationship between the sealing amount (mg/cc) of $ZnI_2$ used as a second halide of the present invention and the lamp voltage (V), covering the case where the sealing amount of $ZnI_2$ was changed in the metal halide discharge lamp according to the eighth embodiment of the present invention shown in FIG. 21. As seen from FIG. 24, a lamp voltage higher than 30V, which is required for lighting the discharge lamp using an electronic lighting circuit, can be obtained if the sealing amount of $ZnI_2$ exceeds 1 mg/cc.

Embodiment 22

Figure 25:
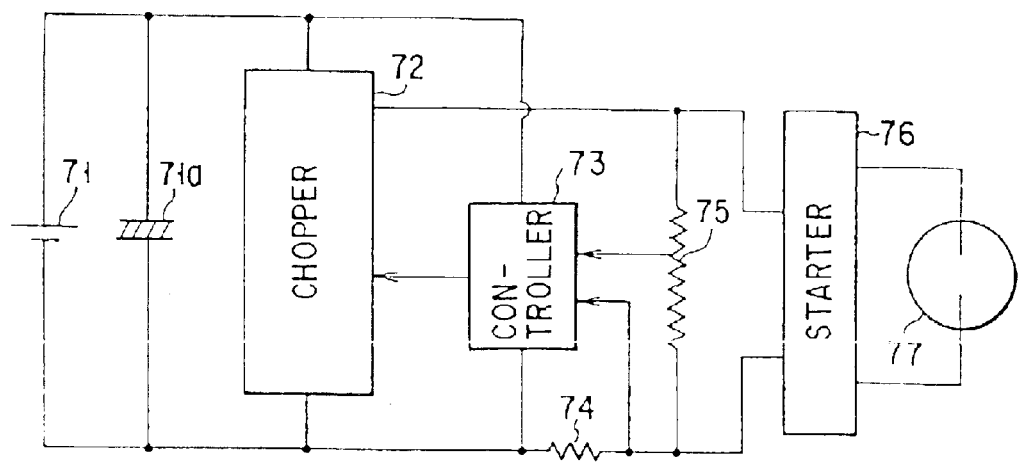
FIG. 25 is a circuit diagram showing the lighting device of a metal halide discharge lamp according to the first embodiment of the present invention.

FIG. 25 is a circuit diagram showing a lighting device of a metal halide discharge lamp according to a first embodiment of the present invention. The circuit is constructed to permit the metal halide discharge lamp to be lit by a DC current. As seen from the drawing, the light device according to the first embodiment of the present invention comprises a DC power source 71, a chopper 72, a control means 73, a lamp current detecting means 74, a lamp voltage detecting means 75, a starting means 76, and a metal halide discharge lamp 77.

A battery or a rectified DC current source is used as the DC power source 71. In general, a battery is used as the DC power source 71 in the case where the metal halide discharge lamp 77 is used in a headlamp for a vehicle. However, it is also possible to use as the DC power source 71 a rectified DC power source which rectifies an AC current to-obtain a DC current. Further, it is possible to connect, as required, an electrolytic capacitor 71a in parallel with the DC power source 71 for flattening the DC current.

The chopper 72 serves to convert the DC voltage into a desired voltage and, at the same time, serves to control as desired the metal halide discharge lamp 77. Where the DC power source 71 has a low voltage, a voltage-increasing chopper is used. By contraries, a voltage-decreasing chopper is used where the DC power source has a high voltage.

The control means 73 serves to control the chopper 72. For example, the control means 73 permits a lamp current at least three times as much as the rated lamp current to flow from the chopper 72 through the metal halide discharge lamp 77 immediately after the lighting, followed by gradually decreasing the lamp current with time to reach the rated lamp current.

The lamp current detecting means 74, which is inserted in series to the discharge lamp 77, serves to detect the lamp current so as to supply a controlled lamp current to the control means 73. On the other hand, the lamp voltage detecting means 75, which is inserted in parallel with the discharge lamp 77, serves to apply a controlled lamp voltage to the control means 73.

The control means 73, to which the detection signals of the lamp current and the lamp voltage are fed back, produces a constant power control signal so as to control the chopper 72 at a constant power. It should be noted that a micro computer having a time-based control pattern incorporated therein in advance is housed in the control means 73 so as to control the chopper 72 such that a lamp current at least three times as high as the rated lamp current is allowed to flow through the metal halide discharge lamp immediately after the lighting, followed by decreasing the lamp current with time.

The starting means 76 is constructed to permit a pulse voltage of 20 kV to be supplied to the metal halide discharge lamp 77 at the starting time.

According to the lighting device for the metal halide discharge lamp of this embodiment, a desired light flux is generated immediately after the lighting, though a DC current is used for the lighting. As a result, the lighting device of the present invention can be used satisfactorily in a headlamp for a vehicle such as an automobile, which requires rising of the light flux in an amount of 25% and 80% of the rated value in 1 second and 4 seconds, respectively, after the turning-on of the power source.

It should be noted that a DC to AC converter is not required in the lighting device of this embodiment, making it possible to achieve a cost reduction of about 30%, compared with the lighting device utilizing an AC power source. It is also possible to achieve the weight reduction by 15%, leading to a low manufacturing cost of the lighting circuit.

Embodiment 23

Figure 26:
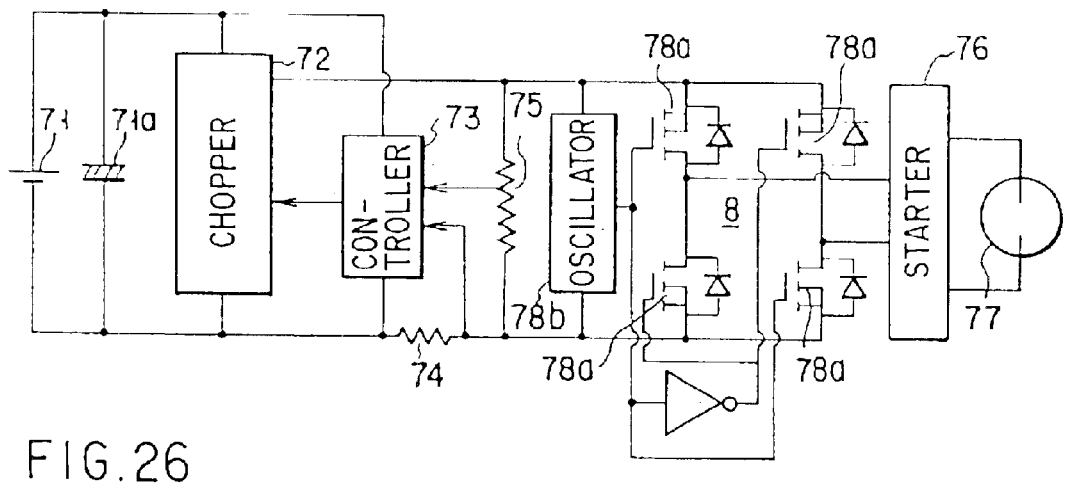
FIG. 26 is a circuit diagram showing the lighting device of a metal halide discharge lamp according to the second embodiment of the present invention.

FIG. 26 is a circuit diagram showing a lighting device of a metal halide discharge lamp according to a second embodiment of the present invention. The reference numerals common with FIGS. 25 and 26 denote the same members of the circuit and, thus, reference thereto is omitted in the following description. It should be noted that the second embodiment shown in FIG. 26 differs from the first embodiment shown in FIG. 25 in that the metal halide discharge lamp included in the lighting circuit of the second embodiment is lit by an AC current. It should be noted that the lighting circuit of the second embodiment includes an AC converting means 78 consisting of a full bridge inverter. To be more specific, a pair of series circuits each consisting of a pair of switching means 78a, 78a are connected in parallel between the output terminals of the chopper 72 so as to form a bridge circuit. Also, an oscillation output of an oscillator 78b is alternately supplied to the two diagonally facing switching means included in the four switching means 78a so as to generate a high frequency AC current between the output terminals of the bridge circuit. The metal halide discharge lamp 77 is lit by the high frequency AC current thus generated.

Embodiment 24

Figure 27:
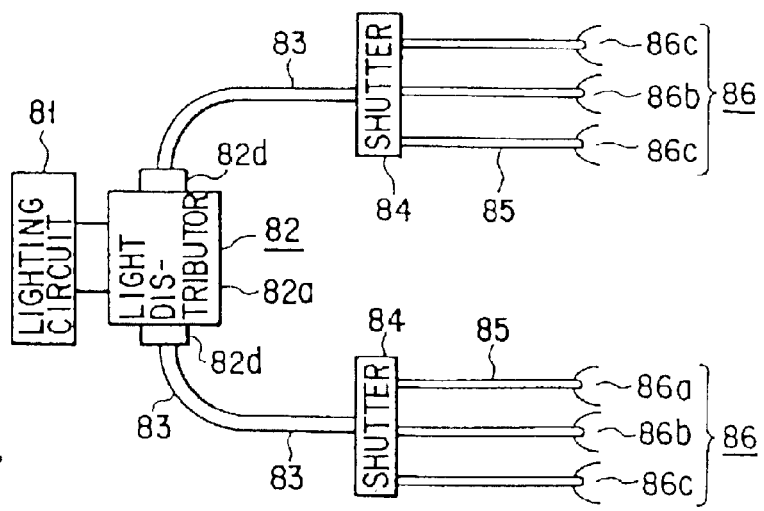
FIG. 27 is a schematical view showing a headlamp for a vehicle as a third embodiment of the illumination device of the present invention.
Figure 28:
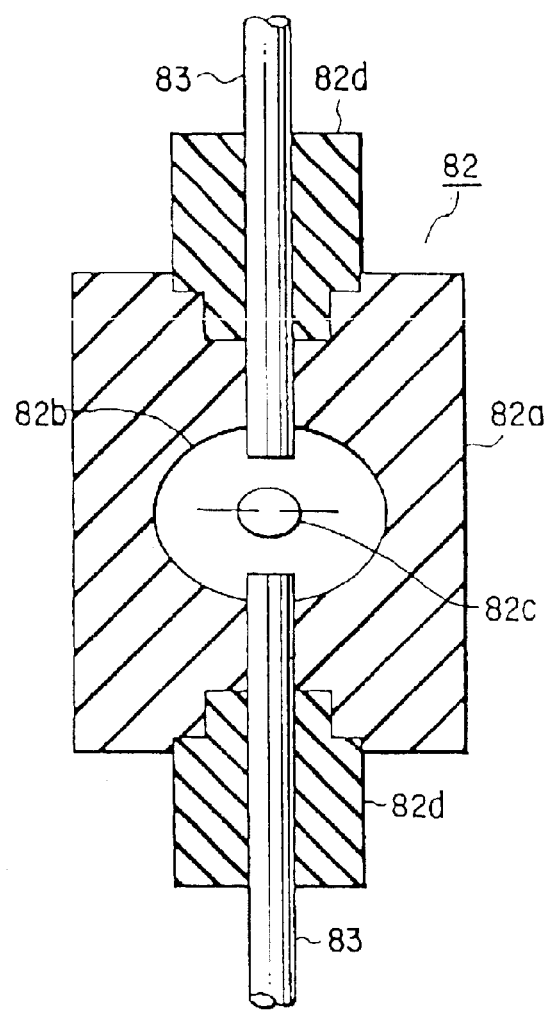
FIG. 28 is a schematical view showing a light distributor portion included in the headlamp for a vehicle as the third embodiment of the illumination device of the present invention.

FIG. 27 schematically shows a headlamp for a vehicle as an illumination apparatus according to a third embodiment of the present invention. Also, FIG. 28 schematically shows the light distributor portion included in the headlamp shown in FIG. 27. The headlamp shown in. FIGS. 27 and 28 comprises a lighting circuit 81, a light distributor 82, a main optical fiber 83, a light shutter 84, an individual optical fiber 85, and an illuminator 86.

The lighting circuit shown in FIG. 25 or 26 can be used as the lighting circuit 81. The light distributor 82 includes a case 82a, a light-collecting reflector 82b, a metal halide discharge lamp 82c, and an optical connector 82d. The light emitted from the metal halide discharge lamp 82c is distributed from the portion of the optical connector 82d to the main optical fiber 83.

The light distributed from the light distributor 82 is transmitted by the main optical fiber 83 into the light shutter 84. The light shutter 84 serves to selectively transmit the light to each lamp 86 via the individual optical fiber 85. Further, the illuminator 86 consists of a set of a high beam illuminator 86a, a low beam illuminator 86b and a fog illuminator 86c. Two illuminators 86 of the particular construction are mounted to both sides on the front portion of a vehicle such as an automobile.

Embodiment 25

Prepared was a metal halide discharge lamp adapted for use in Embodiment 24 described above. The discharge lamp thus prepared was substantially equal in construction to the discharge lamp shown in FIG. 8, except that the discharge lamp in this embodiment was designed to have a rated lamp power of 80 W. Also, the distance between the two electrodes was set at 2 mm in order to improve the light collecting efficiency. Further, the discharge medium sealed in the hermetic vessel was as follows:

First halide . . . 0.3 mg of scandium iodide ($ScI_3$) and 1.5 mg of sodium iodide (NaI);

Second halide (for sample No. 2) . . . 1 mg of $ZnI_2$, 1 mg of $AlI_3$, and 1 mg of $MnI_2$;

Second halide (for sample No. 3) . . . 2 mg of $ZnI_2$, 1 mg of $GaI_3$, and 1 mg of $CrI_2$;

Rare gas . . . 5 atmospheres of xenon gas.

Also prepared was a conventional metal halide discharge lamp substantially equal to the discharge lamp of the present invention except that 15 mg of mercury was sealed in the hermetic vessel in place of the second halide sealed in the discharge lamp of the present invention.

Each of the discharge lamps of the present invention and the conventional discharge lamp thus prepared was lit at a rated input power of 80 W for evaluation of the lamp voltage (V), light emitting efficiency (lm/W), color rendering properties (general color rendering index) Ra and the color temperature (K), with the results as shown in Table 33:

TABLE 33

| Sample No. | Lamp voltage (V) | Light emitting efficiency | Color rendering properties (Ra) | Color temperature (K) |
|---|---|---|---|---|
| 1 (Prior Art) | 63 | 94 lm/W | 63 | 4020 |
| 2 | 58 | 88 lm/W | 68 | 3920 |
| 3 | 62 | 89 lm/W | 69 | 4110 |

As apparent from Table 33, the discharge lamp of the present invention produces characteristics substantially equal to those of the conventional discharge lamp having mercury sealed therein. It should also be noted that, in the system of Embodiment 24, the necessity for changing the input power for the dimming purpose is increased. In this respect, it is highly useful that the dimming can be achieved.

Embodiment 26

Figure 29:
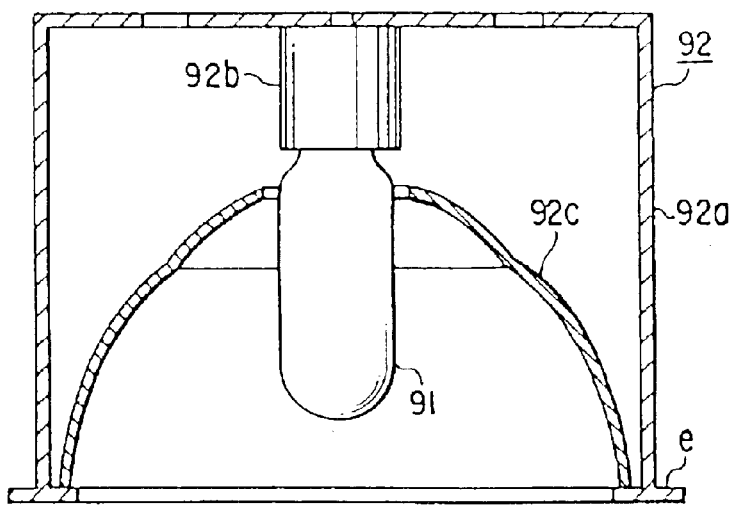
FIG. 29 is a schematical view showing a down light as a fourth embodiment of the illumination apparatus of the present invention.

FIG. 29 is a cross sectional view showing a down light as an illumination apparatus according to a fourth embodiment of the present invention. As shown in the drawing, the down light comprises a metal halide discharge lamp 91 and a down light body 92, including a base body 92a, a socket 92b and a reflecting plate 92c. The base body 92a is buried in a ceiling and, thus, provided with a ceiling abutting edge "e" at the lower end. The socket 92b is mounted to the base body 92a. Further, the reflecting plate 92c is supported by the base body 92a and is positioned to surround the metal halide discharge lamp 91 such that the center of the light emission from the discharge lamp 91 is positioned in substantially the central portion of the reflecting plate 92c.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A metal halide discharge lamp which essentially permits disusing mercury, comprising:
    (a) a refractory and light-transmitting hermetic vessel;
    (b) a pair of electrodes fixed to said hermetic vessel;
    (c) a discharge medium sealed in the hermetic vessel and containing a first halide and a second halide,
        (i) said first halide being a halide of at least one metal which emits a visible light and being a halide of at least one metal selected from the group consisting of sodium, scandium and a rare earth metal, and
        (ii) said second halide having a vapor pressure less than 5 atmospheres during lighting so as to act as a buffer gas to maintain a lamp voltage and being a halide of at least one metal which emits a visible light less than that emitted by the metal of the first halide; and
    (d) an outer tube housing said hermetic vessel.

2. The metal halide discharge lamp according to claim 1, further comprising Xe gas being sealed in the hermetic vessel in a pressure of at least one atmosphere.

3. The metal halide discharge lamp according to claim 1, wherein said second halide is a halide of at least one metal selected from the group consisting of magnesium, iron, cobalt, chromi, zinc, nickel, manganese, aluminum, antimony, beryllium, rhenium, gallium, titanium, zirconium, and hafnium.

4. The metal halide discharge lamp according to claim 1, wherein said discharge medium contains a halide of cesium.

5. A lighting device comprising:
    a metal halide discharge lamp defined in claim 1; and
    a lighting circuit configured to supply current to said lamp in an amount at least three times as much as a rated lamp current substantially after lighting of said lamp, wherein the amount of supplied current is thereafter decreased with time.

6. An illumination apparatus, comprising:
    an illumination apparatus body; and
    a metal halide discharge lamp defined in claim 1, said lamp being supported by said illumination apparatus body.

* * * * *

UNITED STATES PATENT AND TRADEMARK OFFICE
CERTIFICATE OF CORRECTION

PATENT NO. : 6,873,109 B2
DATED : March 29, 2005
INVENTOR(S) : T. Ishigami et al.

It is certified that error appears in the above-identified patent and that said Letters Patent is hereby corrected as shown below:

<u>Title page,</u>
Item [*] Notice, insert in appropriate order
-- This patent is subject to a terminal disclaimer. --

<u>Column 54,</u>
Line 17, "chromi," should read -- chromium, --

Signed and Sealed this

Nineteenth Day of July, 2005

JON W. DUDAS
*Director of the United States Patent and Trademark Office*